(12) United States Patent
Kim et al.

(10) Patent No.: US 11,910,737 B2
(45) Date of Patent: Feb. 27, 2024

(54) METHOD OF AUTOMATICALLY COMBINING FARM VEHICLE AND WORK MACHINE AND FARM VEHICLE

(71) Applicant: GINT Co., Ltd., Suwon-si (KR)

(72) Inventors: Yong Hyeon Kim, Suwon-si (KR); Seung Rak Son, Suwon-si (KR); Jae Ho Song, Yongin-si (KR); Byung Sun Kim, Yongin-si (KR); Yeon Tae Kim, Seoul (KR)

(73) Assignee: GINT Co., Ltd., Suwon-si (KR)

( * ) Notice: Subject to any disclaimer, the term of this patent is extended or adjusted under 35 U.S.C. 154(b) by 0 days.

(21) Appl. No.: 18/110,224

(22) Filed: Feb. 15, 2023

(65) Prior Publication Data

US 2023/0189683 A1 Jun. 22, 2023

Related U.S. Application Data

(63) Continuation of application No. 17/728,345, filed on Apr. 25, 2022, now Pat. No. 11,622,495.

(30) Foreign Application Priority Data

| Jun. 1, 2021 | (KR) | 10-2021-0070820 |
| Jun. 1, 2021 | (KR) | 10-2021-0070831 |
| Jul. 2, 2021 | (KR) | 10-2021-0087423 |
| Jul. 6, 2021 | (KR) | 10-2021-0088553 |
| Jul. 15, 2021 | (KR) | 10-2021-0092858 |

(51) Int. Cl.
*A01B 69/00* (2006.01)
*G05D 1/02* (2020.01)
*G01S 19/01* (2010.01)
*G05D 1/00* (2006.01)

(52) U.S. Cl.
CPC ............ *A01B 69/007* (2013.01); *G01S 19/01* (2013.01); *G05D 1/0276* (2013.01)

(58) Field of Classification Search
CPC ...... A01B 69/007; G01S 19/01; G05D 1/0276
See application file for complete search history.

(56) References Cited

U.S. PATENT DOCUMENTS

| 3,306,630 A | * | 2/1967 | Heinrich | A01B 59/062 172/272 |
| 3,829,128 A | * | 8/1974 | Sutton | A01B 59/062 172/272 |
| 3,847,415 A | * | 11/1974 | Geisthoff | B60D 1/465 280/421 |

(Continued)

FOREIGN PATENT DOCUMENTS

| JP | 09/107713 A | 4/1997 |
| JP | 2002/539439 A | 11/2002 |

(Continued)

*Primary Examiner* — Luis A Martinez Borrero
(74) *Attorney, Agent, or Firm* — Sughrue Mion, PLLC

(57) ABSTRACT

Provided is a method of automatically combining a farm vehicle with a work machine including confirming a current position of the work machine, moving a farm vehicle into a range having a predetermined radius around the current position, and controlling the farm vehicle, on the basis of a current position and direction of a first coupling unit included in the work machine, so that the first coupling unit and a second coupling unit included in the farm vehicle are coupled to each other.

10 Claims, 48 Drawing Sheets

(56) References Cited

U.S. PATENT DOCUMENTS

| | | | | |
|---|---|---|---|---|
| 3,961,812 | A * | 6/1976 | Von Allworden | B60D 1/141 172/275 |
| 4,398,745 | A * | 8/1983 | Azzarello | B60D 1/04 280/508 |
| 4,805,927 | A * | 2/1989 | Stephenson | A01B 71/066 280/475 |
| 4,944,354 | A * | 7/1990 | Langen | A01B 71/06 172/47 |
| 5,000,269 | A * | 3/1991 | Aoki | B62D 49/065 37/231 |
| 5,234,070 | A * | 8/1993 | Noah | B62D 1/28 180/401 |
| 5,660,032 | A * | 8/1997 | Neuerburg | A01B 73/04 56/DIG. 14 |
| 6,198,992 | B1 * | 3/2001 | Winslow | B60T 13/662 180/443 |
| 6,259,980 | B1 * | 7/2001 | Peck | F16H 61/32 701/24 |
| 6,405,132 | B1 * | 6/2002 | Breed | B60R 21/233 701/45 |
| 6,445,983 | B1 * | 9/2002 | Dickson | G05D 1/0278 701/472 |
| 6,526,352 | B1 * | 2/2003 | Breed | G01S 19/071 701/470 |
| 7,641,415 | B2 * | 1/2010 | Fox | A01B 71/06 403/322.2 |
| 7,654,019 | B2 * | 2/2010 | Yeager | E02F 3/365 37/468 |
| 7,894,951 | B2 * | 2/2011 | Norris | H04L 67/12 180/443 |
| 7,984,575 | B2 * | 7/2011 | Robl | E02F 3/365 37/468 |
| 8,180,514 | B2 * | 5/2012 | Kaprielian | G05D 1/0278 701/50 |
| 8,262,310 | B2 * | 9/2012 | Sikorski | E02F 3/3618 37/468 |
| 8,556,534 | B2 * | 10/2013 | Lim | E02F 3/3663 37/468 |
| 8,718,861 | B1 * | 5/2014 | Montemerlo | B60W 30/00 701/411 |
| 8,818,608 | B2 * | 8/2014 | Cullinane | B60W 60/0059 701/96 |
| 8,825,258 | B2 * | 9/2014 | Cullinane | G05D 1/0212 701/96 |
| 8,974,137 | B2 * | 3/2015 | Parker | E02F 3/3672 37/468 |
| 9,075,413 | B2 * | 7/2015 | Cullinane | B60W 50/082 |
| 9,265,187 | B2 * | 2/2016 | Cavender-Bares | B25J 5/00 |
| 9,342,074 | B2 * | 5/2016 | Dolgov | B60W 50/10 |
| 9,352,752 | B2 * | 5/2016 | Cullinane | G05D 1/0223 |
| 9,392,743 | B2 * | 7/2016 | Camacho-Cook | A01B 69/008 |
| 9,511,779 | B2 * | 12/2016 | Cullinane | B60R 16/023 |
| 9,633,564 | B2 * | 4/2017 | Ferguson | G08G 1/166 |
| 9,663,117 | B2 * | 5/2017 | Cullinane | B60W 60/0053 |
| 9,670,642 | B2 * | 6/2017 | Pesch | E02F 3/3618 |
| 9,821,818 | B2 * | 11/2017 | Cullinane | B60K 37/06 |
| 9,896,817 | B2 * | 2/2018 | Sulzer | E02F 3/3618 |
| 10,000,216 | B2 * | 6/2018 | Cullinane | G05D 1/0223 |
| 10,235,122 | B1 * | 3/2019 | Goel | G06F 3/1423 |
| 10,300,926 | B2 * | 5/2019 | Cullinane | B60R 16/023 |
| 10,864,917 | B2 * | 12/2020 | Cullinane | B60R 22/48 |
| 11,126,174 | B2 * | 9/2021 | Ming | B60W 50/082 |
| 11,192,552 | B2 | 12/2021 | Niewiadomski et al. | |
| 11,208,784 | B2 * | 12/2021 | Molnar | E02F 3/3686 |
| 11,622,495 | B2 * | 4/2023 | Kim | G01S 19/01 701/24 |
| 11,643,099 | B2 * | 5/2023 | Cullinane | B60W 60/0051 701/23 |
| 2002/0198632 | A1 * | 12/2002 | Breed | G01S 17/86 701/472 |
| 2003/0191568 | A1 * | 10/2003 | Breed | B60W 40/06 701/469 |
| 2004/0193363 | A1 * | 9/2004 | Schmidt | B62D 1/28 701/23 |
| 2005/0060069 | A1 * | 3/2005 | Breed | G08G 1/166 701/408 |
| 2005/0134440 | A1 * | 6/2005 | Breed | G01S 17/931 701/45 |
| 2005/0197175 | A1 * | 9/2005 | Anderson | A01G 23/00 460/1 |
| 2005/0202882 | A1 * | 9/2005 | Schott | F16D 3/02 464/160 |
| 2007/0198145 | A1 * | 8/2007 | Norris | B60T 7/22 701/23 |
| 2008/0065286 | A1 * | 3/2008 | Han | G06V 20/588 701/28 |
| 2008/0065287 | A1 * | 3/2008 | Han | G01S 19/485 701/28 |
| 2008/0269988 | A1 * | 10/2008 | Feller | G05D 1/027 701/41 |
| 2008/0294309 | A1 * | 11/2008 | Kaprielian | G01S 17/86 342/357.31 |
| 2009/0216406 | A1 * | 8/2009 | Senneff | A01B 69/007 701/41 |
| 2010/0036569 | A1 * | 2/2010 | Hel | A01F 15/0841 701/50 |
| 2010/0192425 | A1 * | 8/2010 | Miller | E02F 3/3618 37/468 |
| 2010/0312428 | A1 * | 12/2010 | Roberge | A01B 69/007 717/106 |
| 2011/0054729 | A1 * | 3/2011 | Whitehead | A01B 69/007 701/50 |
| 2011/0219632 | A1 * | 9/2011 | Odom | G01B 11/00 33/228 |
| 2012/0112896 | A1 * | 5/2012 | Clair | A01B 69/008 701/1 |
| 2012/0174445 | A1 * | 7/2012 | Jones | G01S 19/53 37/197 |
| 2013/0160268 | A1 * | 6/2013 | Parker | E02F 3/3668 403/321 |
| 2013/0166132 | A1 * | 6/2013 | Matthews | G05D 1/0278 707/705 |
| 2014/0100693 | A1 * | 4/2014 | Fong | B25J 11/0085 700/253 |
| 2014/0156133 | A1 * | 6/2014 | Cullinane | G05D 1/0212 701/23 |
| 2014/0156134 | A1 * | 6/2014 | Cullinane | B60R 1/00 701/23 |
| 2014/0309888 | A1 * | 10/2014 | Smit | B60W 30/045 701/41 |
| 2014/0324291 | A1 * | 10/2014 | Jones | E02F 9/2054 701/41 |
| 2014/0330478 | A1 * | 11/2014 | Cullinane | G05D 1/0223 701/23 |
| 2015/0284009 | A1 * | 10/2015 | Cullinane | B60K 37/06 701/23 |
| 2015/0362921 | A1 * | 12/2015 | Hanaoka | G05D 1/0088 702/159 |
| 2015/0362922 | A1 * | 12/2015 | Dollinger | G05D 1/0291 701/2 |
| 2016/0120095 | A1 * | 5/2016 | Fujimoto | A01B 69/008 701/24 |
| 2016/0200326 | A1 * | 7/2016 | Cullinane | G05D 1/0212 701/23 |
| 2017/0043788 | A1 * | 2/2017 | Cullinane | G05D 1/0212 |
| 2017/0253253 | A1 * | 9/2017 | Cullinane | G05D 1/0223 |
| 2018/0043904 | A1 * | 2/2018 | Cullinane | G05D 1/0212 |
| 2018/0334173 | A1 * | 11/2018 | Cullinane | B60K 35/00 |
| 2019/0126748 | A1 * | 5/2019 | Graham | A01B 69/06 |
| 2019/0138003 | A1 * | 5/2019 | Ming | B60W 50/082 |
| 2019/0164427 | A1 * | 5/2019 | Greenwood | G08G 1/14 |
| 2019/0191615 | A1 * | 6/2019 | Thompson | A01F 15/08 |
| 2019/0291746 | A1 * | 9/2019 | Cullinane | G05D 1/0212 |
| 2020/0029490 | A1 * | 1/2020 | Bertucci | G06F 16/29 |
| 2020/0097021 | A1 * | 3/2020 | Carpenter | G05D 1/0225 |
| 2020/0130582 | A1 * | 4/2020 | Wong | B62D 13/06 |
| 2020/0174491 | A1 * | 6/2020 | Boydens | G06Q 50/02 |

(56) References Cited

U.S. PATENT DOCUMENTS

| | | | |
|---|---|---|---|
| 2020/0391744 A1* | 12/2020 | Niewiadomski | ............................ B60W 30/18109 |
| 2021/0000006 A1* | 1/2021 | Ellaboudy | ............. A01B 69/008 |
| 2021/0114521 A1* | 4/2021 | Niewiadomski | ........ B60D 1/015 |
| 2021/0129857 A1* | 5/2021 | Cullinane | ............. G05D 1/0223 |
| 2021/0291832 A1* | 9/2021 | Simmons | ............... B60W 10/20 |
| 2022/0022361 A1* | 1/2022 | Ogura | ................... G05D 1/0011 |
| 2022/0135085 A1* | 5/2022 | Wright | .................... G06V 20/58 701/25 |
| 2022/0135125 A1* | 5/2022 | Wang | ........................ B60D 1/62 701/41 |
| 2022/0139121 A1* | 5/2022 | Kim | ...................... G07C 5/0808 701/31.5 |
| 2022/0156917 A1* | 5/2022 | Yuan | ....................... G06V 20/188 |
| 2022/0252110 A1* | 8/2022 | Ribo | ........................ F16D 11/14 |
| 2022/0377964 A1* | 12/2022 | Kim | ...................... G05D 1/0225 |
| 2023/0247925 A1* | 8/2023 | Kim | ...................... G05D 1/0225 701/24 |
| 2023/0247926 A1* | 8/2023 | Kim | ...................... G05D 1/0276 701/24 |
| 2023/0247927 A1* | 8/2023 | Kim | ...................... A01B 69/007 701/24 |

FOREIGN PATENT DOCUMENTS

| | | |
|---|---|---|
| JP | 2015/022662 A | 2/2015 |
| JP | 2019/160246 A | 9/2019 |
| JP | 2020/528846 A | 10/2020 |
| KR | 10/2008/0050232 A | 6/2009 |
| KR | 10/2014/0070242 A | 6/2014 |
| KR | 10/2015/0079565 A | 7/2015 |
| KR | 101762757 B1 | 7/2017 |
| KR | 101828008 B1 | 2/2018 |
| KR | 10/2018/0026243 A | 3/2018 |
| KR | 10/2018/0138343 A | 12/2018 |
| KR | 10/2019/0004978 A | 1/2019 |
| KR | 10/2019/0096956 A | 8/2019 |
| KR | 102013156 B1 | 10/2019 |
| KR | 102014704 B1 | 10/2019 |
| KR | 102043257 B1 | 11/2019 |
| KR | 10/2020/0042390 A | 4/2020 |
| KR | 10/2020/0055154 A | 5/2020 |
| KR | 10/2020/0064165 A | 6/2020 |
| KR | 10/2020/0115717 A | 10/2020 |
| KR | 102167009 B2 | 10/2020 |
| KR | 102167151 B1 | 10/2020 |
| KR | 10/2020/0135588 A | 12/2020 |
| KR | 10/2021/0016086 A | 2/2021 |
| KR | 10/2021/0016926 A | 2/2021 |
| KR | 102223307 B1 | 3/2021 |
| KR | 10/2021/0062727 A | 5/2021 |
| KR | 102248382 B1 | 5/2021 |
| KR | 102252346 B1 | 5/2021 |

\* cited by examiner

FIG. 8
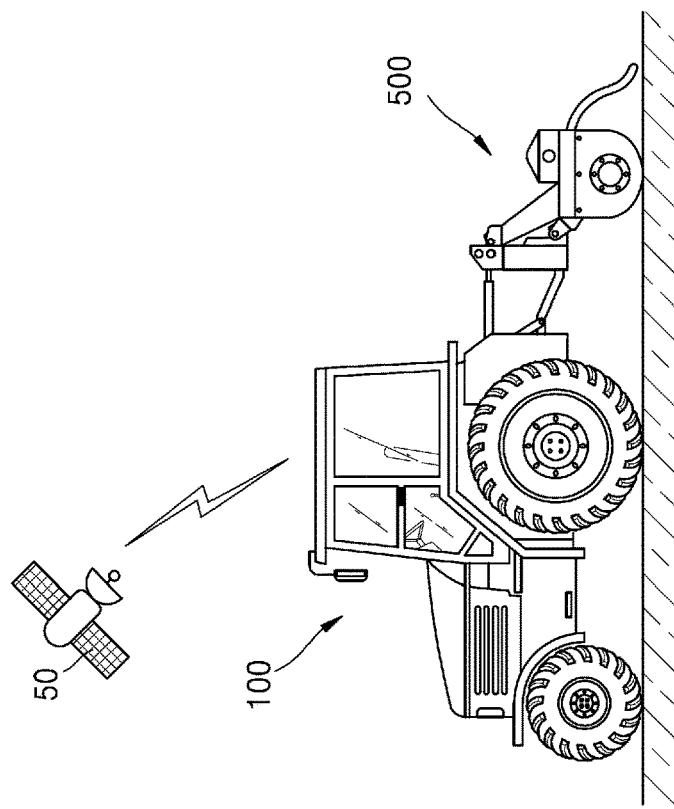
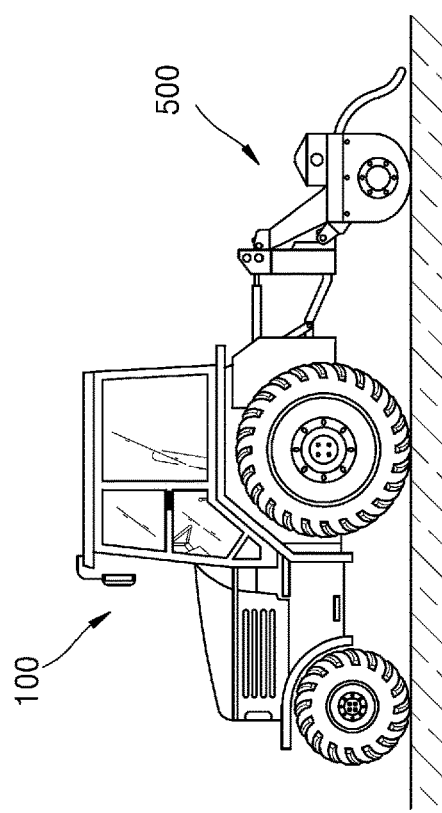

FIG. 25
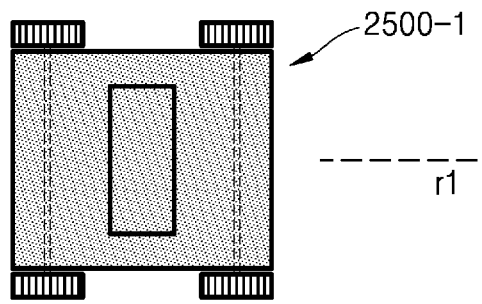
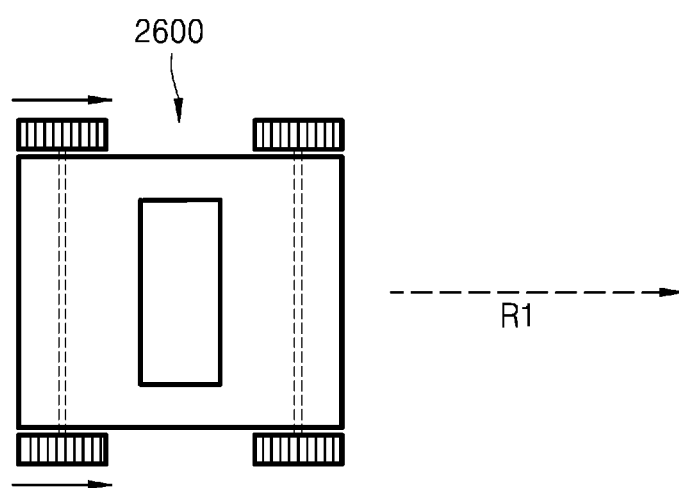
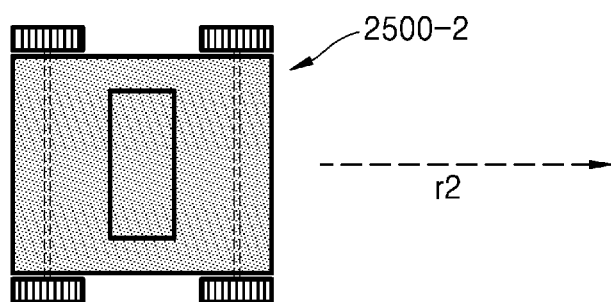
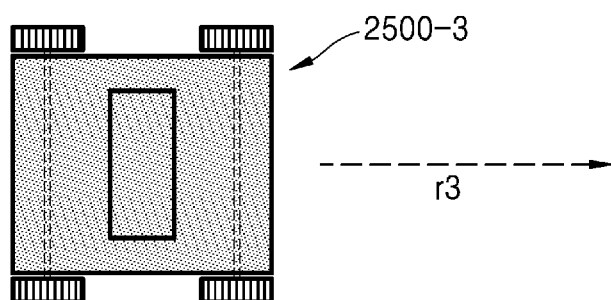

FIG. 28
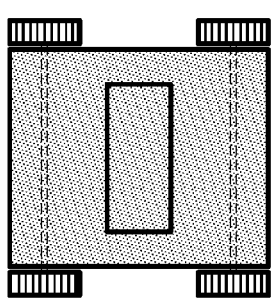
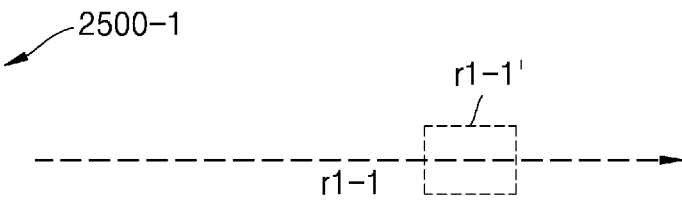
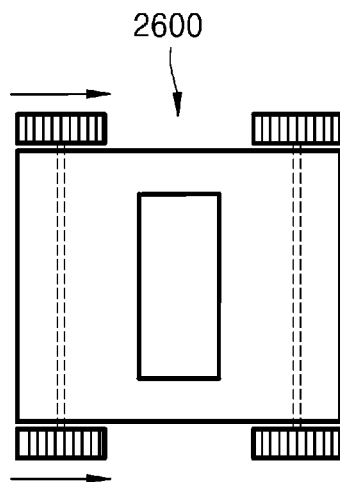
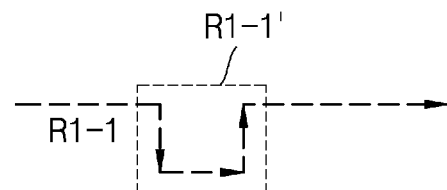
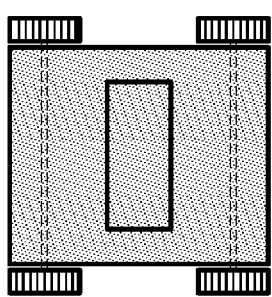
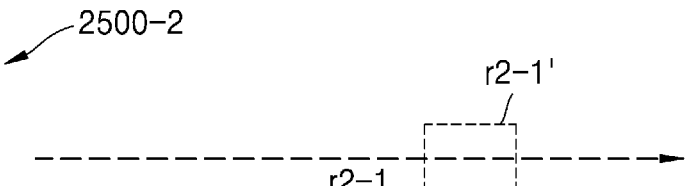
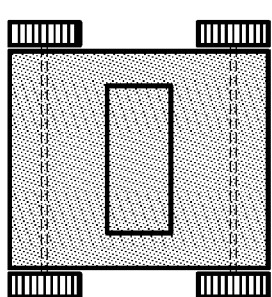

FIG. 30
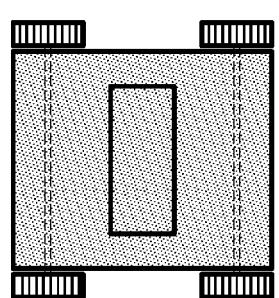
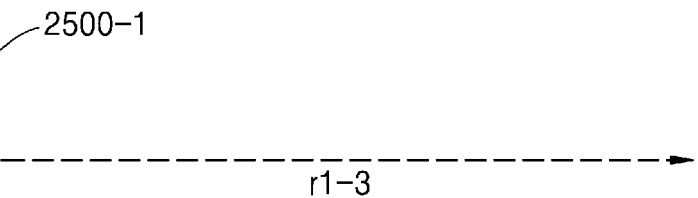
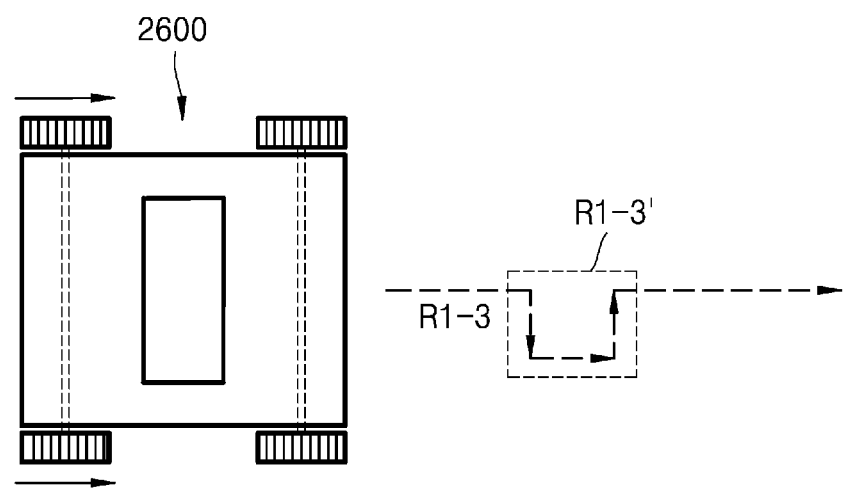
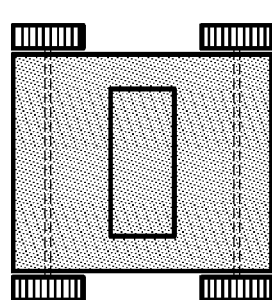
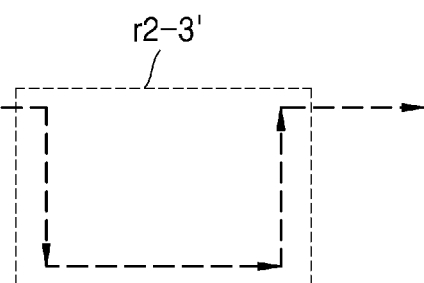
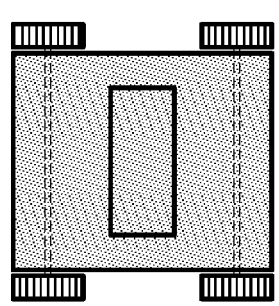
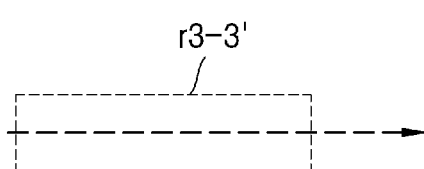

METHOD OF AUTOMATICALLY COMBINING FARM VEHICLE AND WORK MACHINE AND FARM VEHICLE

CROSS-REFERENCE TO RELATED APPLICATION

This application is a continuation of U.S. patent application Ser. No. 17/728,345, filed on Apr. 25, 2022, which is based on and claims priority under 35 U.S.C. § 119 to Korean Patent Application No. 10-2021-0070831, filed on Jun. 1, 2021, in the Korean Intellectual Property Office, Korean Patent Application No. 10-2021-0088553, filed on Jul. 6, 2021, in the Korean Intellectual Property Office, Korean Patent Application No. 10-2021-0092858, filed on Jul. 15, 2021, in the Korean Intellectual Property Office, Korean Patent Application No. 10-2021-0070820, filed on Jun. 1, 2021, in the Korean Intellectual Property Office, and Korean Patent Application No. 10-2021-0087423, filed on Jul. 2, 2021, in the Korean Intellectual Property Office, the disclosures of which are incorporated by reference herein in their entirety.

BACKGROUND

1. Field

The present disclosure relates to a method of automatically combining a farm vehicle and a work machine, and a farm vehicle.

2. Description of the Related Art

In recent years, as a demand for a technique that allows a labor input for performing farming works to be reduced increases and attempts to graft IT technology into an agricultural field are actively progressing, a technique related to farm vehicles is also developing. In particular, as food shortages occur worldwide due to the increase in population and changes in eating habits, agricultural mechanization is accelerating politically in developing countries, and agriculturally advanced countries seek to maximize productivity according to the importance of food security, attempts to apply smart mobility technology to farm vehicles have been actively conducted.

SUMMARY

One or more embodiments include a method of automatically combining a farm vehicle and a work machine, and a farm vehicle. The present disclosure is also directed to providing a computer-readable recording medium having recorded thereon a program for executing the method on a computer. The technical problems to be addressed are not limited to those described above, and other technical problems may be present.

One or more embodiments include a bale collecting method using a master vehicle and one or more slave vehicles, and a master vehicle performing the collecting method.

One or more embodiments include a platooning method for a vehicle group and a farm vehicle capable of platooning.

One or more embodiments include a method and device for recommending farm products suitable for the characteristics of farmland.

One or more embodiments include an autonomous driving control method of a farm vehicle and a farm vehicle capable of autonomous driving.

Objectives to be achieved by embodiments of the present disclosure are not limited to the objectives, and other objectives, which are not described above, will be understood by the following description, and will be more clearly understood by the embodiments of the present disclosure. Also, it will be easily appreciated that the aspects and advantages to be achieved by embodiments of the present disclosure may be implemented by means shown in the claims and a combination thereof.

One aspect of the present disclosure provides a method of automatically combining a farm vehicle with a work machine including confirming a current position of the work machine, moving a farm vehicle into a range having a predetermined radius around the current position, and controlling the farm vehicle, on the basis of a current position and direction of a first coupling unit included in the work machine, so that the first coupling unit and a second coupling unit included in the farm vehicle are coupled to each other.

In the method, in the confirming of the current position, the current position is confirmed on the basis of a position of the work machine at a final time point at which the work machine is separated from the farm vehicle.

In the method, the controlling of the farm vehicle includes determining an aligned state of the first coupling unit and the second coupling unit on the basis of the current position and direction of the first coupling unit.

In the method, in the determining of the aligned state, the aligned state is determined on the basis of a first separation distance between a first point of the second coupling unit and a third point of the first coupling unit and a second separation distance between a second point of the second coupling unit and a fourth point of the first coupling unit.

In the method, in the determining of the aligned state, the aligned state is determined by further considering a third separation distance between a fifth point positioned between the first point and the second point and a sixth point positioned between the third point and the fourth point.

In the method, the method further includes determining whether the first coupling unit and the second coupling unit are coupled to each other on the basis of the current state of the first coupling unit.

In the method, the method further includes outputting a path through which the farm vehicle moves so that the first coupling unit is coupled to the second coupling unit.

Another aspect of the present disclosure provides a computer-readable recording medium having recorded thereon a program for executing the method by a computer.

Another aspect of the present disclosure provides a farm vehicle including a second coupling unit to be coupled to a first coupling unit included in a work machine, and a processor configured to confirm a current position of the work machine, control the farm vehicle to move into a range having a predetermined radius around the current position, and control the farm vehicle, on the basis of a current position and direction of a first coupling unit included in the work machine, so that the first coupling unit and a second coupling unit included in the farm vehicle are coupled to each other.

In the farm vehicle, the processor confirms the current position on the basis of a position of the work machine at a final time point at which the work machine is separated from the farm vehicle.

In the farm vehicle, the processor determines an aligned state of the first coupling unit and the second coupling unit on the basis of the current position and direction of the first coupling unit.

In the farm vehicle, the processor determines the aligned state on the basis of a first separation distance between a first point of the second coupling unit and a third point of the first coupling unit and a second separation distance between a second point of the second coupling unit and a fourth point of the first coupling unit.

In the farm vehicle, the processor determines the aligned state by further considering a third separation distance between a fifth point positioned between the first point and the second point and a sixth point positioned between the third point and the fourth point.

In the farm vehicle, the processor determines whether the first coupling unit and the second coupling unit are coupled to each other on the basis of the current state of the first coupling unit.

In the farm vehicle, the farm vehicle further includes a display configured to output a path through which the farm vehicle moves so that the first coupling unit is coupled to the second coupling unit.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a view for describing an example of confirming a current position of the work machine by a processor;

FIG. 25 is a view illustrating an example of a vehicle group according to an embodiment;

FIG. 28 is a view illustrating an example in which a driving command for the slave vehicle is reset when a path of the master vehicle is changed, according to an embodiment;

FIG. 30 is a view illustrating an example in which a change in a path of the master vehicle causes a path of another slave vehicle to be changed, according to an embodiment;

DETAILED DESCRIPTION

Figure 1:
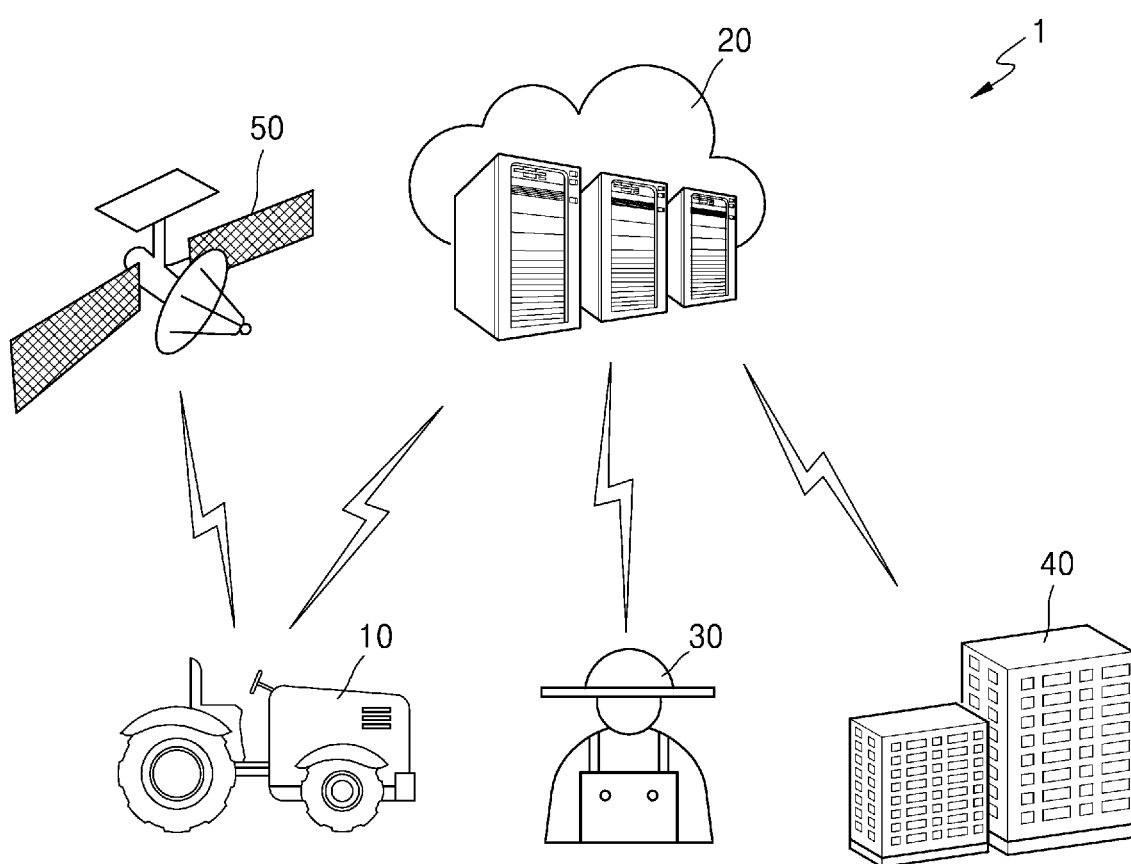
FIG. 1 is a view for describing an example of a system including a farm vehicle according to an embodiment.

The terms used herein are general terms that are currently widely used in consideration of functions in the present embodiments but may vary according to an intention of those of ordinary skill in the art, precedents, or the emergence of new technologies. In addition, the applicant may arbitrarily select terms in a particular case, and in this case, the meaning of the terms will be described in detail in the corresponding part. Accordingly, the terms used herein should be defined on the basis of the meaning of the terms and the content throughout the present embodiments, instead of the names of the terms.

The present embodiments may be susceptible to various modifications and include various forms, and some embodiments will be illustrated in the drawings and described in detail. However, there is no intent to limit the present embodiments to the particular forms disclosed, but on the contrary, it should be understood that the present embodiments are to cover particular modifications, equivalents, and alternatives falling within the spirit and scope of the present embodiments. The terms used in the present specification are only used to describe the embodiments and are not intended to limit the present embodiments.

Unless otherwise defined, the terms used herein have the same meaning as commonly understood by those skilled in the art to which present embodiments belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The detailed description of the present disclosure to be described below refers to the accompanying drawings, which illustrate specific embodiments in which the present disclosure may be implemented. These embodiments are described in sufficient detail to enable those skilled in the art to practice the present disclosure. It is to be understood that various embodiments of the present disclosure are different from each other, but need not be mutually exclusive. For example, specific shapes, structures, and characteristics described herein may be changed from one embodiment to another embodiment and implemented without departing from the spirit and scope of the present disclosure. In addition, it should be understood that positions or arrangements of individual components in each embodiment may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar components over various aspects.

Meanwhile, the technical features individually described in one drawing in this specification may be implemented separately or at the same time.

As used herein, "unit" or "module" may be a hardware component to which mechanical elements are coupled, a hardware component such as a processor or a circuit, and/or a software component executed by a processor or a circuit.

Hereinafter, various embodiments of the present disclosure will be described in detail with reference to the accompanying drawings in order to enable those of ordinary skill in the art to easily practice the present disclosure.

FIG. 1 is a view for describing an example of a system including a farm vehicle according to an embodiment.

Referring to FIG. 1, a system 1 includes a farm vehicle 10, a server 20, an operator 30, and an another operator 40 other than the operator 30. In the following description, the operator 30 and the another operator 40 may be natural persons or corporations, as well as devices (e.g., various devices communicatable with other devices) used by the operator 30 and the another operator 40, respectively.

The farm vehicle 10 may include a vehicle that may be utilized in agriculture. For example, the farm vehicle 10 may perform farming work (e.g., a cultivation of a field or paddy, a transport of agricultural materials, and the like) that must be performed in agriculture, and may be used by the operator 30 to move to farmland or the like. For example, the farm vehicle 10 may be a tractor, but the present disclosure is not limited thereto.

Meanwhile, the farm vehicle 10 may not be limited to a vehicle that may be utilized only in agriculture. In other words, the farm vehicle 10 may also refer to a moving means that is not limited to being utilized in agriculture, such as a conventional passenger car, truck, motorcycle, or the like.

The farm vehicle 10 may perform wired and/or wireless communication with the operator 30 and/or the another operator 40 via the server 20. In addition, the farm vehicle 10 may perform wireless communication with a satellite 50 to implement various functions using global positioning system (GPS) signals.

Data obtained from the farm vehicle 10 may be transmitted to the operator 30 and/or the another operator 40 via the server 20. In addition, the operator 30 and/or the another operator 40 may transmit data to the farm vehicle 10. Thus, the operator 30 and/or the another operator 40 may perform various works on the basis of data related to the farm vehicle 10. In addition, as the farm vehicle 10 performs communication with the operator 30, the operator 30 may perform various controls regarding the operation of the farm vehicle 10. For example, the operator 30 may perform driving, parking, farming works, and the like of the farm vehicle 10 even without directly boarding on the farm vehicle 10.

For example, the wired communication method may be a wired cable connection, but the present disclosure is not limited thereto. Meanwhile, the wireless communication method may correspond to, but is not limited to, near field communication (NFC), ZigBee, Bluetooth, ultra wideband (UWB) communication, long term evolution (LTE), global navigation satellite system (GNSS), emergency call (eCall), and the like.

Meanwhile, the communication may also be performed between modules included in the farm vehicle 10. For example, in the farm vehicle 10, the communication may be performed by Ethernet, controller area network with flexible data rate (CAN-FD), and the like, but the present disclosure is not limited thereto.

Further, in FIG. 1, the farm vehicle 10 is illustrated as communicating with the operator 30 and the another operator 40 via the server 20, but the present disclosure is not limited thereto For example, the farm vehicle 10, the operator 30, and/or the another operator 40 may be communicatively connected directly. Accordingly, the operator 30 and/or the another operator 40 may transmit and receive data related to the farm vehicle 10 and perform control of the farm vehicle 10 without through the server 20.

The another operator 40 may be any operator related to the farm vehicle 10 except for the operator 30. For example, any operator may correspond to the another operator 40 without limitation as long as the operator is directly/indirectly related to the farm vehicle 10, such as a manufacturer of the farm vehicle 10, a seller of the farm vehicle 10, a financial institution, a government agency, and the like. Here, the expression of "being directly/indirectly related" may be related to the production, sale, operation, finance, policy, or the like of the farm vehicle 10, but the present disclosure is not limited thereto.

The farm vehicle 10 may be a mechanical vehicle. Here, the mechanical vehicle refers to a traditional vehicle in which a mechanical signal is primarily utilized in controlling the farm vehicle 10. In this case, a separate control module may be attached to the farm vehicle 10, and the attached control module may communicate with an external device (e.g., a device of the server 20 or the operator 30), thereby controlling the farm vehicle 10.

Meanwhile, the farm vehicle 10 may be an electronic vehicle. Here, the electronic vehicle refers to a vehicle in which an electronic signal is mainly utilized in controlling the farm vehicle 10. In this case, the farm vehicle 10 may be controlled by communicating with an external device (e.g., a device of the server 20 or the operator 30).

Meanwhile, the server 20 may transmit and receive data related to the farm vehicle 10 and store the data. In addition, the server 20 may process the stored data into a form that may be usefully utilized by the operator 30 or another operator 40, and transmit the processed data to the operator 30 or the another operator 40.

As described above, the system 1 may provide an environment different from an environment, in which the conventional farm vehicle 10 is used, to the operator 30 or another operator 40. Specifically, in the conventional farm vehicle 10, the operator 30 directly operates the farm vehicle 10 and performs farming works. In addition, data, which may be obtained by the farm vehicle 10, must be directly written or remembered by the operator 30, and the another operator 40 must rely on the operator 30 to obtain information about the farm vehicle 10.

However, as the system 1 is being operated, the farm vehicle 10 may be operated unmanned, and the operator 30 may freely control the farm vehicle 10 at a place spaced apart from the farm vehicle 10. In addition, the operator 30 and the another operator 40 may collect data related to the farm vehicle 10 without a separate effort, and process the data collected from the farm vehicle 10. Alternatively, the operator 30 and another operator 40 may also collect the result of processing the data related to the farm vehicle 10 from the server 20.

Hereinafter, examples that may be implemented as the system 1 is operated will be described in detail with reference to FIGS. 2 to 4.

Figure 2B:
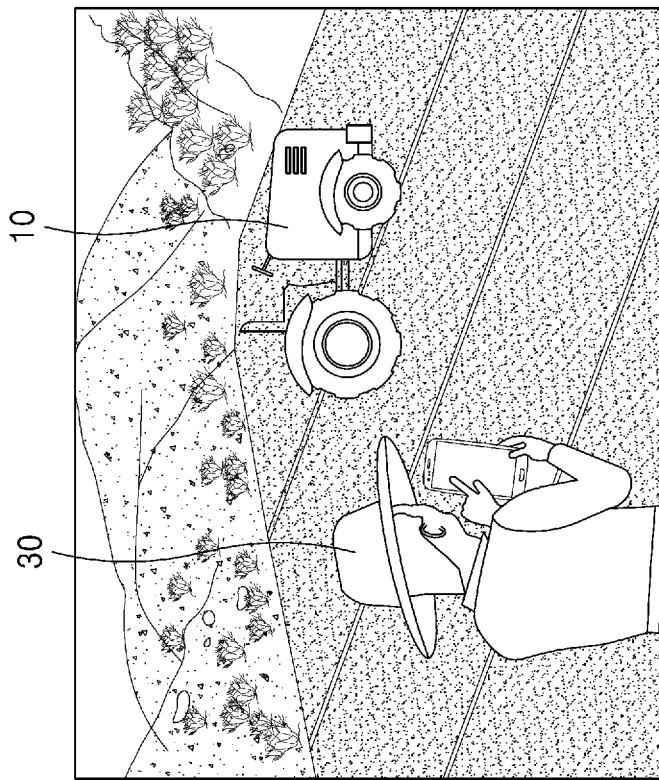
FIGS. 2A and 2B are views for describing an example of controlling a farm vehicle according to an embodiment.
Figure 2A:
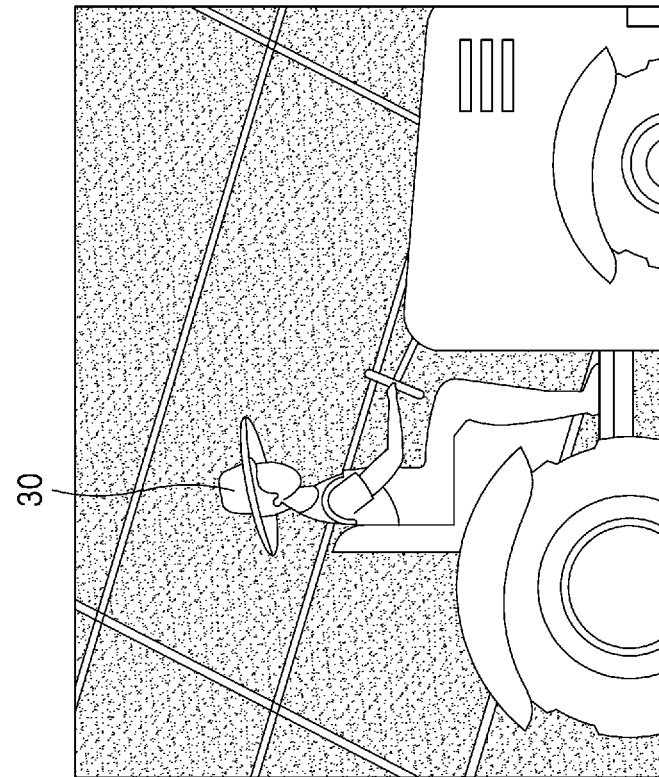

FIGS. 2A and 2B are views for describing an example of controlling a farm vehicle according to an embodiment.

FIG. 2A illustrates an example in which a conventional farm vehicle is operated, and FIG. 2B illustrates an example in which the farm vehicle according to an embodiment is operated.

Referring to FIG. 2A, the conventional farm vehicle is driven and controlled as the operator 30 is directly involved. Specifically, the farm vehicle is driven as the operator 30 boards on the farm vehicle and then directly controls a steering device, an acceleration device, and a deceleration device included in the farm vehicle. In addition, the operator 30 performs farming works by directly loading work tools on the farm vehicle or connecting a work machine to the farm vehicle.

Referring to FIG. 2B, the farm vehicle 10 according to an embodiment may be driven and controlled even though the operator 30 does not board the vehicle directly. Specifically, according to a control signal transmitted from an external device (e.g., a device of the operator 30, the server 20, and the like), the farm vehicle 10 may perform autonomous driving and autonomous working.

For example, a controller capable of controlling a steering device, an acceleration device, and a deceleration device may be installed in the farm vehicle 10, and the farm vehicle 10 may be driven according to a control signal input to the controller. In particular, the controller may be implemented as a general-purpose controller and may be installed in the conventional farm vehicle, which is described above with reference to FIG. 2A, so that the autonomous driving and working may be performed without separation or modification of an element included in the conventional farm vehicle.

Figure 3:
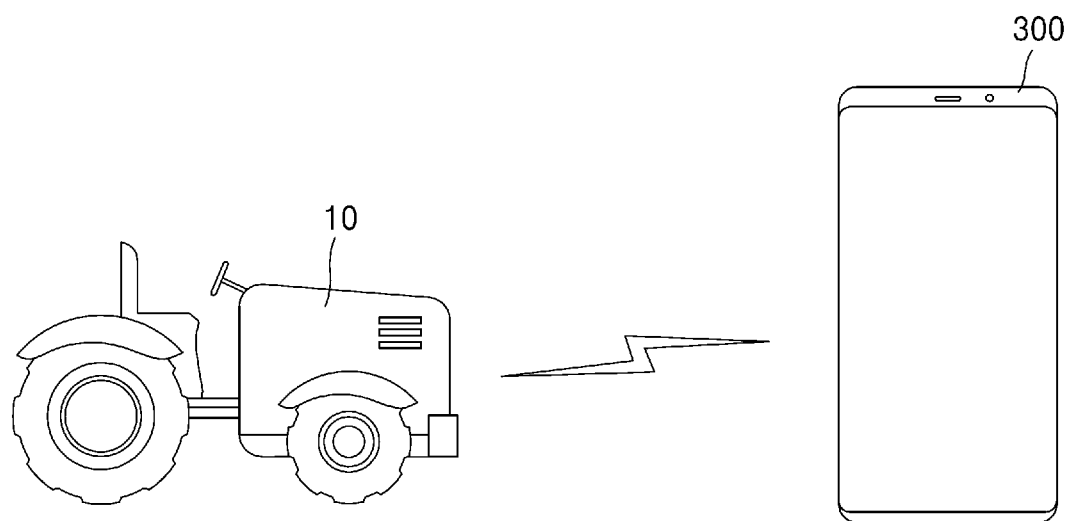
FIG. 3 is a view for describing an example in which data obtained from the farm vehicle according to an embodiment is transmitted to an external device.

FIG. 3 is a view for describing an example in which data obtained from the farm vehicle according to an embodiment is transmitted to an external device.

Referring to FIG. 3, the farm vehicle 10 may perform communication with an external device 300. Here, the external device 300 may be the server 20 of FIG. 1, and/or a device of the operator 30 or the another operator 40 of FIG. 1. Any device may correspond to the external device 300 without limitation as long as the device can communicate with other devices, compute or process data, and store data. For example, a personal computer (PC), a tablet PC, a smart phone, a wearable device, or the like may correspond to the external device 300, but the present disclosure is not limited thereto.

Various pieces of data may be generated depending on the driving and farming works of the farm vehicle 10. For example, as the farm vehicle 10 is produced, pieces of data for the farm vehicle 10 itself (e.g., a model name, a horsepower, a release year, a factory price, a transmission type, an external shape, a specification, and the like) may be generated. In addition, as the farm vehicle 10 is driven, CAN data, data related to an accident, data related to a failure, other driving data (e.g., an engine torque ratio, an engine load ratio, engine revolutions per minute (RPM), an engine operation hour, an accumulated fuel consumption amount, a fuel efficiency, engine failure information, an engine oil temperature, engine room temperature, a coolant temperature, a current gear-shifting stage, a transmission oil temperature, a travel distance, a travel time, and the like) may be generated. In addition, as the farming work is performed by the farm vehicle 10, data related to farm equipment, data related to farm products, data related to a farmland on which the farming work is performed, and the like may be generated.

The data generated in accordance with the driving and farming work of the farm vehicle 10 may be transmitted to the external device 300. In addition, the external device 300 may output and store the received data and process the received data according to a predetermined criterion. Accordingly, various solutions associated with the farm vehicle 10 may be provided to the operator 30.

As an example, through the external device 300, the operator 30 may perform management of farming works, maintenance of the farm vehicle 10, remote diagnosis of the farm vehicle 10, efficiency management of a fuel efficiency of the farm vehicle 10, and the like.

As another example, through the external device 300, the operator 30 may track a current position of the farm vehicle 10, or monitor a current farming work of the farm vehicle 10. In addition, through the external device 300, the operator 30 may remotely start or stop the engine of the farm vehicle 10 and turn an air conditioning system of the farm vehicle 10 on/off.

As still another example, through the external device 300, the operator 30 may prevent the farm vehicle 10 from being stolen, and may start or stop the engine of the farm vehicle 10 without a key of the farm vehicle 10. In addition, through the external device 300, the operator 30 may detect an accident of the farm vehicle 10, or perform a report on an emergency situation (e.g., an injury of the operator 30, a failure of the farm vehicle 10, and the like).

Figure 4:
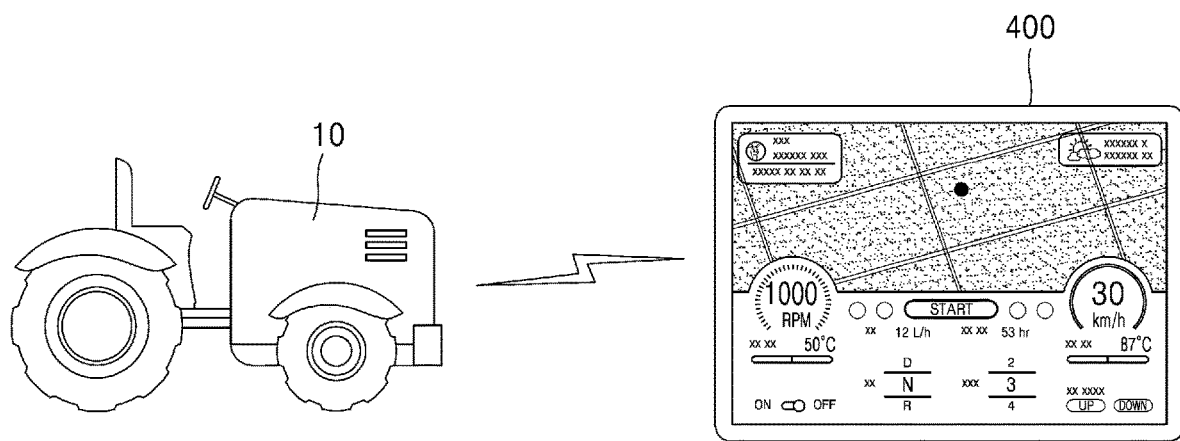
FIG. 4 is a view for describing another example of controlling the farm vehicle according to an embodiment.

FIG. 4 is a view for describing another example of controlling the farm vehicle according to an embodiment.

Referring to FIG. 4, an external device 400 may communicate with the farm vehicle 10 and output information about a current state of the farm vehicle 10. For example, the external device 400 may output information about a current position of the farm vehicle 10 obtained through GPS signals. In addition, when the farm vehicle 10 is currently travelling, the external device 400 may output information about an engine RPM, a current speed, a fuel efficiency, an operating time, a current gear-shifting stage, and the like of the farm vehicle 10.

Accordingly, the operator 30 may identify the current state of the farm vehicle 10 and remotely control the farm vehicle 10. In other words, the operator 30 may confirm information output from the external device 400 without boarding the farm vehicle 10 and control various functions of the farm vehicle 10 through the external device 400, thereby realizing autonomous driving and/or autonomous working.

Conventionally, in order for the farm vehicle 10 to be combined with a work machine, efforts of the operator 30 are required. Specifically, the operator 30 moves the farm vehicle 10 to a position adjacent to the work machine, or conversely, moves the work machine to a position adjacent to the farm vehicle 10, and then combines (connects) the work machine with the farm vehicle 10.

In the farm vehicle 10 according to an embodiment, the farm vehicle 10 is automatically combined with the work machine without efforts of the operator 30. Specifically, the farm vehicle 10 confirms a current position of the work machine and automatically performs a control process for being combined with the work machine. Hereinafter, an example in which the farm vehicle 10 is automatically combined with the work machine will be described with reference to FIGS. 5 to 15.

Figure 5:
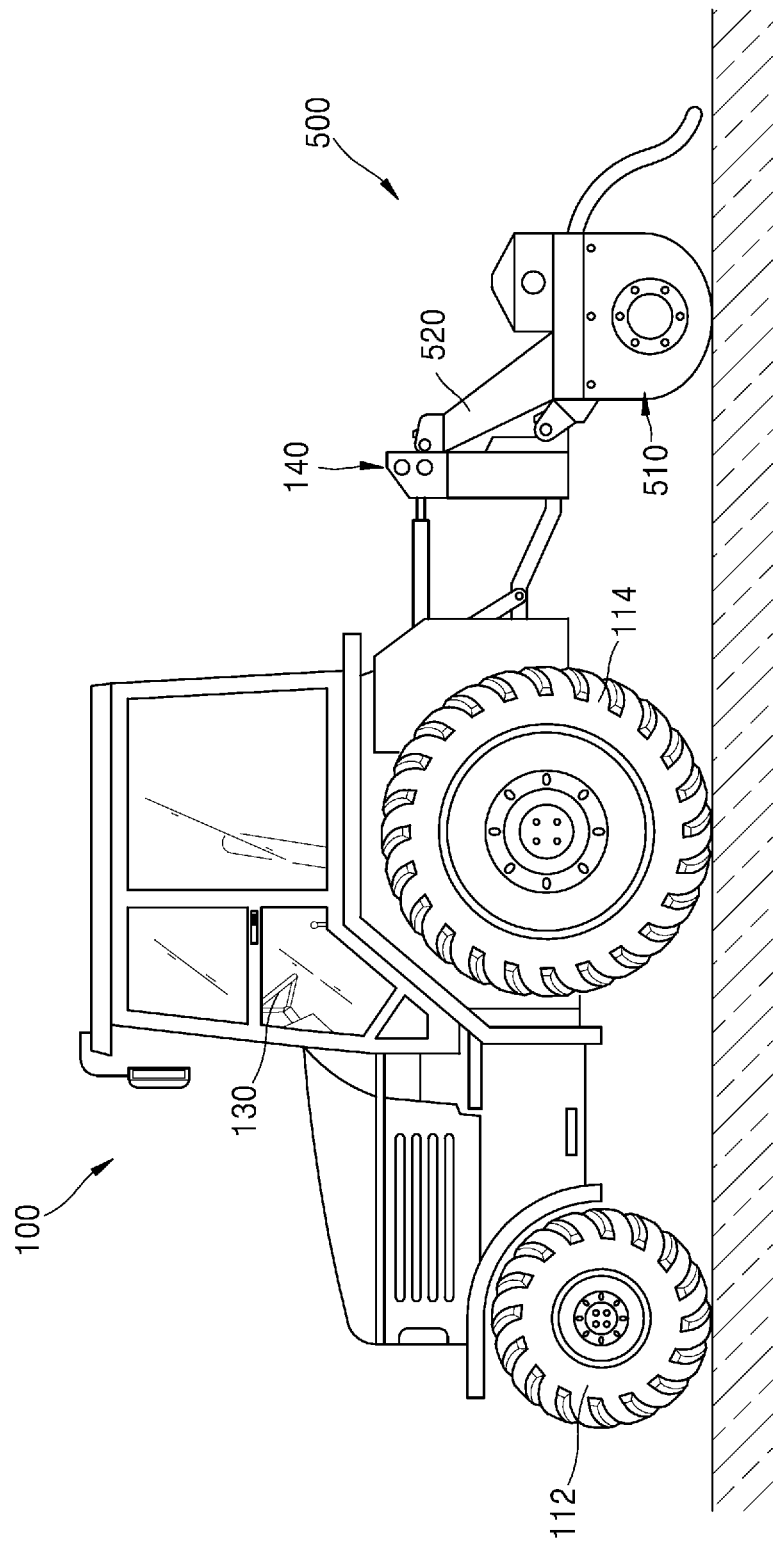
FIG. 5 is a view illustrating an example of a farm vehicle to which a work machine according to an embodiment is mounted.

FIG. 5 is a view illustrating an example of a farm vehicle to which a work machine according to an embodiment is mounted.

Referring to FIG. 5, a farm vehicle 100 may perform a farming work or civil engineering work while towing a work machine 500. The farm vehicle 100 may provide a strong towing force to tow a heavy object, and may provide a plurality of gear-shifting stages to perform various works.

For example, the farm vehicle 100 may be a tractor. In addition, the work machine 500 may include mechanisms for performing various farming works, such as, for example, a spade, a plow, a harrow, a harrow, a rake, a rotavator, and a harvester. Depending on the type of the work machine 500 to be combined with the farm vehicle 100, the farm vehicle 100 may perform various farming works such as tillage, soil crushing and disease and pests control, water pumping, threshing, and the like.

The farm vehicle 100 may be combined with the work machine 500 through a coupling unit 140. For example, the coupling unit 140 may be positioned on a rear surface of the farm vehicle 100, but the present disclosure is not limited thereto. In other words, the coupling unit 140 may be positioned such that the work machine 500 is combined with the farm vehicle 100 at a position that does not interfere with the driving and working of the farm vehicle 100.

The coupling unit 140 is coupled to a coupling unit 520 of the work machine 500 so that a towing force of the farm vehicle 100 may be transmitted to the work machine 500. For example, the coupling unit 140 may be a three-point connection device, and may include two lower links and one upper link, but the present disclosure is not limited thereto.

The coupling unit 140 may adjust a height of the work machine 500 mounted on the coupling unit 140 by being raised or lowered according to a manual operation of the operator 30 or an automatic control of the farm vehicle 100.

The work machine 500 may include a body 220, which performs work on land or farm products while being towed by the farm vehicle 100, and the coupling unit 520 that is coupled to the coupling unit 140.

The coupling unit 520 may be disposed on a front side of the work machine 500 and may be coupled to the coupling unit 140. In addition, the coupling unit 520 may include a plurality of coupling points corresponding to those of the coupling unit 140. For example, when the coupling unit 140 is a three-point connection device, the coupling unit 520 may include three coupling points, and when the coupling unit 140 is a two-point connection device, the coupling unit 520 may include two coupling points.

The farm vehicle 100 according to an embodiment may control components included in the farm vehicle 100 so that the coupling unit 140 may be accurately coupled to the coupling unit 520. Specifically, a processor of the farm vehicle 100 may control elements of the farm vehicle 100 so that the coupling unit 140 may be coupled to the coupling unit 520 on the basis of a current position of the work machine 500, and a current position and direction of the coupling unit 520.

Hereinafter, the components included in the farm vehicle 100 will be described with reference to FIG. 6.

Figure 6:
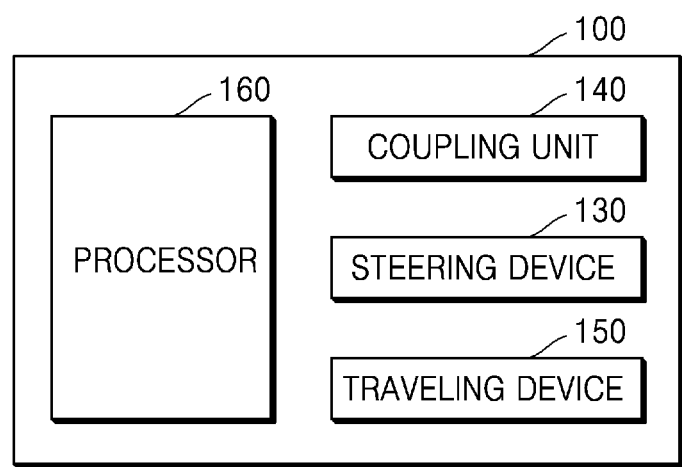
FIG. 6 is a diagram for describing an example of the farm vehicle according to an embodiment.

FIG. 6 is a diagram for describing an example of the farm vehicle according to an embodiment.

Referring to FIG. 6, the farm vehicle 100 includes a steering device 130, the coupling unit 140, a traveling device 150, and a processor 160. Only components related to the present embodiment are illustrated in the farm vehicle 100 shown in FIG. 6. Accordingly, it will be appreciated by those of ordinary skill in the art that other general components may be further included in the farm vehicle 100 in addition to the components shown in FIG. 6.

The steering device 130 may receive an input for operating the farm vehicle 100 and the work machine 500. For example, the steering device 130 may include a lever, a handle, a button, a touch screen, and the like. As an example, the steering device 130 may receive an input related to steering of the farm vehicle 100 from the operator 30, an input related to a gear-shifting stage of the farm vehicle 100, and the like. As another example, the farm vehicle 100 may perform steering and gear-shifting by automatically controlling the steering device 130.

The farm vehicle 100 may confirm information about the coupling unit 140 and the coupling unit 520. As an example, the farm vehicle 100 may receive information about the manufacturer and model of each of the coupling unit 140 and the coupling unit 520 and information about the shape and numerical value of each of the coupling unit 140 and the coupling unit 520 from the operator 30 through a user input unit (e.g., a button, a keyboard, a touch screen, and the like). As another example, the farm vehicle 100 may analyze an image of the work machine 500 captured by a camera and read the information about the manufacturer and model of each of the coupling unit 140 and the coupling unit 520 and the information about the shape and numerical value of each of the coupling unit 140 and the coupling unit 520 from a storage unit.

The traveling device 150 refers to a device for moving a vehicle body using power transmitted from a transmission device. As an example, the traveling device 150 may include a front wheel 112, a rear wheel 114, and an axle. As another example, the traveling device 150 may be a crawler-type device including a caterpillar track.

Meanwhile, although not illustrated in FIG. 6, the farm vehicle 100 may include a power generation device, a transmission device, a power take-off (P.T.O) device, a hydraulic device, and the like.

The power generation device may generate power required for the farm vehicle 100 to travel and perform work. For example, the power generation device may be a device equipped with a diesel engine or a gasoline engine.

The transmission device may appropriately convert a vehicle speed or a towing force of the farm vehicle 100 into various speeds using the power transmitted from the power generation device. For example, the transmission device may be a mechanical transmission device or a hydraulic transmission device.

The power take-off (P.T.O) device is a device for transmitting a part of the power generated by the power generation device to the work machine 500. For example, the power take-off device may be connected to the transmission device, and transmit required amount of power to the work machine 500 according to types of the work machine 500 and the work.

The hydraulic device is used for an operation of moving a part of the work machine 500 or the like. For example, the hydraulic device may move the work machine 500 by driving a hydraulic pump using rotational power of an engine, transmitting oil of hydraulic pressure generated in the hydraulic pump to a hydraulic cylinder through an operation valve, and pushing a piston using the hydraulic pressure.

The processor 160 controls all components included in the farm vehicle 100. The processor 160 may perform driving, parking, working (e.g., a farming work, a civil engineering work, and the like), and the like of the farm vehicle 100 by controlling the operation of all the components included in the steering device 130, the coupling unit 140 and the traveling device 150 as well as the farm vehicle 100.

For example, the processor 160 may be implemented by an array of multiple logical gates, or may be implemented by a combination of a general-purpose micro processor and a memory storing a program that is executable by the micro processor. In addition, it will be appreciated by those skilled in the art that the present disclosure may be implemented in other forms of hardware.

Hereinafter, an example in which the processor 160 controls the farm vehicle 100 to combine the farm vehicle 100 and the work machine 500 will be described with reference to FIGS. 7 to 15.

Figure 7:
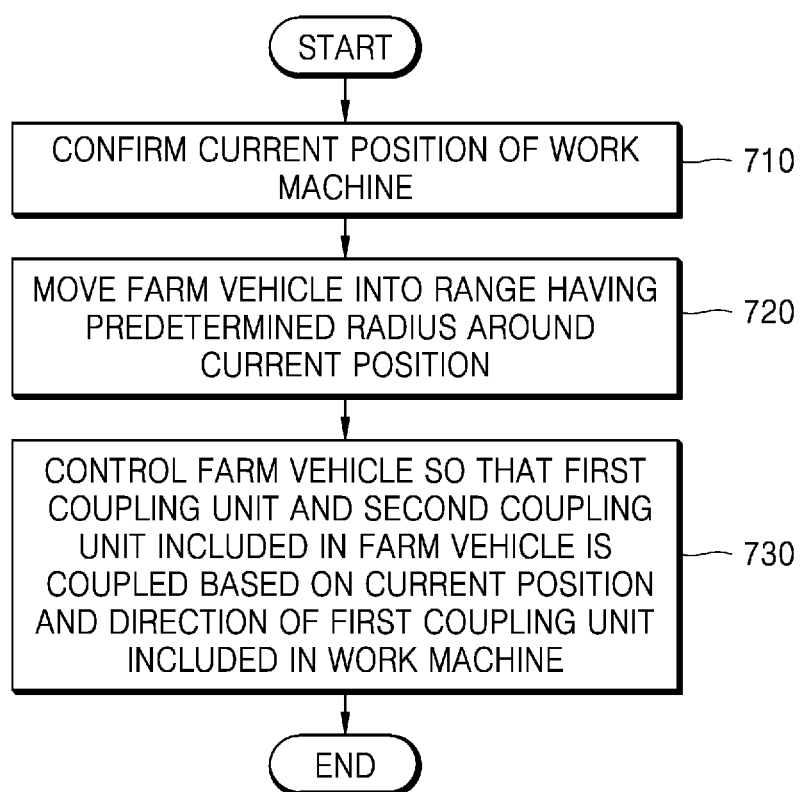
FIG. 7 is a flowchart illustrating an example of a method of automatically combining the farm vehicle and the work machine according to an embodiment.

FIG. 7 is a flowchart illustrating an example of a method of automatically combining the farm vehicle and the work machine according to an embodiment.

Referring to FIG. 7, the method of automatically combining the farm vehicle and the work machine includes operations processed in time series by the farm vehicle 10 or 100 illustrated in FIGS. 1 to 6. Accordingly, it may be seen that the contents described above with respect to the farm vehicles 10 and 100 shown in FIGS. 1 to 6 are also applied to the method of automatically combining the farm vehicle and the work machine of FIG. 7 even when the contents are omitted below.

In operation 710, the processor 160 confirms a current position of the work machine 500.

For example, the processor 160 may confirm the current position of the work machine 500 on the basis of a position at a final time point at which the work machine 500 is separated from the farm vehicle 10 or 100. Hereinafter, an example of confirming the current position of the work machine 500 by the processor 160 will be described with reference to FIG. 8.

FIG. 8 is a view for describing an example of confirming the current position of the work machine by the processor.

The view on the left side of FIG. 8 illustrates an example in which the farm vehicle 100 is combined with the work machine 500 to perform a farming work, and the view on the right side of FIG. 8 illustrates an example in which the farm vehicle 100 is separated from the work machine 500.

When the farming work is completed, the farm vehicle 100 may separate the work machine 500 therefrom. For example, the farm vehicle 100 may separate the work machine 500 therefrom at a position at which the farming work is completed, or may separate the work machine 500 therefrom at a separate place in which the work machine 500 is stored. That is, the current position of the work machine 500 may be considered as a final position at which the work machine 500 is separated from the farm vehicle 100.

The processor 160 confirms the position at a final time point at which the work machine 500 is separated from the farm vehicle 100. For example, the farm vehicle 100 may store GPS coordinates corresponding to the position of the farm vehicle 100 at which the farm vehicle 100 finally separate the work machine 500 therefrom, and the processor 160 may confirm the current position of the work machine 500 using the stored GPS coordinates.

Meanwhile, there may be various work machines 500 having a history combined with the farm vehicle 100. In this case, the farm vehicle 100 may store GPS coordinates corresponding to a position at which each of the various work machines 500 is finally separated. Accordingly, the processor 160 may confirm the type of the work machine 500 to be currently combined and confirm the current position of the work machine 500 using the stored GPS coordinates.

Referring to FIG. 7 again, in operation 720, the processor 160 controls the farm vehicle 10 or 100 such that the farm vehicle 10 or 100 moves in a range having a predetermined radius around the current position of the work machine 500.

Here, the range having a predetermined radius refers to a range in which the farm vehicle 10 or 100 may be finely moved and posture-adjusted in order to be combined with the work machine 500. The predetermined radius may be previously determined on the basis of the type of the work machine 500, the specifications of the farm vehicle 10 or 100, and the like.

Hereinafter, an example of controlling the farm vehicle 10 or 100 to move by the processor 160 will be described with reference to FIG. 9.

Figure 9:
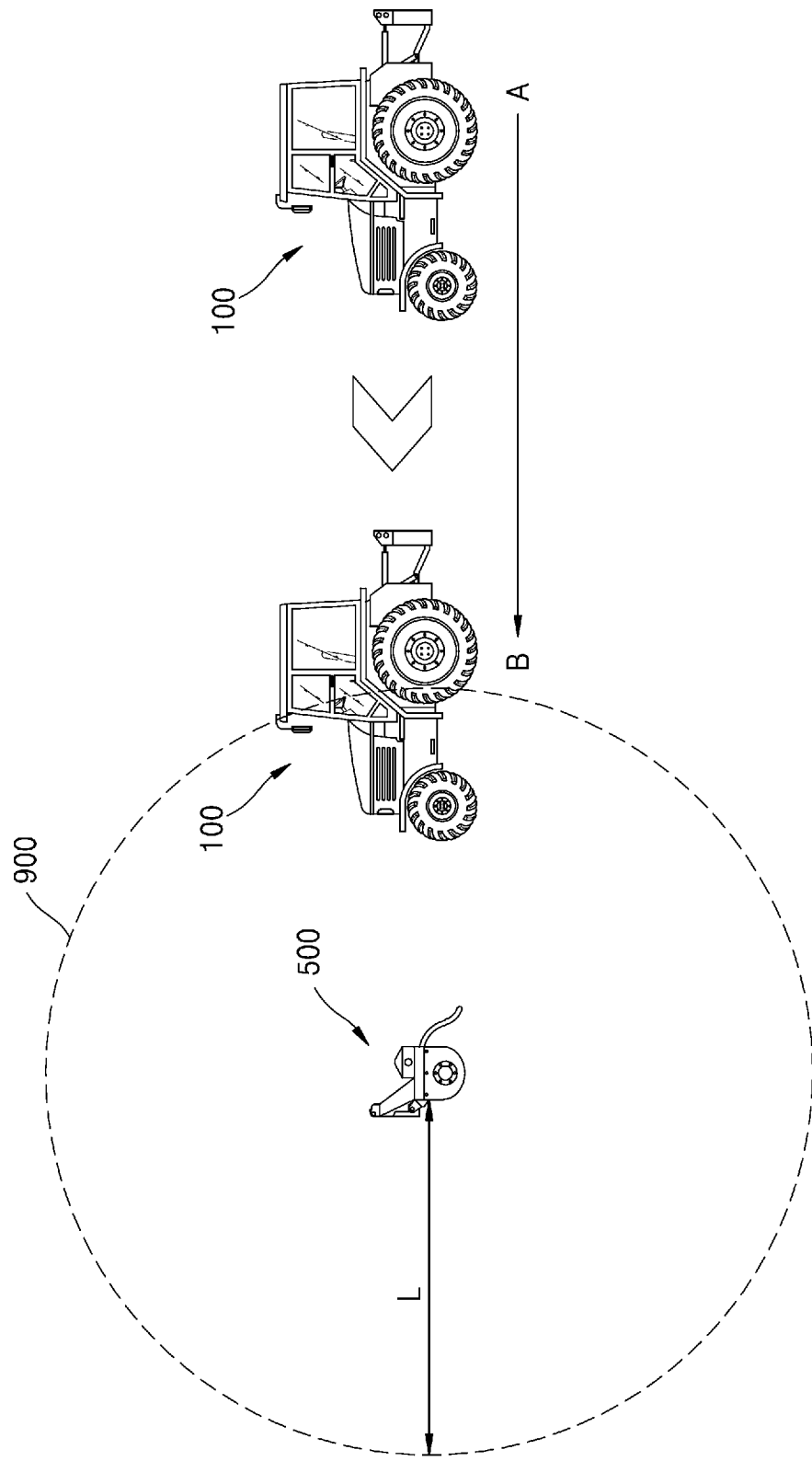
FIG. 9 is a view for describing an example in which the farm vehicle according to an embodiment moves.

FIG. 9 is a view for describing an example in which the farm vehicle according to an embodiment moves.

Referring to FIG. 9, in order for the farm vehicle 100 to be combined with the work machine 500, the farm vehicle 100 moves from position A to position B. Here, position B refers to a position on a range 900 having a radius L about the work machine 500.

The work machine 500 may be positioned in a variety of postures due to situations when separated from the farm vehicle 100 and a change in external environment (e.g., an influence of wind, a collision with other objects, or the like) after the separation. In order for the farm vehicle 100 to be combined with the work machine 500, the farm vehicle 100 needs to move and adjust a posture thereof so that the coupling unit 140 and the coupling unit 520 are aligned in a correct position.

The range 900 shown in FIG. 9 is a minimum range necessary for the farm vehicle 100 to move and adjust a posture thereof so that the coupling unit 140 and the coupling unit 520 are aligned in the correct position. For example, the range 900 may be previously set according to the type of the work machine 500, the steerable range of the farm vehicle 100, and the like.

The processor 160 confirms the current position of the work machine 500 and controls the steering device 130 and the traveling device 150 to move the farm vehicle 100 to position B on the previously stored range 900.

Referring to FIG. 7 again, in operation 730, the processor 160 controls the farm vehicle 10 or 100 so that the first coupling unit 520 and the second coupling unit 140 that is included in the farm vehicle 10 or 100 may be coupled on the basis of the current position and direction of the first coupling unit 520 included in the work machine 500.

For example, the processor 160 may determine an aligned state of the first coupling unit 520 and the second coupling unit 140 on the basis of the current position and direction of the first coupling unit 520. Specifically, the processor 160 may determine the aligned state of the first coupling unit 520 and the second coupling unit 140 on the basis of a separation distance between at least one point included in the first coupling unit 520 and at least one point included in the second coupling unit 140.

Meanwhile, although not illustrated in FIG. 7, the processor 160 may determine whether the first coupling unit 520 is coupled to the second coupling unit 140 on the basis of a current state of the first coupling unit 520.

Hereinafter, examples of determining the aligned state of the first coupling unit 520 and the second coupling unit 140 by the processor 160 will be described with reference to FIGS. 10 to 12. In addition, an example of determining whether the first coupling unit 520 is coupled to the second coupling unit 140 by the processor 160 will be described with reference to FIG. 13.

Figure 10:
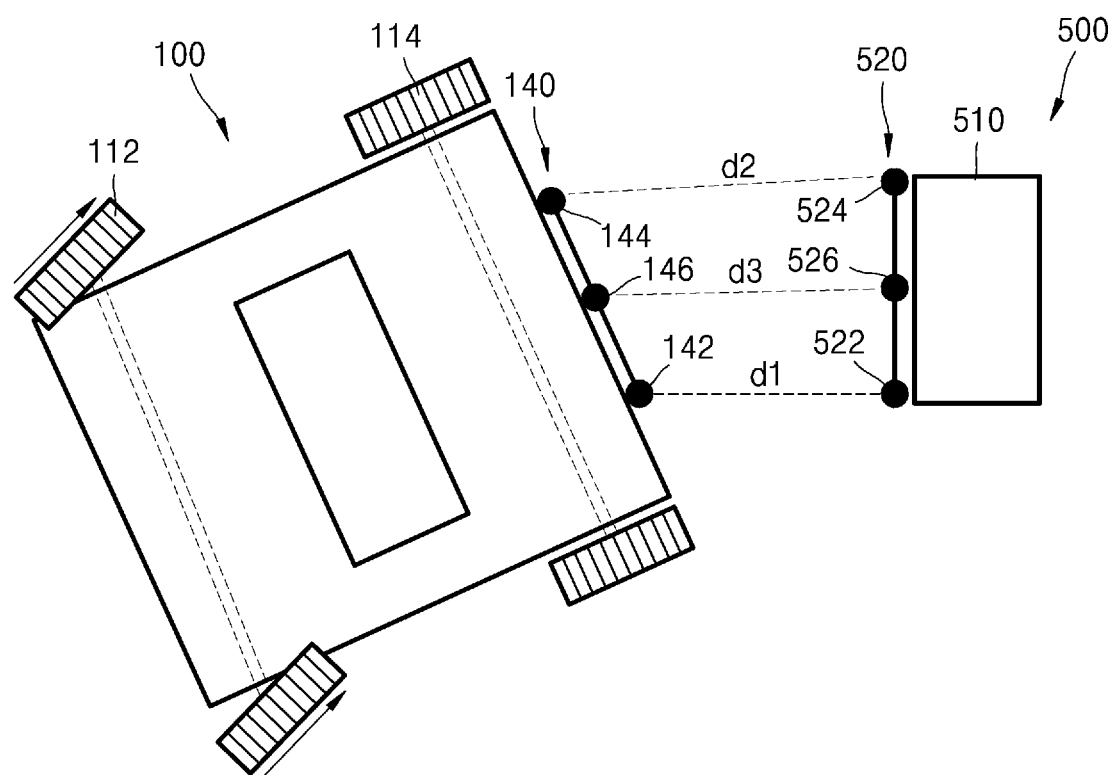
FIGS. 10 and 11 are views for describing an example in which the processor according to an embodiment determines an aligned state of a first coupling unit and a second coupling unit, and the farm vehicle is combined with the work machine.
Figure 11:
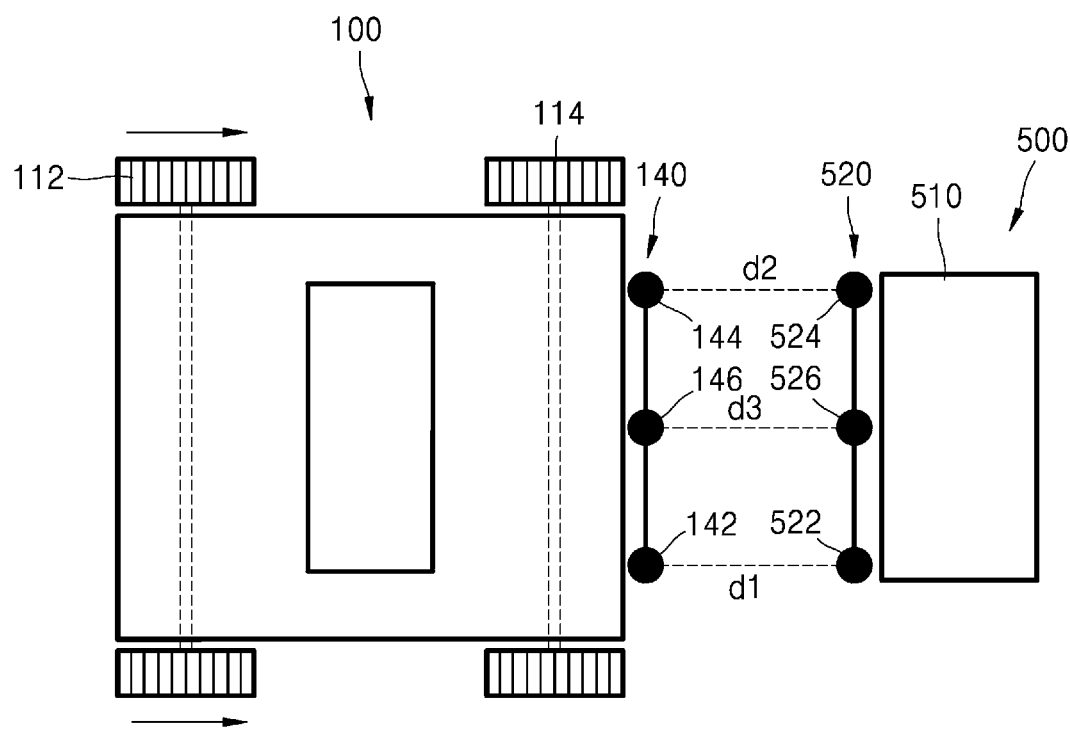

FIGS. 10 and 11 are views for describing an example in which the processor according to an embodiment determines an aligned state of the first coupling unit and the second coupling unit, and the farm vehicle is combined with the work machine.

Referring to FIG. 10, the processor 160 may measure a first separation distance d1 between a first point 142 of the second coupling unit 140 and a third point 522 of the first coupling unit 520 and a second separation distance d2 between a second point 144 of the second coupling unit 140 and a fourth point 524 of the first coupling unit 520 by using a distance measuring sensor (hereinafter, referred to as a "distance sensor").

Referring to FIG. 10, the first point 142 of the second coupling unit 140 and the third point 522 of the first coupling unit 520 are coupling points at which coupling elements, which are disposed at positions opposite to each other and coupled to each other, positioned. In addition, the second point 144 of the second coupling unit 140 and the fourth point 524 of the first coupling unit 520 are coupling points at which coupling elements, which are disposed at positions opposite to each other and coupled to each other, positioned.

For example, the distance sensor may include a transmission unit disposed at the first point 142 of the second coupling unit 140 and a receiving unit disposed at the third point 522 of the first coupling unit 520. In addition, the distance sensor may include a transmission unit disposed at the second point 144 of the second coupling unit 140 and a receiving unit disposed at the fourth point 524 of the first coupling unit 520. However, in addition to the method described above, other devices capable of measuring the first separation distance d1 and the second separation distance d2 may be employed as the distance sensor without limitation.

In addition, the processor 160 may determine the aligned state of the second coupling unit 140 and the first coupling unit 520 on the basis of the first separation distance d1 and the second separation distance d2.

In general, the second coupling unit 140 and the first coupling unit 520 may be coupled through a three-point connection, and for this, coupling of lower two points among the three points must be made first. Accordingly, in order to connect the lower two points among the three points, the processor 160 may control the traveling of the farm vehicle 100 so that the first point 142 and the second point 144 of the second coupling unit 140 may be respectively aligned with the third point 522 and the fourth point 524 of the first coupling unit 520.

Referring to FIG. 10, when the second coupling unit 140 and the first coupling unit 520 are not parallel to each other and the first separation distance d1 and the second separation distance d2 are different from each other, the processor 160 may determine that the second coupling unit 140 and the first coupling unit 520 are in an aligned state in which coupling is not possible.

Referring to FIG. 11, when the second coupling unit 140 and the first coupling unit 520 are parallel to each other and the first separation distance d1 and the second separation distance d2 are the same, the processor 160 may determine that the second coupling unit 140 and the first coupling unit 520 are in an aligned state in which coupling is possible.

Meanwhile, depending on a design of the second coupling unit 140 and the first coupling unit 520, when the second coupling unit 140 and the first coupling unit 520 are aligned in parallel, the first separation distance d1, the second separation distance d2, and a third separation distance d3 may be identical. In this case, the processor 160 may determine the aligned state of the first coupling unit 520 and the second coupling unit 140 on the basis of the third separation distance d3.

The processor 160 may measure the third separation distance d3 between a fifth point 146 between the first point 142 and the second point 144 of the second coupling unit 140 and a sixth point 526 between the third point 522 and the fourth point 524 of the first coupling unit 520. For example, the distance sensor may include a transmission unit disposed at the fifth point 146 and a receiving unit disposed at the sixth point 526.

When the first separation distance d1, the second separation distance d2, and the third separation distance d3 are identical, the processor 160 may determine that the second coupling unit 140 and the first coupling unit 520 are in a parallel state and in the aligned state in which coupling is possible. In addition, when at least one of the first separation distance d1, the second separation distance d2, and the third separation distance d3 is not identical with the remaining one, the processor 160 may determine that the second coupling unit 140 and the first coupling unit 520 are in the aligned state in which coupling is not possible.

Meanwhile, the processor 160 may output information about the aligned state of the first coupling unit 520 and the second coupling unit 140 through a notification unit included in the farm vehicle 100. Specifically, the processor 160 may notify the user that the second coupling unit 140 and the first coupling unit 520 are in the aligned state in which coupling is not possible or in the aligned state in which coupling is possible through the notification unit.

Accordingly, the processor 160 may control the traveling of the farm vehicle 100 so that the first point 142 is coupled to the third point 522 at the correct position, and the second point 144 is coupled to the fourth point 524 at the correct position.

Referring to FIG. 10, when the first separation distance d1 and the second separation distance d2 are not identical with each other, the processor 160 may determine a backward traveling direction of the farm vehicle 100 in a direction that reduces the difference between the first separation distance d1 and the second separation distance d2.

When the second separation distance d2 is greater than the first separation distance d1, the processor 160 determines the backward traveling direction of the farm vehicle 100 in a direction in which the second separation distance d2 is reduced, thereby determining a steering direction of the front wheel 112 of the farm vehicle 100.

Referring to FIG. 11, when the first separation distance d1 and the second separation distance d2 are identical, the processor 160 may determine the backward traveling direction of the farm vehicle 100 in a direction corresponding to an extending direction of the farm vehicle 100. The processor 160 may determine the steering direction of the front wheel 112 such that the front wheel 112 and the rear wheel 114 of the farm vehicle 100 are parallel to each other.

Figure 12:
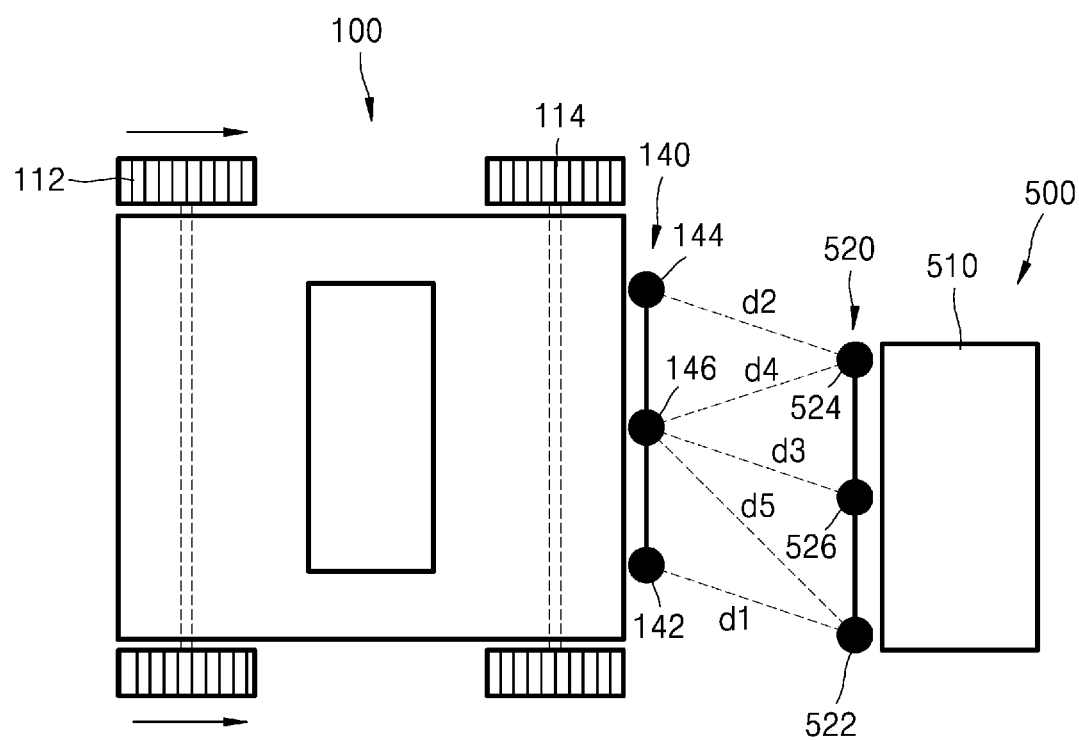
FIG. 12 is a view for describing another example in which the processor according to an embodiment determines an aligned state of the first coupling unit and the second coupling unit, and the farm vehicle is combined with the work machine.

FIG. 12 is a view for describing another example in which the processor according to an embodiment determines an aligned state of the first coupling unit and the second coupling unit, and the farm vehicle is combined with the work machine.

Referring to FIG. 12, even when the first separation distance d1 and the second separation distance d2 are identical, the second coupling unit 140 and the first coupling unit 520 may be biased toward one side and thus may be placed in an aligned state in which coupling is not possible.

In this case, the processor 160 may determine the aligned state of the second coupling unit 140 and the first coupling unit 520 on the basis of a fifth separation distance d5 between the fifth point 146 of the second coupling unit 140 and the third point 522 of the first coupling unit 520 and a fourth separation distance d4 between the fifth point 146 of the second coupling unit 140 and the fourth point 524 of the first coupling unit 520.

The processor 160 may measure the fourth separation distance d4 and the fifth separation distance d5 using a distance sensor. For example, the distance sensor may include a light-emitting unit disposed at the fifth point 146, a first light-receiving unit disposed at the third point 522, and a second light-receiving unit disposed at the fourth point 524.

The fifth point 146 is an intermediate point between the first point 142 and the second point 144. The sixth point 526 is an intermediate point between the third point 522 and the fourth point 524. Accordingly, when the fourth separation distance d4 and the fifth separation distance d5 are identical, the processor 160 may determine that the second coupling unit 140 and the first coupling unit 520 are in an aligned state, in which coupling is possible, without being biased toward one side.

Thereafter, the processor 160 may determine the backward traveling direction of the farm vehicle 100 in a direction identical to the extending direction of the farm vehicle 100. The processor 160 may determine the steering direction of the front wheel 112 such that the front wheel 112 and the rear wheel 114 of the farm vehicle 100 are parallel to each other.

When the fourth separation distance d4 and the fifth separation distance d5 are not identical, the processor 160 may determine that the second coupling unit 140 and the first coupling unit 520 are in states in which coupling is not possible. The processor 160 may determine the backward traveling direction of the farm vehicle 100 and the steering direction of the front wheel 112 in a direction that reduces the difference between the fourth separation distance d4 and the fifth separation distance d5.

As described above with reference to FIGS. 10 to 12, the processor 160 may determine whether the first coupling unit 520 may be coupled to the second coupling unit 140 on the basis of the separation distances between the first coupling unit 520 and the second coupling unit 140. In addition, the processor 160 may confirm the current state of the work machine 500 through a camera included in the farm vehicle 100, and determine whether the first coupling unit 520 may be coupled to the second coupling unit 140.

Figure 13:
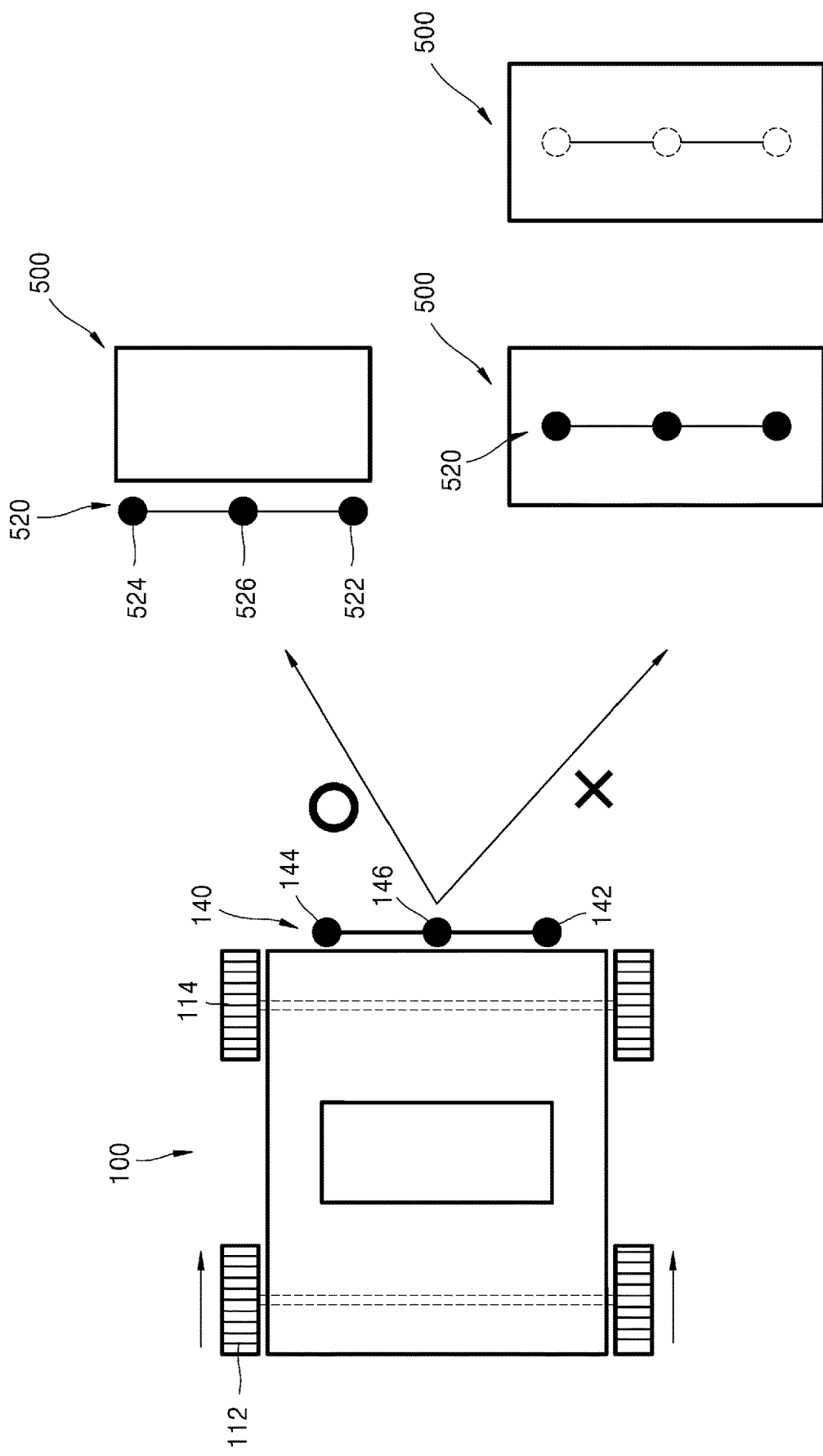
FIG. 13 is a view for describing an example of determining whether the first coupling unit may be coupled to the second coupling unit by the processor according to an embodiment.

FIG. 13 is a view for describing an example of determining whether the first coupling unit may be coupled to the second coupling unit by the processor according to an embodiment.

Referring to FIG. 13, the processor 160 may confirm the current state of the work machine 500 through a camera. For example, the camera may be disposed adjacent to the second coupling unit 140, and thus, what the first coupling unit 520 will look like may be confirmed from a view of the second coupling unit 140.

In order for the first coupling unit 520 the second coupling unit 140 to be coupled to each other, the first coupling unit 520 and the second coupling unit 140 should face to each other. As shown in FIG. 13, when the first coupling unit 520 and the second coupling unit 140 face each other, the processor 160 determines that the first coupling unit 520 may be coupled to the second coupling unit 140. At this point, the processor 160 confirms the separation distances according to the contents described above with reference to FIGS. 10 to 12, and controls the traveling of the farm vehicle 100.

When the first coupling unit 520 is facing upward or downward as in the view in the right lower end of FIG. 13, it is difficult to couple the first coupling unit 520 to the second coupling unit 140. In this case, the processor 160 determines that the first coupling unit 520 may not be coupled to the second coupling unit 140.

The processor 160 may inform the user that the second coupling unit 140 and the first coupling unit 520 are in states, in which coupling is not possible or coupling is possible, through the notification unit.

Figure 14:
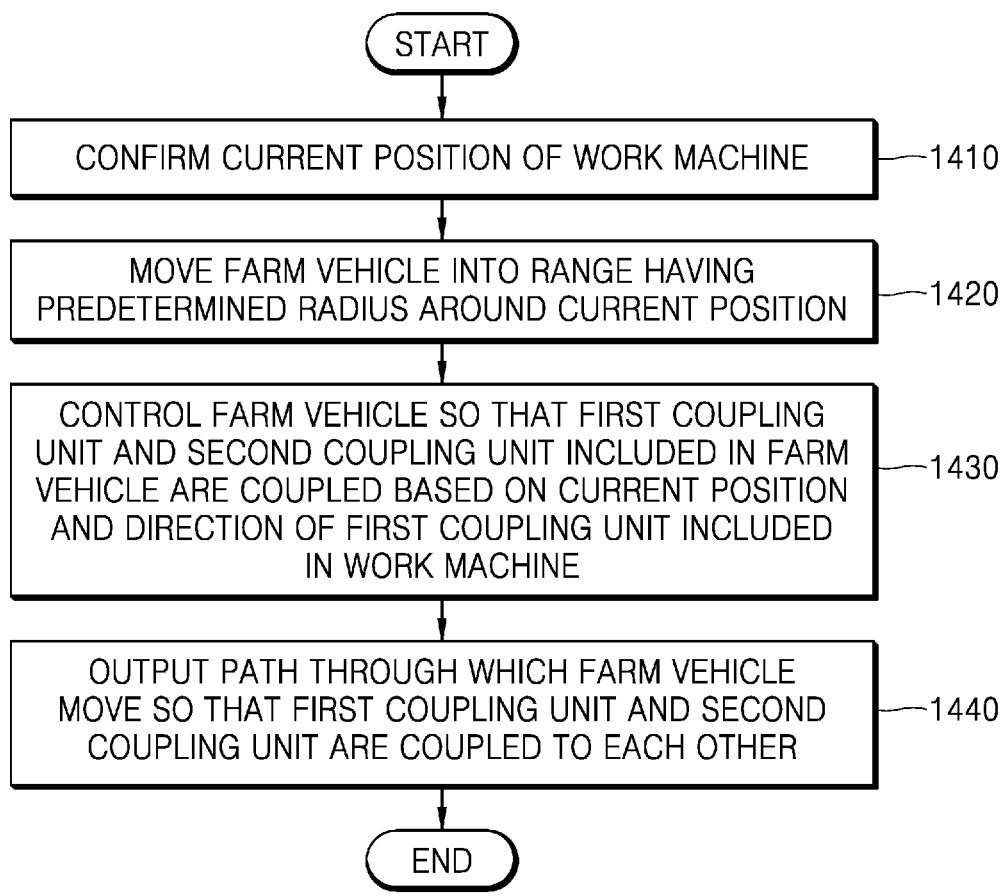
FIG. 14 is a flowchart illustrating another example of a method of automatically combining the farm vehicle and the work machine according to an embodiment.

FIG. 14 is a flowchart illustrating another example of a method of automatically combining the farm vehicle and the work machine according to an embodiment.

Referring to FIG. 14, the method of automatically combining the farm vehicle and the work machine includes operations processed in time series by the farm vehicle 10 or 100 illustrated in FIGS. 1 to 13. Accordingly, it may be seen that the contents described above with respect to the farm vehicles 10 and 100 shown in FIGS. 1 to 13 are also applied to the method of automatically combining the farm vehicle and the work machine of FIG. 14 even when the contents are omitted below.

Operations 1410 to 1430 of FIG. 14 correspond to operations 710 to 730 of FIG. 7. Accordingly, detailed descriptions of operations 1410 to 1430 will be omitted.

In operation 1440, the processor 160 outputs a path through which the farm vehicle 10 or 100 moves so that the first coupling unit 520 and the second coupling unit 140 are coupled to each other.

For example, the processor 160 may add the path, through which the farm vehicle 10. or 100 moves, to an image captured through the camera of the farm vehicle 10 or 100 and output the image to which the path is added through a display.

Figure 15:
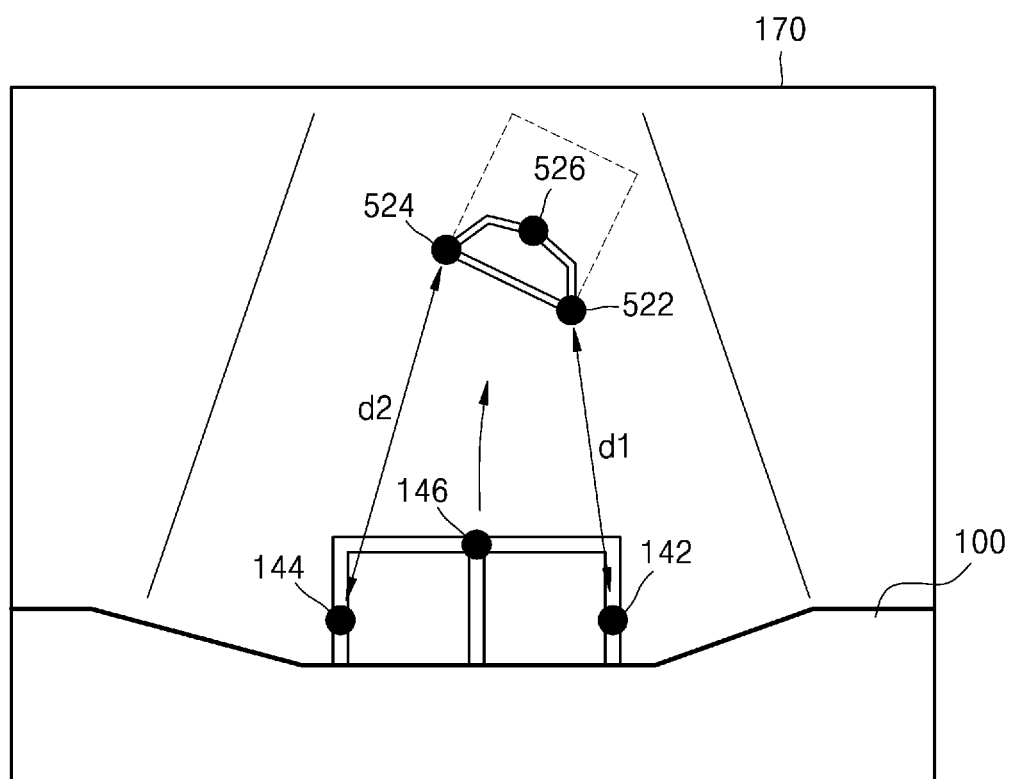
FIG. 15 is a view for describing an example of outputting a path through which the farm vehicle according to an embodiment moves.

FIG. 15 is a view for describing an example of outputting the path through which the farm vehicle according to an embodiment moves.

Referring to FIG. 15, the processor 160 may visually display that the second coupling unit 140 and the first coupling unit 520 are coupled to each other through a display 170.

The processor 160 may capture an image related to a process in which the first coupling unit 520 and the second coupling unit 140 are coupled to each other using the camera. In addition, the processor 160 may output the captured image through the display 170.

Alternatively, the processor 160 may add a path, through which the farm vehicle 100 should move, to the image on the basis of the separation distances between each of the points of the second coupling unit 140 and each of the points of the first coupling unit 520 measured using the distance sensor. In addition, the processor 160 may output the image to which the path is added through the display 170.

For example, the processor 160 may display information about an aligned state of the first coupling unit 520 and the second coupling unit 140 and information about traveling of the farm vehicle 100 through the display 170. The processor 160 may display changes in the separation distances d1 and d2, which may occur as the farm vehicle 100 travels, respectively between the points 142 and 144 of the second coupling unit 140 of the farm vehicle 100 and the points 522 and 524 of the first coupling unit 520 through the display 170.

Figure 16:
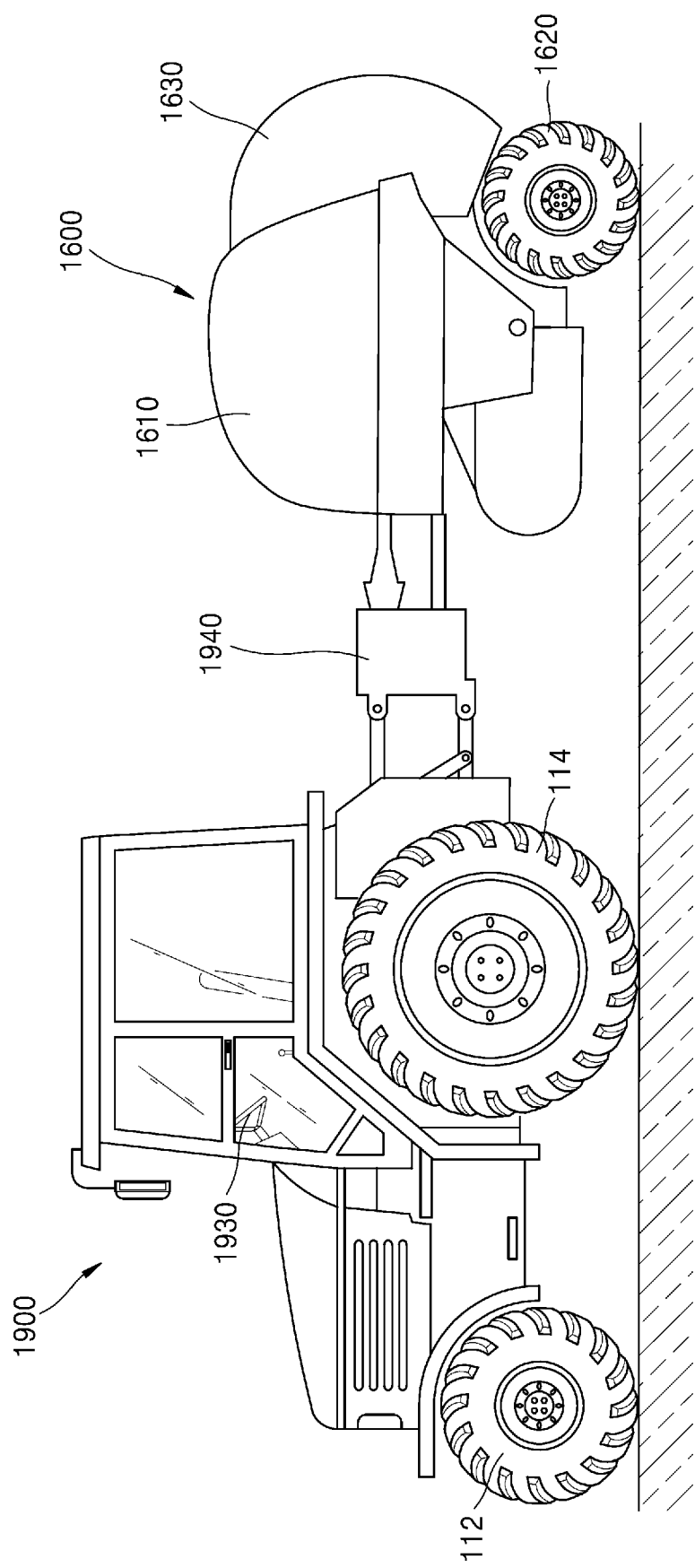
FIG. 16 is a view illustrating an example of a farm vehicle to which a work machine according to an embodiment is mounted.

FIG. 16 is a view illustrating an example of a farm vehicle to which a work machine according to an embodiment is mounted.

Referring to FIG. 16, a farm vehicle 1900 may perform a farming work or a civil engineering work while towing a work machine 1600. The farm vehicle 1900 may provide a strong towing force to tow a heavy object, and may provide a plurality of gear-shifting stages to perform various works.

For example, the farm vehicle 1900 may be a tractor. In addition, in an example of the disclosure, the work machine 1600 may be a baler. When the work machine 1600 combined with the farm vehicle 1900 is a baler, the work machine 1600 may perform a farming work of collecting and compressing hay to generate a bale.

In another example, the work machine 1600 may include mechanisms configured to perform various farming works, such as, a spade, a plow, a harrow, a rake, a rotavator, and a harvester. The farm vehicle 1900 may be combined with the work machine 1600 through a coupling unit 1940. However, the present disclosure is not necessarily limited thereto, and depending on the type of the work machine 1600, the farm vehicle 1900 may perform various farming works such as tillage, soil crushing and disease and pests, water pumping, threshing, and the like. For example, the coupling unit 1940 may be positioned on a rear surface of the farm vehicle 1900, but the present disclosure is not limited thereto. In other words, the coupling unit 1940 may be positioned such that the work machine 1600 is combined with the farm vehicle 1900 at a position that does not interfere with the driving and working of the farm vehicle 1900.

The coupling unit 1940 is coupled to a coupling device of the work machine 1600 so that a towing force of the farm vehicle 1900 may be transmitted to the work machine 1600. For example, the coupling unit 1940 may be a three-point connection device, and may include two lower links and one upper link, but the present disclosure is not limited thereto.

The coupling unit 1940 may adjust a height of the work machine 1600 mounted on the coupling unit 1940 by being raised or lowered according to a manual operation of the operator 30 or an automatic control of the farm vehicle 1900.

The work machine 1600 may include a body 1610 that performs work on land or farm products while being towed by the farm vehicle 1900, and the coupling device that is coupled to the coupling unit 1940. The coupling device of the work machine 1600 may be disposed on a front side of the work machine 1600 and may be coupled to the coupling unit 1940. In addition, the coupling device may include a plurality of coupling points corresponding to those of the coupling unit 1940. For example, when the coupling unit 1940 is a three-point connection device, the coupling device may include three coupling points, and when the coupling unit 1940 is a two-point connection device, the coupling device may include two coupling points. In addition, the coupling unit 1940 and the coupling device may each include a transmission line through which a command for controlling the work machine 1600 by the farm vehicle 1900 is transmitted.

The farm vehicle 1900 according to an embodiment may control components included in the farm vehicle 1900 so that the work machine 1600 is accurately combined therewith due to the coupling unit 1940. Specifically, a processor of the farm vehicle 1900 may control elements of the farm vehicle 1900 so that the coupling unit 1940 may be coupled to the coupling device of the work machine 1600 on the basis of a current position of the work machine 1600, and a current position and direction of the coupling device.

Meanwhile, as described above, the work machine 1600 combined with the farm vehicle 1900 due to the coupling unit 1940 may be a baler 1600. The baler 1600 is a work machine for collecting hay, and may collect and compress harvested hay. The compressed hay is referred to as a bale, and the baler may be a hay baler. In the embodiment of FIG. 16, the work machine 1600 may include the body 1610 for collecting and compressing hay to generate a bale, a wheel 1620, which is moved by towing power of the farm vehicle 1900, and an discharge port 1630 through which the bale is discharged. According to an embodiment, the baler 1600 may be a plunger baler for binding hay into a rectangular parallelepiped shape or a round baler for binding hay into a cylindrical shape. Hereinafter, the baler 1600 may be described as an example of the work machine.

More specifically, the body 1610 of the baler 1600 may perform a work of collecting and compressing hay to generate a bale. To this end, although not clearly distinguished and shown in the embodiment described with reference to FIG. 16, the body 1610 may include a pickup device, a transfer auger, a bale chamber, a plunger, and a binding device. The pickup device of the body 1610 may lift hay and transfer the lifted hay to the bale chamber using the transfer auger. The hay transferred to the bale chamber is compressed by a reciprocating plunger, and a compression density may be adjusted by a tension bar in the chamber. In addition, when a length of the bale is adjusted by a bale length measuring wheel and the bale is molded to a predetermined length, the bale is bound by the binding device, and at this point, a twine knotter may be additionally provided to prevent a binding string from being loosened. The generated bales are sequentially pushed to the rear of the baler 1600, and may be discharged when the discharge port 1630 is open.

According to an embodiment, the farm vehicle 1900 may control operations of the baler 1600, which is a work machine coupled due to the coupling unit 1940. For example, when the baler 1600 has a separate power source, the farm vehicle 1900 may control the movement of the baler by controlling the corresponding power source to move the wheel 1620. In addition, the process of collecting and compressing hay to generate a bale may be controlled in the body 1610 of the baler 1600. In addition, when the generation of the bale is completed, the opening and closing of the discharge port 1630 may be controlled so that the bale is discharged through the discharge port 1630.

Figure 17:
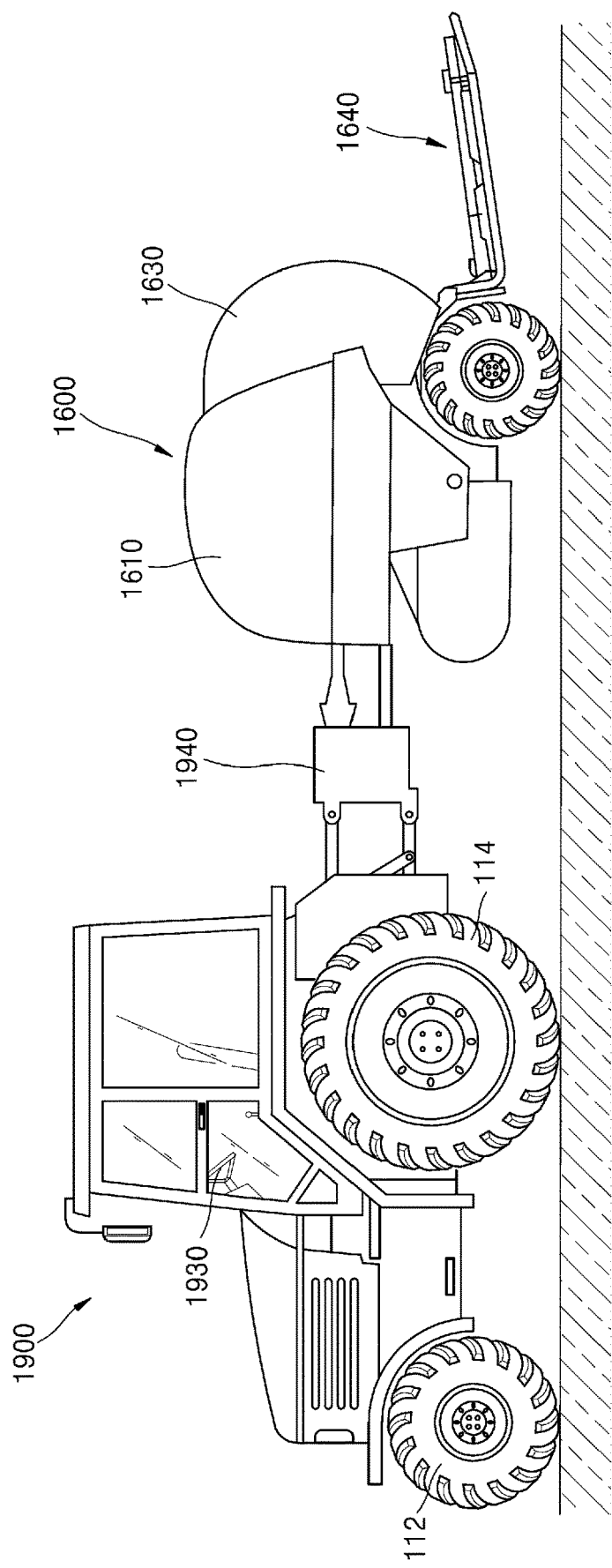
FIG. 17 is a view illustrating another example of a farm vehicle to which a work machine according to an embodiment is mounted.

FIG. 17 is a view illustrating another example of a farm vehicle to which a work machine according to an embodiment is mounted.

FIG. 17 illustrates a modified example of the embodiment of FIG. 16, and thus, descriptions of overlapping configurations and concepts will be omitted. FIG. 17 illustrates an example of a configuration in which the work machine combined with the farm vehicle 1900 is the baler 1600 similar to FIG. 16. In this case, the baler 1600 of the embodiment of FIG. 17 may additionally include a transfer unit 1640. At this point, the transfer unit 1640 may include a transfer rail so that the bale discharged by the opening of the discharge port 1630 is transferred. The transfer unit 1640 may be a bale chute or a bale thrower, and the operation of loading the bale discharged from the discharge port 1630 on a bale transport vehicle may be automated. Alternatively, the transfer unit 1640 may serve to transfer the bale so that a bale loader mounted in the bale transport vehicle may more easily collect the bale.

Figure 18:
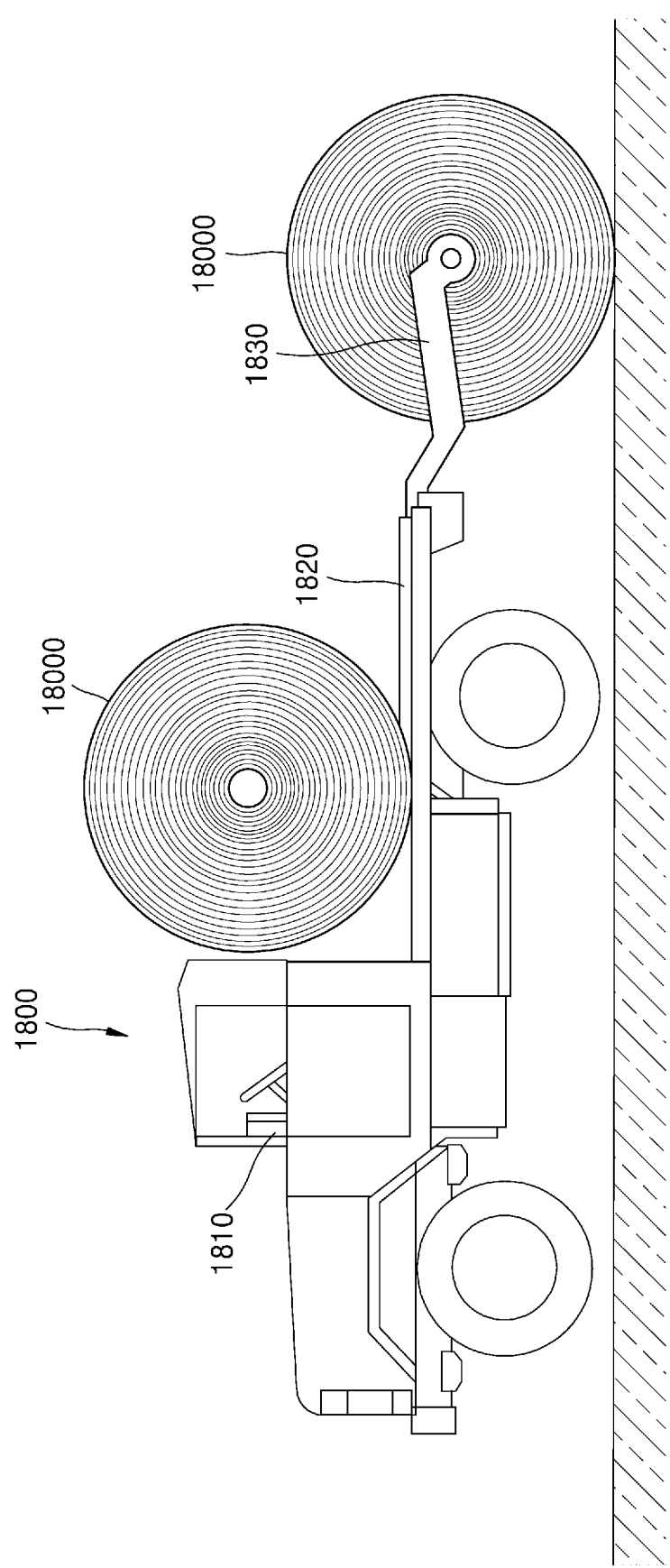
FIG. 18 is a view illustrating an example of a bale transport vehicle according to an embodiment.

FIG. 18 is a view illustrating an example of a bale transport vehicle according to an embodiment.

A bale transport vehicle 1800 of FIG. 18 may be a bale loader that collects and loads bales and transport the bales. The bale transport vehicle 1800 may include a traveling unit 1810, a loading unit 1820, and a lifting unit 1830. The traveling unit 1810 may include a steering device, and the traveling unit 1810 may receive an input for operating the bale transport vehicle 1800. In an embodiment, the traveling unit 1810 may include a steering device controlled under direct human control or may include a steering device controlled by a control command from the farm vehicle 1900. That is, the traveling unit 1810 may receive an input by human related to steering of the bale transport vehicle 1800 and may receive a command related to steering and driving from the farm vehicle 1900.

In addition, the bale transport vehicle 1800 may lift a bale 18000 on the ground and load the bale 18000 on the loading unit 1820 by using the lifting unit 1830. In another embodiment, the lifting unit 1830 may lift the bale 18000 placed on the transfer unit of the the bale transport vehicle 1800 and load the bale 18000 on the loading unit 1820. The loading unit 1820 is a space, in which a bale is loaded, in the bale transport vehicle 1800, and may be provided in a closed form so that the loaded bale does not fall therefrom. Although an example in which only one bale 18000 is loaded on the loading unit 1820 is illustrated in the embodiment of FIG. 18, the size of the loading unit 1820 may be variously provided, and a plurality of bales 18000 may be loaded. It will be appreciated by those of ordinary skill in the art that, in FIG. 18, only components of the bale transport vehicle 1800 related to the present embodiment are illustrated and other general components not illustrated in FIG. 18 may be included in the bale transport vehicle 1800.

Further, in an embodiment, the bale transport vehicle 1800 and the farm vehicle 1900 are separate vehicles, but driving and working operations of the bale transport vehicle 1800 may be controlled by the farm vehicle 1900. Accordingly, in the following description, the farm vehicle 1900 may be referred to as a master vehicle, and the bale transport vehicle 1800 may be referred to as a slave vehicle. Hereinafter, components included in the farm vehicle 1900 and the bale transport vehicle 1800 will be described with reference to FIG. 19, and a method of controlling the bale transport vehicle 1800 by the farm vehicle 1900 will be described.

Figure 19:
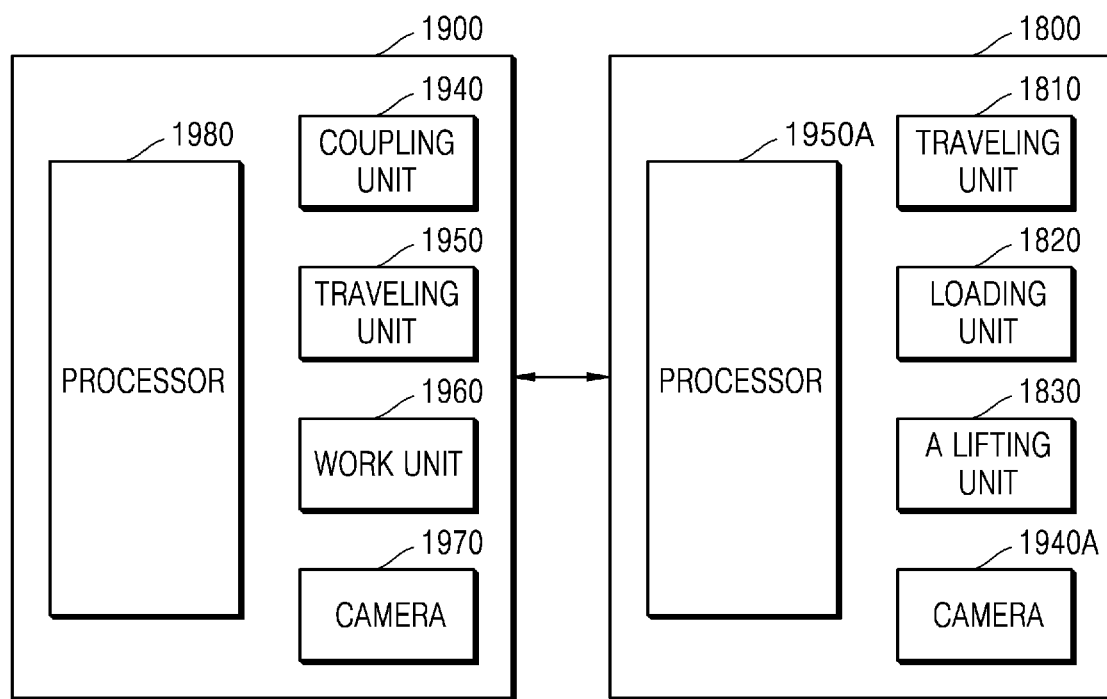
FIG. 19 is a diagram for describing an example of a configuration of a farm vehicle and a bale transport vehicle according to an embodiment.

FIG. 19 is a diagram for describing an example of a configuration of a farm vehicle and a bale transport vehicle according to an embodiment.

Referring to FIG. 19, a farm vehicle 1900 includes a coupling unit 1940, a traveling unit 1950, a work unit 1960, a camera 1970, and a processor 1980. In addition, a bale transport vehicle 1800 includes a traveling unit 1810, a loading unit 1820, a lifting unit 1830, and a camera 1940A. In the farm vehicle 1900 and the bale transport vehicle 1800 illustrated in FIG. 19, only components related to the present embodiment are illustrated. Accordingly, it will be understood by those of ordinary skill in the art that other general components may be further included in the farm vehicle 1900 in addition to the components illustrated in FIG. 19.

The traveling unit 1950 may receive and process an input for controlling driving of the farm vehicle 1900. For example, the traveling unit 1950 may include a lever, a steering wheel, a button, a touch screen, and the like. As an example, the traveling unit 1950 may receive an input related to steering of the farm vehicle 1900 from the operator 30 through a steering device 130, an input related to a gear-shifting stage of the farm vehicle 1900, and the like. As another example, the farm vehicle 1900 may perform steering and gear-shifting by automatically controlling the steering device 130. In addition, the traveling unit 1950 may move a vehicle body using power transmitted from a transmission device. As an example, a traveling device of the traveling unit 1950 may include a rear wheel 112, a front wheel 114, and an axle.

The farm vehicle 1900 may confirm information about the coupling unit 1940. As an example, the farm vehicle 1900 may receive information about a model related to the work machine 1600, which is connected thereto due to the coupling unit 1940, and information about the shape and numerical value of a coupling device connected to the coupling unit 1940. As another example, the farm vehicle 1900 may analyze an image of the work machine 1600 captured by the camera 1970 and read information about the manufacturer and model of the work machine 1600, and information about the shape and numerical value of the coupling device connected to the coupling unit 1940 from a storage unit.

The work unit 1960 controls the driving and working of the work machine 1600 connected to the coupling unit 1940 of the farm vehicle 1900. As described above, the work machine 1600 may be a baler, and the work unit 1960 may control the entire process of the baler for collecting and compressing hay to generate a bale and discharging the bale. In an embodiment, the work unit 1960 may use the camera 1970 to control a process in which the baler generates a bale in the body 1610, and may obtain and control a time point and position at which the bale is discharged.

The processor 1980 controls all components included in the farm vehicle 1900. The processor 1980 may control operations of all the components included in the farm vehicle 1900 as well as components included in the steering device 130, the coupling unit 1940, and the traveling unit 1950, so that the farm vehicle 1900 may perform driving, parking, working (e.g., a farming work, a civil engineering work, and the like), and the like.

For example, the processor 1980 may be implemented by an array of multiple logical gates, or may be implemented by a combination of a general-purpose micro processor and a memory storing a program that is executable by the micro processor. In addition, it will be appreciated by those skilled in the art that the present embodiment may be implemented in other forms of hardware.

In an embodiment, the processor 1980 may control autonomous driving of the farm vehicle. The processor 1980 may determine a driving mode of the farm vehicle as one of an autonomous driving mode or a manual driving mode. The autonomous driving mode is a mode that allows the farm vehicle to travel without the operation of a driver or a passenger. In the autonomous driving mode, the processor 1980 may monitor the traveling environment of the farm vehicle and control all aspects of the driving operation, and perform a response to an emergency situation. In addition, although not illustrated herein, the processor 1980 may allow the farm vehicle to perform all autonomous driving functions that a general autonomous vehicle performs. In addition, the manual driving mode is a mode in which the driver or passenger entirely controls all operations and manages all dynamic driving.

In addition, in an embodiment, the processor 1980 may control the driving and working of the bale transport vehicle 1800. When the work machine 1600 is a baler, the bale transport vehicle 1800, which collects and transports a discharged bale when the bale is discharged onto the ground, is required separately. In addition, a plurality of bale transport vehicles may be required in consideration of a bale generation speed, a bale collection speed, and a bale transport speed. Conventionally, since an operator who drives the bale transport vehicle 1800 was separately required, there is a problem in that an operator for performing a bale transport operation must be additionally input in addition to an operator for performing a bale generation operation in the farm vehicle 1900. Alternatively, when the number of operators is insufficient, there is a problem in that a working time is significantly increased because the farm vehicle 1900 generates all the bales and then the bales are collected at once again by the bale transport vehicle 1800. According to an embodiment of the present disclosure, the driving and working of the bale transport vehicle 1800 may be controlled by the processor 1980 to automatically collect, load, and transfer bales, so that no additional operator is required, thereby reducing costs and time.

More specifically, the bale transport vehicle 1800 may include the traveling unit 1810, the loading unit 1820, the lifting unit 1830, and the camera 1940A. The traveling unit 1810 basically has the same function as the traveling unit 1950 of the farm vehicle 1900 but has a feature of being automatically operated under the control of the farm vehicle 1900. The loading unit 1820 is a space in which the collected bale is loaded, as described above.

In addition, the lifting unit 1830 serves to lift bales present on the ground or on the transfer device and load the bales on the loading unit 1820. The lifting unit 1830 may obtain a position of the bale on the basis of a bale collection command of the farm vehicle 1900 and automatically collect the bale. At this point, the lifting unit 1830 may obtain all information about the position, shape, and direction of the bale from the farm vehicle 1900, and some information about the bale may be obtained by the camera 1940A of the bale transport vehicle 1800.

A processor 1950A may communicate with the processor 1980 of the farm vehicle 1900 and transmit control commands received from the farm vehicle 1900 to each of the devices. Hereinafter, the farm vehicle 1900 is referred to as a master vehicle and the bale transport vehicle 1800 is referred to as a slave vehicle, and a method of controlling one or more slave vehicles by the master vehicle will be described in detail.

First, the processor 1980 of the master vehicle establishes a communication connection with one or more slave vehicles.

Figure 20:
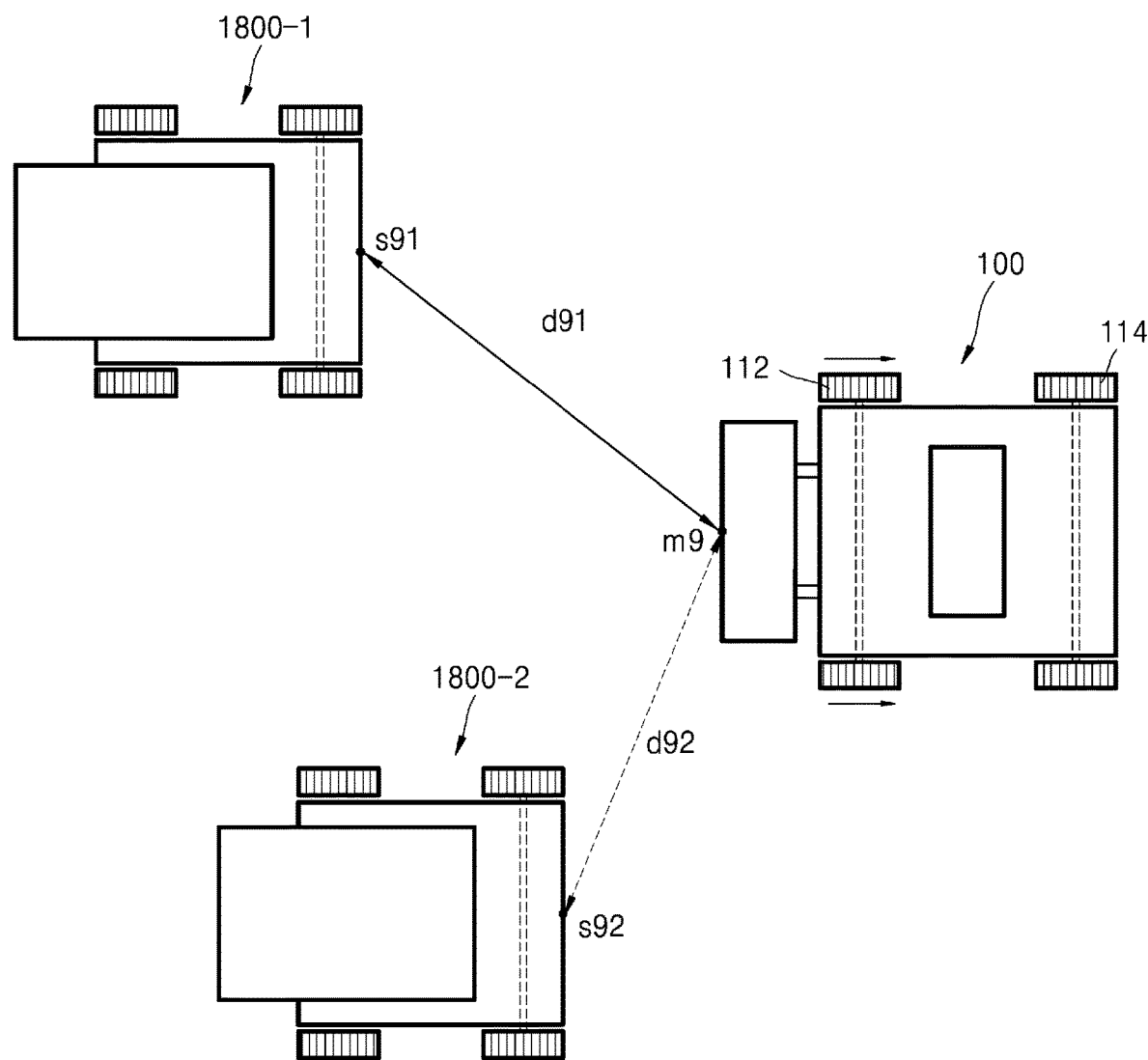
FIG. 20 is a view illustrating an example of a case in which there are a master vehicle and a plurality of slave vehicles according to an embodiment.

FIG. 20 is a view illustrating an example of a case in which there are a master vehicle and a plurality of slave vehicles according to an embodiment.

Referring to FIG. 20, a master vehicle 100 may establish communication connections with a first slave vehicle 1800-1 and a second slave vehicle 1800-2. The processor 1980 may detect slave vehicles, which are present in a predetermined radius around the master vehicle 100 and establish communication connections with the corresponding slave vehicles. In another embodiment, the processor 1980 may detect slave vehicles positioned in a predetermined work space and establish communication connections with the corresponding slave vehicles. When the processor 1980 transmits a communication connection request to the slave vehicles 1800, the processor 1950A of each of the slave vehicles 1800 may transmit a response signal to the request to the master vehicle 100.

Next, the processor 1980 may obtain a current position of each of one or more slave vehicles that are communicatively connected thereto and determine a bale collection vehicle. More specifically, the processor 1980 may obtain a current position of each of the first slave vehicle 1800-1 and the second slave vehicle 1800-2 that are communicatively connected thereto.

To this end, the processor 1980 may determine a reference position of each of the master vehicle and the slave vehicles. This is because the size of the vehicle is large and it is necessary to first determine a reference position in order to set an accurate position. Accordingly, the processor 1980 may determine the reference position of each of the master vehicle 100 and the slave vehicles 1800.

In a more specific embodiment, the processor 1980 determines one point m9 of a rear portion of the master vehicle 100 including the work machine 1600 as a first position, which is the reference position of the master vehicle. In addition, the processor 1980 may determine one point s91 or s92 of a front portion of an nth slave vehicle as a second-nth position, which is the reference position. In this case, the second-nth position may have relative coordinates that are determined with respect to the first position. For example, a second-first position S91, which is the reference position of the first slave vehicle 1800-1, may be determined to be relative coordinates having coordinates of m9 as a zero point.

Next, the processor 1980 calculates a distance between the first position and the second-nth position to determine a current distance between the master vehicle and each of the slave vehicles. In an embodiment, among a plurality of slave vehicles, the closest slave vehicle having the closest distance to the master vehicle may be determined as a bale collection slave vehicle. For example, each of a distance d91 between m9, which is the first position, and s91, which is the second-first position and a distance d92 between the first position and s92, which is a second-second position, may be calculated, and the second slave vehicle 1800-2 positioned at a closer distance may be determined as a bale collection slave vehicle. Thus, even when there are the plurality of slave vehicles, the bale collection slave vehicle may be determined on the basis of the distance, so that it is possible to efficiently collect the bales.

Next, the processor 1980 may obtain a bale generation completion signal and determine a bale position corresponding to the bale generation completion signal. The bale generation completion signal may be a signal generated by detecting that a baler, which is mounted as the work machine of the master vehicle, has completed the generation of bales and discharged the bales through the discharge port. The processor 1980 may analyze an image signal received from the camera 1970 mounted to the master vehicle to obtain the bale generation completion signal.

As a more specific example, the processor 1980 may analyze the image signal of the camera 1970 to determine whether the discharge port of the baler is open or closed or the bale is discharged, thereby obtaining the bale generation completion signal. In an embodiment, when the discharge port is open as the bale generation operation is completed and transferred to the discharge port, the processor 1980 may detect this using the camera 1970 to obtain the bale generation completion signal. Alternatively, the processor 1980 may use the camera 1970 to detect that the bale is discharged to the outside of the baler to obtain the bale generation completion signal. As a result, by detecting the bale generation completion signal through the camera, it is possible to determine that there is a bale, which is required to be collected, even when there is no separate input.

Next, the processor 1980 may determine a position of the bale corresponding to the bale generation completion signal. In this case, the processor 1980 may determine one point of the bale in a space as a reference position of the bale to accurately determine the position of the bale. The reference position of the bale may be a third position determined relative to the first position, which is the reference position of the master vehicle 100, after the bale is discharged and stopped on the ground.

Figure 21:
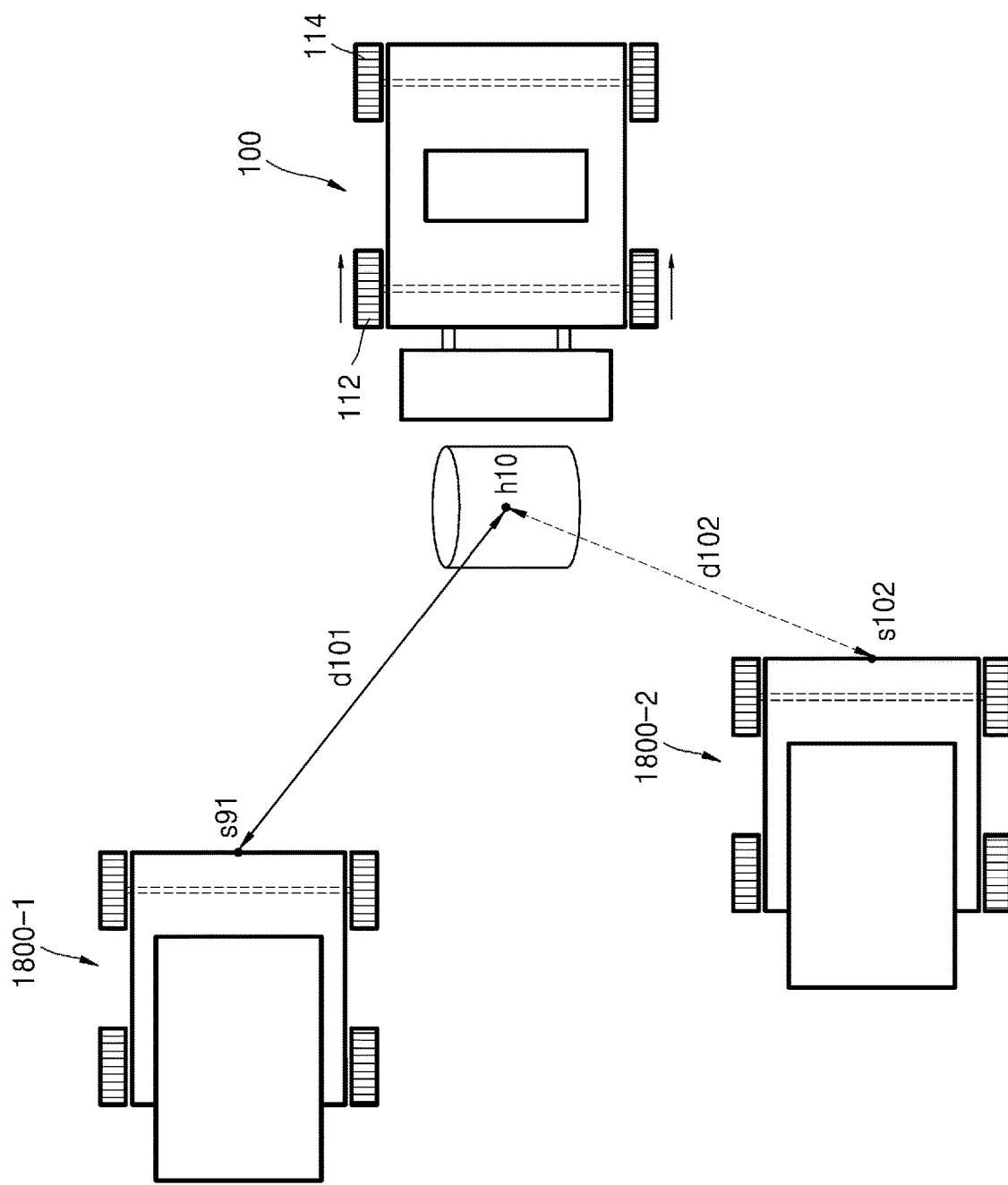
FIG. 21 is a view for describing a position of a discharged bale according to an embodiment.

FIG. 21 is a view for describing a position of a discharged bale according to an embodiment.

The embodiment of FIG. 21 is an embodiment subsequent to the embodiment of FIG. 20, and a description of a configuration overlapping with that of FIG. 20 will be omitted. When the master vehicle 100 generates and discharges a bale, the processor 1980 obtains a position of the bale. At this point, after detecting that the bale arrives at the ground and stops, the processor 1980 may determine one point of the bale determined relative to a first position, which is a reference position of the master vehicle, as a reference position of the bale. In the embodiment of FIG. 21, a case in which the center of gravity of the bale is determined as a third position h10, which is the reference position of the bale, is exemplified.

In addition, the processor 1980 determines a moving position of the bale collection slave vehicle corresponding to the position of the bale. As described in the example of FIG. 20, the second slave vehicle 1800-2 having a closer distance to the master vehicle 100 may be determined as the bale collection slave vehicle. The processor 1980 may determine the moving position of the second slave vehicle 1800-2 according to the position of the bale.

As a more specific example, in the embodiment of FIG. 21, the moving position of the second slave vehicle 1800-2 may be determined on the basis of the third position h10, which is the reference position of the bale. In an example, the moving position of the second slave vehicle 1800-2 may be a position at which the lifting unit 1830 of the slave vehicle may collect the bale present in the third position h10.

Next, the processor 1980 transmits a bale collection command including the moving position of the bale collection slave vehicle to the bale collection slave vehicle. In the embodiment of FIG. 21, the processor 1980 may transmit the bale collection command to the second slave vehicle 1800-2.

In a specific embodiment, the bale collection command may include shape information of the bale. More specifically, the bale collection command includes bale shape information including information about the shape and size of the bale of the baler mounted to the master vehicle. In addition, the bale shape information may be obtained using the camera 1970 mounted to the master vehicle. The bale shape information may include pieces of information necessary for the slave vehicle to collect the bale. For example, the slave vehicle may collect the bale when the slave vehicle has information such as whether the bale has a cylindrical shape or hexahedral shape, what size the bale is, or the like. Accordingly, the bale shape information necessary for the slave vehicle to collect the bale may be included in the bale collection command. The second slave vehicle 1800-2, which has received the bale collection command, may move to the moving position and collect the bale. As a result, a more accurate bale collection may be made by providing the shape information of the bale to be collected by the bale collection slave vehicle.

In an additional embodiment, the processor 1980 may include information about a stop position and pose of the bale collection slave vehicle, which is obtained on the basis of information about the shape, size, and placed direction of the bale, in the bale collection command. In order for the slave vehicle to easily collect the bale, the shape information such as the shape and size of the bale may be required as described above, and information about a placed direction may be additionally required.

This is because an arrangement direction of the bale may not match a traveling direction of the master vehicle or the slave vehicle since the bales fall irregularly onto the ground immediately after being discharged. Thus, on the basis of the traveling direction of the master vehicle, an angle at which the bale is positioned, that is, information about the placed direction of the bale, may be additionally obtained. For example, in the embodiment of FIG. 21, as direction information of the bale, it is possible to determine that an axis of the bale is placed at a position that is displaced by 90° with respect to the traveling direction (direct downward direction) of the master vehicle.

The processor 1980 may generate the moving position and pose information of the bale collection slave vehicle on the basis of the information about the placed direction of the bale. That is, the processor 1980 may determine pose information of the slave vehicle when the slave vehicle is stopped for bale collection so that the lifting unit 1830 of the bale collection slave vehicle may be correctly aligned according to the direction information of the bale. As a result, it is possible to collect the bales more accurately by determining even the pose of the bale collection slave vehicle when the bale collection slave vehicle performs the collection operation.

Next, the processor 1980 may determine a moving speed and direction of another slave vehicle other than the bale collection slave vehicle on the basis of a moving direction of the master vehicle. Since the master vehicle continuously moves to generate and discharge a next bale after discharging the bale, when another slave vehicle other than the bale collection slave vehicle that currently collects the bale moves in advance for a subsequent bale collection operation, the efficiency of the bale collection operation may be increased.

Figure 22:
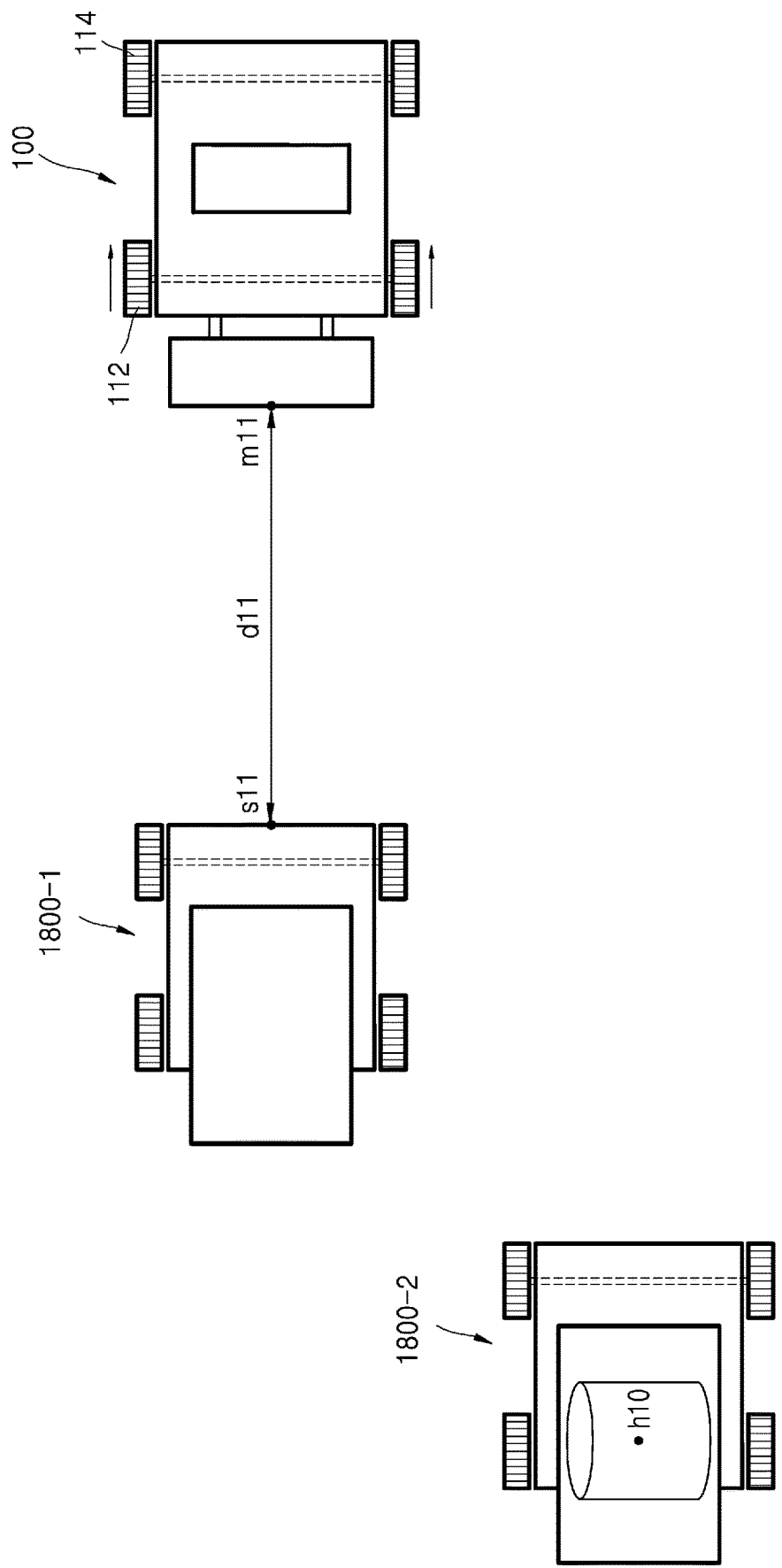
FIG. 22 is a view illustrating an example of the movement of a slave vehicle other than a bale collection slave vehicle.

FIG. 22 is a view illustrating an example of the movement of the slave vehicle other than the bale collection slave vehicle.

The embodiment of FIG. 22 is an embodiment subsequent to the embodiments of FIGS. 20 and 10, and thus a description of the overlapping configuration will be omitted. As described in FIGS. 20 and 10, the current bale collection slave vehicle may be determined as the second slave vehicle 1800-2, and thus second slave vehicle 1800-2 may be in a state of collecting or loading bales. Even during the second slave vehicle 1800-2 collects the bales, the master vehicle 100 may continue to perform the bale generation operation. Accordingly, the first slave vehicle 1800-1 may move while maintaining a predetermined interval d11 with the master vehicle 100 in order to increase the efficiency of the bale collection operation at the time of discharging a subsequent bale. The master vehicle 100 may determine a moving position and direction of the first slave vehicle 1800-1, which collects a subsequently discharged bale, in consideration of a generation speed and discharged position of the subsequently discharged bale.

Meanwhile, in another embodiment, depending on the type of a generated bale, the type of a slave vehicle capable of collecting the generated bale may be different. In this case, the processor 1980 may determine the corresponding slave vehicle as a bale collection slave device only when the type of the slave vehicle matches the bale type.

FIG. 23 illustrates examples of a bale type according to an embodiment.

Figure 23A:
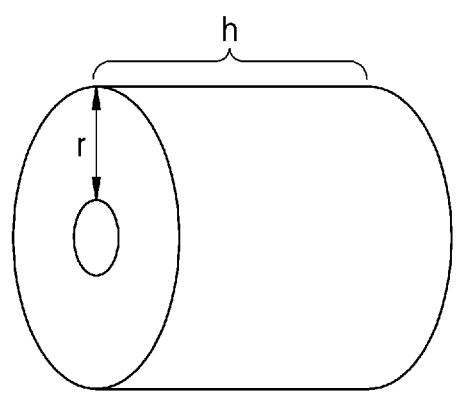
FIG. 23 illustrates examples of a bale type according to an embodiment.
Figure 23B:
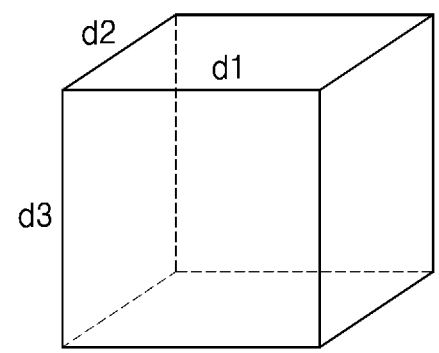

Referring to FIG. 23, the bale may have a cylindrical shape as shown in FIG. 23A, or a hexahedral shape as shown in FIG. 23B. When the work machine 1600 of the farm vehicle 1900 is a round baler, a cylindrical bale may be generated, and when the work machine 1600 is a plunger baler, a hexahedral bale may be generated. The processor 1980 of the farm vehicle 1900 may obtain information about the shape of a bale being generated by the current work machine 1600. At this point, the processor 1980 may obtain shape information of the bale using the camera 1970, or obtain the shape information of the bale using model and manufacturer information of the work machine 1600. In addition, in addition to the shape type of the bale, the processor 1980 may obtain specific shape information such as a cross-sectional radius r and a height h in the case of a cylindrical bale, and a width d1, a length d2, and a height d3 in the case of a hexahedral bale. The processor 1980 may include the obtained bale shape information in the bale collection command and transmit the bale collection command to the bale transport vehicle 1800.

According to an embodiment, the slave vehicle closest to the master vehicle may be the bale collection slave vehicle. However, when the generated bale is a hexahedral bale even though the slave vehicle having the closest distance is a vehicle of a model capable of collecting only a cylindrical bale, the processor 1980 may determine another slave vehicle as the bale collection slave device.

In addition, according to an embodiment, when a collection failure or unable signal is obtained from the slave vehicle, the processor 1980 may re-designate another slave vehicle as the bale collection slave vehicle. More specifically, the slave vehicle may transmit the collection failure or unable signal to the master vehicle due to reasons such as problems inside the vehicle or mismatch between the bale type and the vehicle type. When the master vehicle receives the bale collection failure or unable signal, the master vehicle determines another vehicle from among the one or more slave vehicles as the bale collection slave vehicle. In addition, the processor 1980 of the master vehicle may transmit a return-to-garage command to the slave vehicle corresponding to the bale collection failure or unable signal, and the slave vehicle, which has received the return-to-garage command, may return to a garage.

Figure 24:
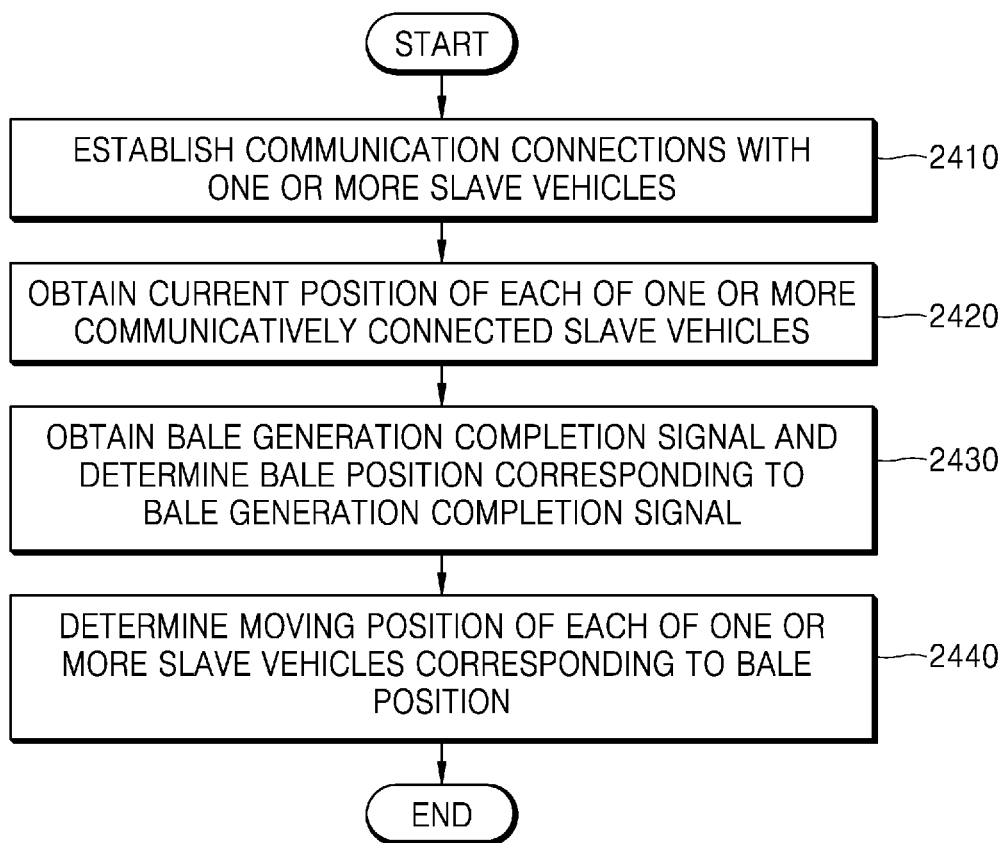
FIG. 24 is a flowchart illustrating an autonomous driving method of a farm vehicle according to an embodiment.

FIG. 24 is a flowchart illustrating an autonomous driving method of the farm vehicle according to an embodiment.

Referring to FIG. 24, the processor 1980 of the master vehicle 100 establishes a communication connections with one or more slave vehicles (2410).

Next, a current position of each of the one or more slave vehicles, which are communicatively connected to the master vehicle, is obtained, and a bale collection slave vehicle is determined (2420).

Next, a bale generation completion signal is obtained, and a bale position corresponding to the bale generation completion signal is determined (2430).

Next, a moving position of the bale collection slave vehicle corresponding to the bale position is determined (2440).

FIG. 25 is a view illustrating an example of a vehicle group according to an embodiment.

Referring to FIG. 25, the vehicle group may include one master vehicle 2600 and three slave vehicles 2500-1, 2500-2, and 2500-3. In the following specification, individual vehicles or all vehicles of the slave vehicles 2500-1, 2500-2, and 2500-3 in the group may be collectively referred to as a slave vehicle 2500. In the embodiment of FIG. 25, one master vehicle 2600 may be the farm vehicle 100 shown in FIG. 5. In addition, the three slave vehicles 2500-1, 2500-2, and 2500-3 may be farm vehicles of the same manufacturer and model as the master vehicle 2600 and may be vehicles that perform the same farming work as the master vehicle 2600. Alternatively, according to another embodiment, the master vehicle 2600 and the slave vehicle 2500 may be vehicles different only in the work machine 500, or may be entirely different vehicles. According to an embodiment, the master vehicle 2600 may control a moving path and a travel property of the slave vehicle 2500.

More specifically, the master vehicle 2600 may perform communication connection with the one or more slave vehicles. In order to perform the communication connection with the slave vehicle 2500, the master vehicle 2600 may detect the slave vehicle 2500 present in a predetermined radius and transmit a communication connection request thereto. As the slave vehicle 2500 responds to the communication connection request, the communication connection between the master vehicle and the slave vehicle 2500 may be performed. Alternatively, the master vehicle 2600 may detect the slave vehicle 2500 present in a predetermined farming work space and perform a communication connection.

Meanwhile, after performing the communication connection, the master vehicle 2600 may obtain a position of each of the master vehicle 2600 and the slave vehicle 2500. More specifically, the master vehicle 2600 may determine a first position, which is a reference position of the master vehicle 2600, and then, when the one or more slave vehicles are n slave vehicles, the master vehicle 2600 may determine a second-nth position (where n is a natural number greater than or equal to one), which is a reference position relatively determined with respect to the first position, for every slave vehicle 2500. That is, the position of the slave vehicle 2500 may be determined as relative coordinates with respect to the master vehicle 2600. For example, a second-first position, which is a reference position of a first slave vehicle 2500-1, a second-second position, which is a reference position of a second slave vehicle 2500-2, and a second-third position, which is a reference position of a third slave vehicle 2500-3, may be determined as relative coordinates with respect to the first position that is the reference position of the master vehicle 2600.

In addition, the master vehicle 2600 may set paths corresponding to the vehicles included in the vehicle group. That is, the master vehicle 2600 may set the path of the slave vehicle 2500 as well as the path thereof. In addition, the master vehicle 2600 may transmit a driving command or a work command to the slave vehicle 2500 on the basis of the set paths.

In the embodiment of FIG. 25, the vehicle group may be arranged in parallel and may move in the same direction. More specifically, paths r1, r2, and r3 of the first, second, and third slave vehicles 2500-1, 2500-2, and 2500-3 may be set to be the same as a path R1 of the master vehicle. In addition, speeds at which the first, second, and third slave vehicles 2500-1, 2500-2, and 2500-3 travel the paths r1, r2, and r3 may be the same as that at which the master vehicle travels the path R1.

Meanwhile, when the vehicles in the vehicle group are arranged in parallel as shown in FIG. 25, the vehicles in the vehicle group may perform the same farming work. For example, the vehicles in the vehicle group may maintain a constant interval and perform the same rice-planting work. More specifically, under the control of the master vehicle 2600, the slave vehicles 2500-1, 2500-2, and 2500-3 may perform the rice-planting work together with the master vehicle 2600 in the same direction and speed. Accordingly, when a large amount of farming work is required, a work time may be shortened without adding additional manpower.

Hereinafter, a method in which the slave vehicles are controlled by the master vehicle and travel in groups will be described in more detail.

Figure 26:
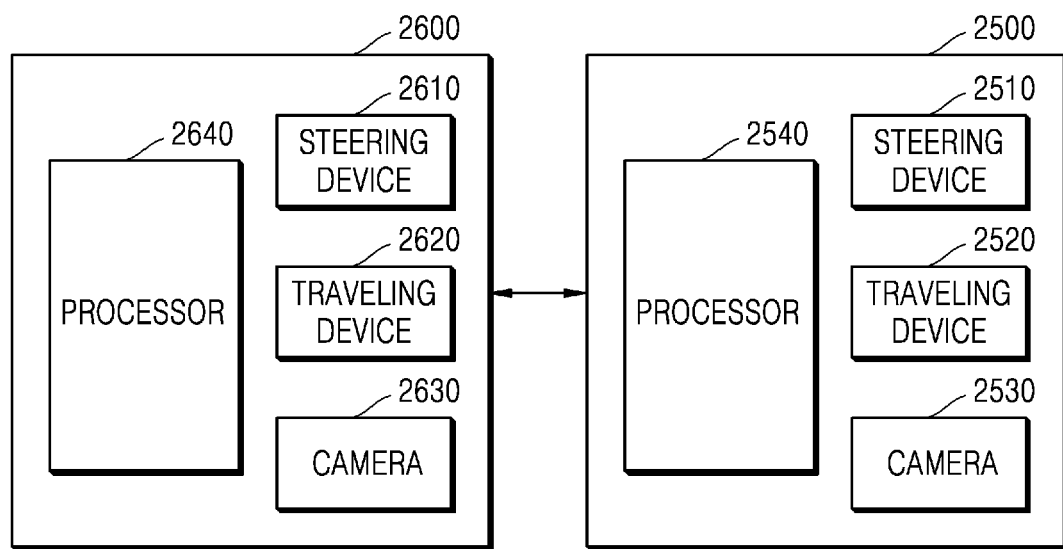
FIG. 26 is a diagram for describing an example of a master vehicle and a slave vehicle according to an embodiment.

FIG. 26 is a diagram for describing an example of an internal configuration of the master vehicle and the slave vehicle according to an embodiment.

Referring to FIG. 26, the master vehicle 2600 may include a steering device 2610, a traveling device 2620, a camera 2630, and a processor 2640. In addition, the slave vehicle 2500 may include a steering device 2510, a traveling device 2520, a camera 2530, and a processor 640. In the master vehicle 2600 and the slave vehicle 2500 illustrated in FIG. 26, only components related to the present embodiment are illustrated. Accordingly, those of ordinary skill in the art will be appreciated that other general components other than the components illustrated in FIG. 26 may be further included in the master vehicle 2600 and the slave vehicle 2500. That is, in the internal configuration of the master vehicle 2600 and the slave vehicle 2500, some components may be omitted depending on the type of farming work performed by the master vehicle 2600 and the slave vehicle 2500 without being limited to the example of FIG. 26.

First, the steering device 2610 of the master vehicle 2600 may receive an input for operating the master vehicle 2600 and the work machine of the master vehicle 2600. For example, the steering device 2610 may include a lever, a handle, a button, and a touch screen, and the like. As an example, the steering device 2610 may receive an input related to steering of the master vehicle 2600 from an operator, an input related to a gear-shifting stage of the master vehicle 2600, and the like. As another example, the master vehicle 2600 may perform steering and gear-shifting by automatically controlling the steering device 2610.

The traveling device 2620 refers to a device for moving a vehicle body using power transmitted from a transmission device. As an example, the traveling device 2620 may include wheels like the front wheel 112 and the rear wheel 114 of the farm vehicle 100 of FIG. 5, and an axle. As another example, the traveling device 2620 may be a crawler-type device including a caterpillar track.

Meanwhile, although not illustrated in FIG. 26, the master vehicle 2600 may include a power generation device, the transmission device, a power take-off device, a hydraulic device, and the like.

The power generation device may generate power required for the master vehicle 2600 to travel and perform work. For example, the power generation device may be a device equipped with a diesel engine or a gasoline engine.

The transmission device may appropriately convert a vehicle speed or a towing force of the master vehicle 2600 into various speeds using the power transmitted from the power generation device. For example, the transmission device may be a mechanical transmission device or a hydraulic transmission device.

The power take-off (P.T.O) device is a device for transmitting a part of the power generated by the power generation device to the work machine of the master vehicle 2600. For example, the power take-off device may be connected to the transmission device, and transmit required amount of power the work machine according to the work machine and the work type.

The hydraulic device is used for the operation of moving a part of the work machine, or the like. For example, the hydraulic device may move the work machine by driving a hydraulic pump using rotational power of an engine, transmitting oil of hydraulic pressure generated in the hydraulic pump to a hydraulic cylinder through an operation valve, and pushing a piston using the hydraulic pressure.

In addition, the camera 2630 may capture an image of a situation outside the vehicle and transmit the image to the processor 2640. The master vehicle 2600 may include a plurality of cameras 2630, and image capturing signals or video capturing signals of the plurality of cameras 2630 may be obtained by the processor 2640. When the camera 2630 is a pan-tilt-zoom (PTZ) camera capable of adjusting an image capturing area, an image capturing area of the camera 2630 may also be controlled by the processor 2640. Although only the camera 2630 is illustrated in FIG. 26, all sensors capable of sensing an internal of external environment of the vehicle may be provided in the master vehicle 2600 in addition to the camera.

The processor 2640 controls all components included in the farm vehicle 100. The processor 2640 may control operations of all components included in the farm vehicle 100 as well as the operations of the steering device 2610, the traveling device 2620, and the camera 2630. Due to the control of the processor 2640, the farm vehicle 100 may perform driving, parking, working (e.g., a farming work, a civil engineering work, and the like), and the like.

For example, the processor 2640 may be implemented by an array of multiple logical gates, or may be implemented by a combination of a general-purpose micro processor and a memory storing a program that is executable by the micro processor. In addition, it will be appreciated by those skilled in the art that the present embodiment may be implemented in other forms of hardware.

In an embodiment, the processor 2640 may control autonomous driving of the master vehicle 2600. The processor 2640 may determine a driving mode of the master vehicle as one of an autonomous driving mode or a manual driving mode. The autonomous driving mode is a mode that allows the master vehicle to travel without the operation of a driver or a passenger. In the autonomous driving mode, the processor 2640 may monitor a traveling environment of the master vehicle and control all aspects of the driving operation, and perform a response to an emergency situation. In addition, the processor 2640 may allow the master vehicle 2600 to perform all autonomous driving functions that a general autonomous vehicle performs. Unlike the autonomous driving mode, the manual driving mode is a mode in which the driver or passenger entirely controls all operations and manages all dynamic driving.

In addition, in an embodiment, the processor 2640 may control the driving and working of the slave vehicle 2500. Conventionally, when a plurality of farm vehicles 100 are put into work for the efficiency of farming work, there is a problem in that manpower is additionally required because an operator is required for each vehicle. However, according to the present disclosure, since the master vehicle may control the driving and working of the slave vehicles in the vehicle group, the cost and time of the farming work may be reduced.

In an specific example, when the work machine of the master vehicle 2600 is a baler, the slave vehicle 2500 configured to collect a discharged bale when the bale generated by compressing hay is discharged to the ground and a transport operation for the bale is additionally required. In addition, a plurality of bale transport vehicles may be required in consideration of a bale generation speed, a bale collection speed, and a bale transport speed. Conventionally, an operator who drives the slave vehicle 2500 was separately required, and thus there is a problem in that an operator of the slave vehicle 2500 for performing a bale transport operation must be additionally input in addition to an operator for performing a bale generation operation in the master vehicle 2600. Alternatively, when the number of operators is insufficient, there is a problem in that a working time is significantly increased because the master vehicle 2600 generates all bales and then the bales are collected at once by the slave vehicle 2500. According to an embodiment of the present disclosure, the driving and working of the slave vehicle 2500 may be controlled by the processor 2640 to automatically collect, load, and transfer the bales, so that no additional operator is required, thereby reducing costs and time.

In addition, in an embodiment, the steering device 2510, the traveling device 2520, and the camera 2530 of the slave vehicle 2500 may respectively perform substantially the same function as the steering device 2610, the traveling device 2620, and the camera 2630 of the master vehicle 2600. In addition, the processor 640 of the slave vehicle 2500 may receive a driving command from the master vehicle 2600 to control all the components of the slave vehicle 2500 including the steering device 2510, the traveling device 2520, and the camera 2530.

Meanwhile, as described above, the master vehicle 2600 and the slave vehicle 2500 may be vehicles that perform the same work, and may be vehicles that perform different works. In the embodiment of FIG. 26, although the master vehicle 2600 and the slave vehicle 2500 are illustrated as including the same configuration, the internal configurations of the master vehicle 2600 and the slave vehicle 2500 may be different. That is, as long as the processor 2640 of the master vehicle 2600 may control the processor 640 of the slave vehicle 2500, the remaining components of the master vehicle 2600 and the slave vehicle 2500 may be different depending on a farming work environment.

Hereinafter, an example in which a path is changed due to an obstacle will be described in detail before describing a platooning method, and then, a configuration in which the master vehicle 2600 controls the slave vehicle 2500 will be described in detail.

Figure 27:
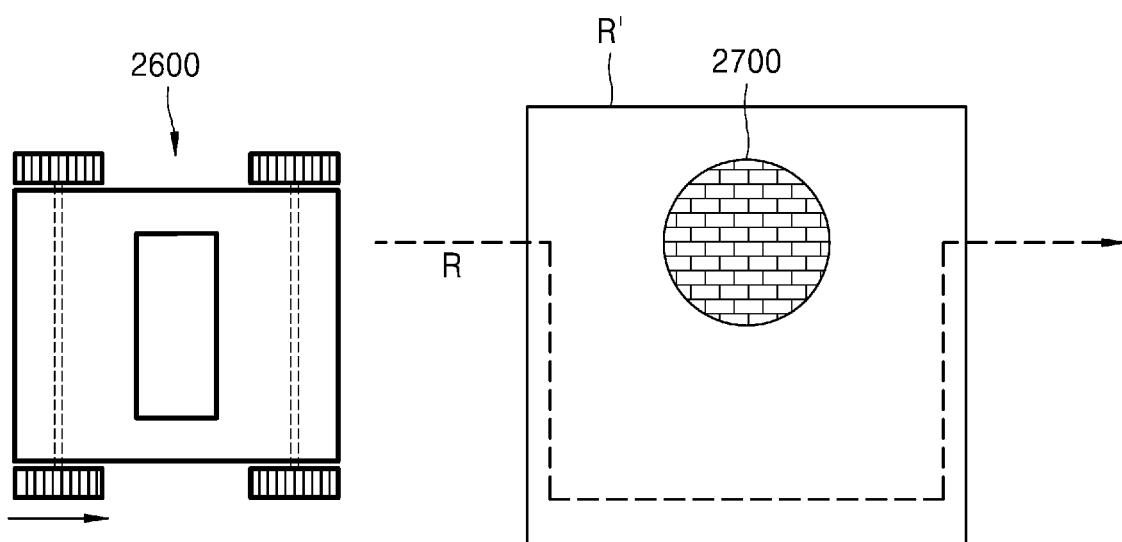
FIG. 27 is a view illustrating an example in which a path is changed when there is an obstacle, according to an embodiment.

FIG. 27 is a view illustrating an example in which a path is changed when there is an obstacle, according to an embodiment.

Referring to FIG. 27, an embodiment in which a path is changed when the master vehicle 2600 encounters an obstacle 2700 during traveling a given path R. According to an embodiment, the master vehicle 2600 may detect that obstacle 2700, which may affect the path, using the camera 2630, and the processor 2640 may change the path so that the obstacle 2700 is avoided.

In an embodiment, the obstacle 2700 is an object that may be avoided by changing the path to prevent damage to farm products, vehicles, or passengers by the processor 2640 on the basis of sensing data received from respective sensors. Alternatively, according to another embodiment of the present disclosure, the obstacle 2700 does not necessarily mean a physical object, but rather, may mean an obstacle situation, such as a situation in which farm products that do not match a current work setting are detected, or a situation in which working on an existing path is not suitable due to unsuitable soil quality.

In an embodiment, the master vehicle 2600 may determine whether a change is required in the currently set path R. At this point, the master vehicle 2600 may determine whether the obstacle 2700 is present on the moving path R, and determine that a change is required when a normal traveling of the vehicle or a normal work is impossible due to the obstacle 2700. When a change is required, the master vehicle 2600 may change the path to be suitable for avoiding the obstacle.

In the embodiment of FIG. 27, the master vehicle 2600 may detect the obstacle and automatically change the path. More specifically, the master vehicle 2600 determines that there is a need to change the path according to the obstacle 2700, and may reset the driving command on the basis of the changed path. That is, the processor 2640 of the master vehicle 2600 may change the existing path R moving straight in an east direction to a path that may avoid the obstacle 2700, and in this case, the processor 2640 may determine a change section R' and reset the driving command to travel the changed path.

In addition, the master vehicle 2600 may not only change the path of the master vehicle 2600, but also set and change a path of the slave vehicle 2500 if necessary. As described above, in the vehicle group including the master vehicle 2600 and the one or more slave vehicles 2500, the master vehicle 2600 may control the operations of the slave vehicles 2500. That is, the slave vehicle 2500 may move by a driving command of the master vehicle 2600 even without a separate operation input, and thus the slave vehicle 2500 may perform platooning without additional manpower.

FIG. 28 is a view illustrating an example in which the driving command for the slave vehicle is reset when the path of the master vehicle is changed, according to an embodiment.

The embodiment of FIG. 28 may be an embodiment subsequent to the embodiment of FIG. 25. Thus, the embodiment of FIG. 28 may be described using the reference numerals illustrated in FIG. 25 even when FIG. 25 is not mentioned. That is, in the embodiment of FIG. 28, a vehicle group may include one master vehicle 2600 and three slave vehicles 2500-1, 2500-2, and 2500-3 like in FIG. 25. In addition, it is assumed that the master vehicle 2600 is in a state of traveling a predetermined path R1, and the slave vehicle 2500 is in a state of traveling by a driving command based on a predetermined path r1, r2, or r3.

According to an embodiment, when there is a need for a change on any one of the platooning vehicles, a driving command for the vehicle related to the changed path may be reset. In this case, the vehicle related to the changed path may include the vehicle corresponding to the changed path, as well as another vehicle affected by the changed path. As a result, it is possible to prevent a deviation in farming working speeds between the vehicles during platooning and to perform consistent farming work.

In the embodiment of FIG. 28, the processor 2640 of the master vehicle 2600 may determine that there is a need to change the existing path R1 to a changed path R1-1 when there is an obstacle, and determine the changed path R1-1. At this point, the processor 2640 of the master vehicle 2600 resets the driving command of the master vehicle 2600 on the basis of the changed path R1-1.

In addition, when the path of the master vehicle 2600 is changed, the path and driving command for the slave vehicle 2500 may be reset. That is, when the vehicle corresponding to the path R1, in which a change is required, is the master vehicle 2600, the driving command for the master vehicle 2600 is reset, and accordingly, the driving command for the slave vehicle 2500 may also be reset. That is, in the embodiment of FIG. 28, the vehicles related to the changed path may include not only the master vehicle but also the slave vehicle 2500.

In the platooning of the vehicles according to an embodiment, the master vehicle 2600 controls the traveling of the slave vehicle 2500. When the path of the master vehicle 2600 is changed from R1 to R1-1 as in the embodiment of FIG. 28, a delay may occur in traveling and working during a change section R-1'. Despite the delay in driving and working of the master vehicle 2600, when the slave vehicle 2500 is traveling according to the existing driving command, consistency of farming works of the vehicles in the vehicle group may be lost and a problem due to the deviation of working speeds may likely occur.

Accordingly, according to an embodiment, the existing path r1 of the first slave vehicle 2500-1 may be changed to a changed path r1-1, and the changed path r1-1 may have a change section r-1' as compared with the existing path r1. At this point, the change section r-1' of the first slave vehicle 2500-1 may correspond to the change section R-1' of the master vehicle 2600. In addition, the driving command for the first slave vehicle 2500-1 may be reset such that the amount of the performed farming works of the vehicles is the same between the corresponding change sections. That is, the driving command for the first slave vehicle 2500-1 may be reset such that the amount of the performed farming work of the master vehicle 2600 during the change section R-1' and the amount of the performed farming work of the first slave vehicle 2500-1 during the change section r-1' are the same.

In a specific embodiment, the first slave vehicle 2500-1 may reset the driving command to stop the work or traveling of the first slave vehicle 2500-1 during the change section r-1' corresponding to the change section R-1' so that a delay of the farming work that occurred while the master vehicle 2600 detours to the change section R-1' may be compensated for.

In another example, moving speeds of the remaining slave vehicles 2500 other than the master vehicle 2600 whose path has been changed may be adjusted on the basis of a position of the master vehicle 2600. More specifically, the driving command may be reset such that a speed of the first slave vehicle 2500-1 during the change section r-1' is reduced so that the delay of the farming work that occurred while the master vehicle 2600 detours to the change section R-1' may be compensated for. In the same manner, the driving command may be reset such that the second and third slave vehicles 2500-2 and 2500-3 stop traveling or working or reduce speeds thereof respectively during change sections r2-1' and r3-1'.

In summary, when the path of the master vehicle 2600 is changed, the driving command for the slave vehicle 2500 may also be automatically reset. In addition, the reset driving command may be transmitted to the corresponding slave vehicle 2500, and the slave vehicle 2500 may travel the changed path according to the reset driving command. As a result, when the path of the master vehicle 2600 is changed, the driving command for the slave vehicle 2500 is automatically reset, thereby maintaining consistency of the platooning and the farming work.

Figure 29:
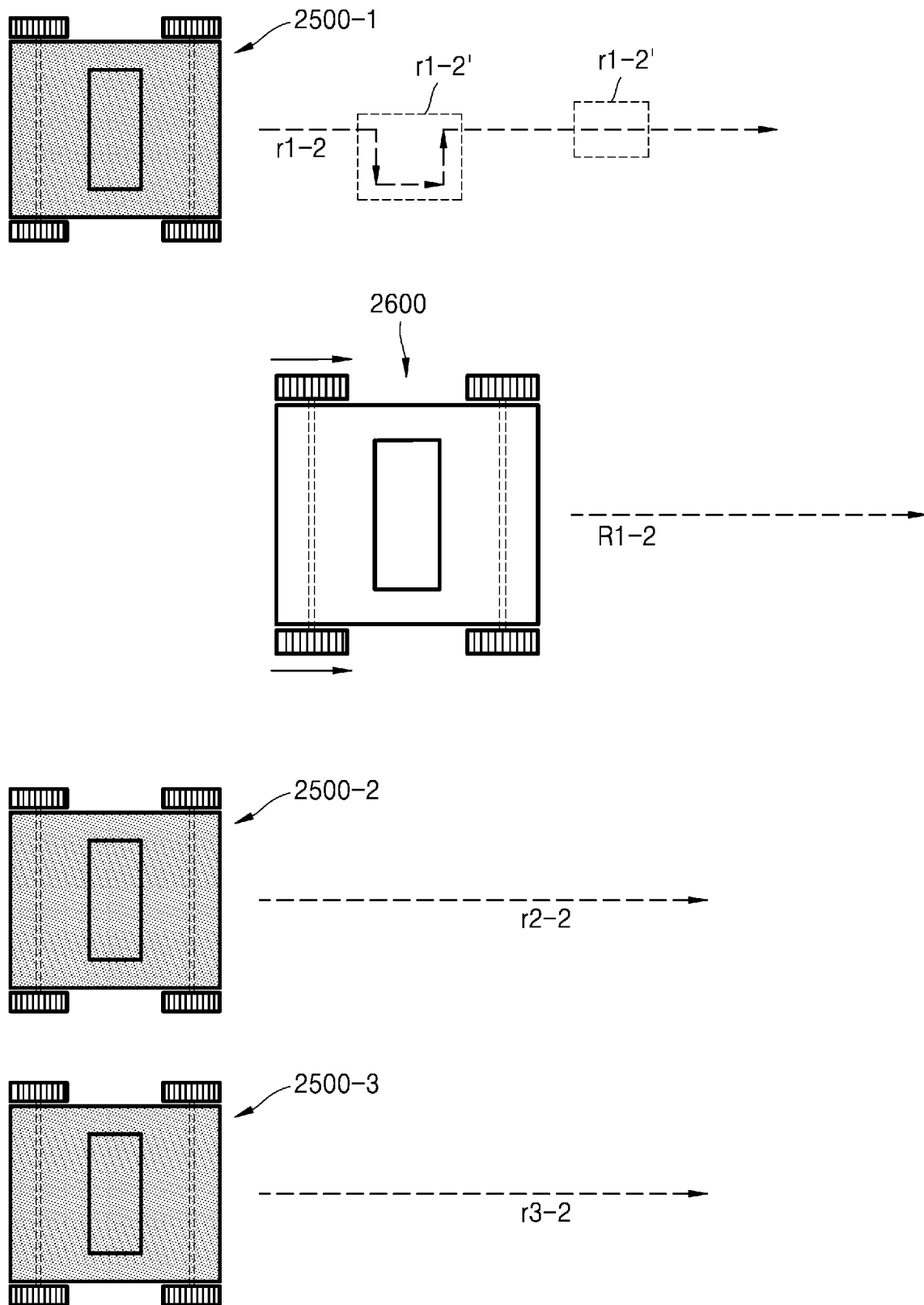
FIG. 29 is a view illustrating an example of a case in which a path of the slave vehicle is reset, according to an embodiment.

FIG. 29 is a view illustrating an example of a case in which a path of the slave vehicle is reset, according to an embodiment.

The embodiment of FIG. 29 may be an embodiment subsequent to the embodiment of FIG. 25. Thus, the embodiment of FIG. 28 may be described using the reference numerals illustrated in FIG. 25 even when FIG. 25 is not mentioned. That is, in the embodiment of FIG. 29, the vehicle group may include one master vehicle 2600 and three slave vehicles 2500-1, 2500-2, and 2500-3. In addition, it is assumed that the master vehicle 2600 is in a state of traveling an existing path R1, and the slave vehicles 2500-1, 2500-2, and 2500-3 are in states of traveling by a driving command based on predetermined paths r1, r2, and r3.

In the embodiment of FIG. 29, the processor 2640 of the master vehicle 2600 may determine that there is a need to change the existing path r1 when there is an obstacle on the predetermined path r1 of the first slave vehicle 2500-1, and set a changed path r1-2. At this point, the processor 2640 of the master vehicle 2600 may reset the driving command for the first slave vehicle 2500-1 on the basis of the changed path r1-2.

Further, in the embodiment of FIG. 29, even when the path of the first slave vehicle 2500-1 is changed, the path of another vehicle may not be changed. That is, the vehicle related to the changed path is only the first slave vehicle 2500-1, and thus the vehicle for which the driving command is reset may also be the first slave vehicle 2500-1. In summary, when the vehicle corresponding to the changed path is the slave vehicle, the driving command for the corresponding slave vehicle may be reset, and then, it is possible to determine whether to reset the driving command for the other slave vehicles, and reset the driving command for the other slave vehicles only when it is necessary. This is because, unlike the embodiment of FIG. 28, the change of the path of the slave vehicle 2500-1, which is not the master vehicle 2600, is less likely to damage the consistency of the farming work.

Meanwhile, since a detour occurred in the changed path r1-2 of the first slave vehicle 2500-1 during a change section r1-2', a work delay may occur in comparison with other vehicles of the vehicle group. At this point, the processor 2640 of the master vehicle 2600 may reset the driving command to increase a traveling or working speed during a compensation section r1-2" to compensate for the work delay during the change section r1-2'. That is, when the path of the slave vehicle 2500 is changed, instead of resetting the driving command for the other vehicles, the driving command may be reset such that the corresponding slave vehicle 2500 has a compensation section. As a result, even when the path of the slave vehicle 2500 is changed, the consistency of platooning and working may be maintained without affecting other vehicles.

FIG. 30 is a view illustrating an example in which a change in a path of the master vehicle causes a path of another slave vehicle to be changed, according to an embodiment.

The embodiment of FIG. 30 may be an embodiment subsequent to the embodiment of FIG. 25. Thus, the embodiment of FIG. 30 may be described using the reference numerals illustrated in FIG. 25 even when FIG. 25 is not mentioned. That is, in the embodiment of FIG. 30, the vehicle group may include one master vehicle 2600 and three slave vehicles 2500-1, 2500-2, and 2500-3. In addition, it is assumed that the master vehicle 2600 is in a state of traveling an existing path R1, and the slave vehicles 2500-1, 2500-2, and 2500-3 are in states of traveling by a driving command based on predetermined paths r1, r2, and r3.

In the embodiment of FIG. 30, the processor 2640 of the master vehicle 2600 may determine that there is a need to change the existing path R1 to a changed path R1-3 when there is an obstacle on the predetermined path R1, and set the changed path R1-3. In addition, in an embodiment, the processor 2640 of the master vehicle 2600 may set the path such that separation distances between the vehicles are the same within a predetermined error range, and when one or more of the separation distances between the vehicles in the vehicle group decreases below a predetermined value due to the changed path, the processor 2640 may reset the path of the related vehicle.

In an example, cases in which the separation distance between the vehicles is reduced below the predetermined value since a detour occurs in the path during a change section R1-3' of the changed path R1-3 or the master vehicle 2600 intrudes the path of the second slave vehicle 2500-2 may be considered. That is, when the master vehicle 2600 travels the changed path R1-3, the possibility of collision may be increased when the second slave vehicle 2500-2 travels the existing path r2 as it is. In order to prevent this situation, when the changed path R1-3 of the master vehicle 2600 intrudes the path of the second slave vehicle 2500-2, the path of the second slave vehicle 2500-2 may also be changed More specifically, the processor 2640 of the master vehicle 2600 may change the path of the second slave vehicle 2500-2 to r2-3 so that the master vehicle 2600 does not collide with the second slave vehicle 2500-2 even when the master vehicle 2600 travels the change section R1-3'. The changed path r2-3 includes a change section r2-3', which may be a section corresponding to the change section R1-3' of the master vehicle 2600. In addition, as in the embodiment of FIG. 30, the processor 2640 of the master vehicle 2600 may set the change section r2-3' to have a greater detoured spatial range than the change section R1-3'. This is to increase a detour distance of the slave vehicle to prevent a collision.

In another embodiment, when the changed path R1-3 of the master vehicle 2600 intrudes the path of the second slave vehicle 2500-2, the processor 2640 of the master vehicle 2600 may reset the driving command to temporarily stop or delay the traveling of the second slave vehicle 2500-2. That is, unlike the embodiment of FIG. 30, rather than changing the path of the second slave vehicle 2500-2, the second slave vehicle 2500-2 may decrease a speed thereof or temporarily stop so that the second slave vehicle 2500-2 does not collide with the master vehicle 2600 while the master vehicle 2600 travels the change section R1-3'.

Next, the processor 2640 of the master vehicle 2600 resets the driving command for the second slave vehicle 2500-2, and then determines whether to reset the driving command for another slave vehicle and resets the driving command for another slave vehicle if necessary. For example, since the first slave vehicle 2500-1 is not affected by the change section R1-3' of the changed path R1-3 of the master vehicle 2600, the processor 2640 of the master vehicle 2600 may set the changed path R1-3 of the first slave vehicle 2500-1 not to have a detour section. Alternatively, as described in the example of FIG. 28, the driving command may be reset so that the path is maintained but the speed of the travel or work is reduced to zero or decreased in some sections.

In addition, when a distance between the second slave vehicle 2500-2 and the third slave vehicle 2500-3 is sufficiently large and thus the second slave vehicle 2500-2 and the third slave vehicle 2500-3 are less likely to collide due to the changed path r2-3 of the second slave vehicle 2500-2, the driving command for a change section r3-3' may be reset so that the path is not changed but the speed of the travel or work is reduced to zero or decreased in the change section r3-3'.

Figure 31:
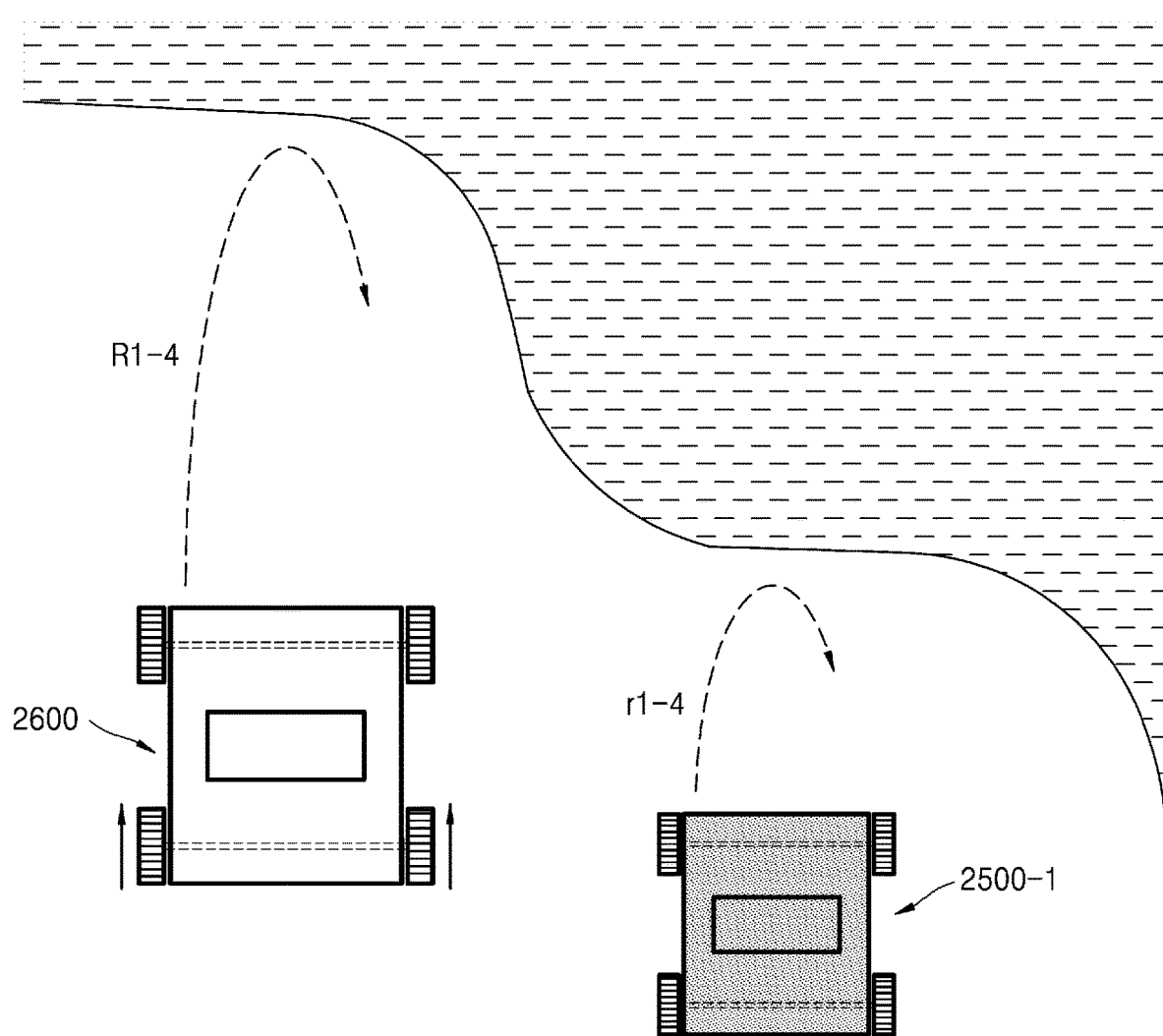
FIG. 31 illustrates an example of platooning at a boundary line of a farming work space according to an embodiment.

FIG. 31 illustrates an example of platooning at a boundary line of a farming work space according to an embodiment.

Referring to FIG. 31, it may be seen that the master vehicle 2600 and the first slave vehicle 2500-1 respectively travel to changed paths R1-4 and r1-4 near the boundary line of the farming work space. That is, in the embodiment of FIG. 31, the boundary line of the farming work space may be an obstacle on the path. In an embodiment, when the obstacle is related to the boundary line of the work space, the changed paths R1-4 and r1-4 may be paths in which return information for other vehicles in the vehicle group is considered.

In a specific embodiment, when the master vehicle 2600 and the first slave vehicle 2500-1 of FIG. 31 are traveling at the same speed, the master vehicle having a longer driving distance to the boundary than the first slave vehicle 2500-1 is highly likely to lag behind the first slave vehicle 2500-1 after turning around near the boundary. To compensate for this, the processor 2640 of the master vehicle 2600 may set the changed path r1-4 of the first slave vehicle 2500-1, but may reset the driving command for the first slave vehicle 2500-1 such that the traveling or working of the first slave vehicle 2500-1 is stopped or delayed in some sections of the changed path r1-4 so that the first slave vehicle 2500-1 matches the traveling and working speeds of the master vehicle 2600.

Figure 32:
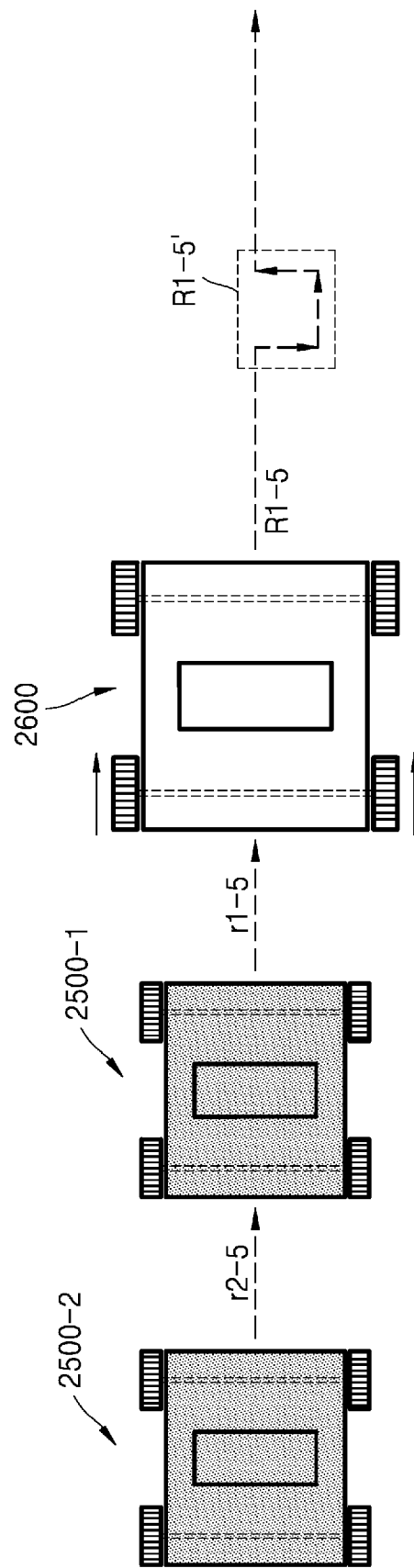
FIG. 32 illustrates an example of a case in which an attribute of platooning is a series work according to an embodiment.

FIG. 32 illustrates an example of a case in which an attribute of platooning is a series work according to an embodiment.

While an attribute of platooning in FIG. 25 is a parallel work, FIG. 32 is a view illustrating an example in which an attribute of platooning is a series work. That is, in the example of FIG. 32, the vehicles in the vehicle group may be arranged in series and perform farming works. At this point, the master vehicle 2600 is positioned first in the series arrangement, and the first slave vehicle 2500-1 and the second slave vehicle 2500-2 perform farming works while following the master vehicle 2600. According to an embodiment, when an attribute of platooning of the vehicles in the vehicle group is a series work, a farming work of the slave vehicle 2500 may be a subsequent work of a farming work of the master vehicle 2600. For example, when the work machine of the master vehicle 2600 is a baler to collect and compress hay to generate a bale, the slave vehicle 2500 may be a bale collection vehicle.

In the embodiment in which the travelling attribute is a series work as shown in FIG. 32, when a path of the master vehicle 2600 is reset, paths of the one or more slave vehicles 2500 may be reset in the same manner That is, when an obstacle exists on the existing path of the master vehicle 2600 and a changed path R1-5 is set to include a change section R1-5', the processor 2640 may change the paths of the following slave vehicles 2500 to have change sections corresponding to the change section R1-5' and reset the driving command.

That is, in the case of the series arrangement, since the slave vehicle 2500 following the master vehicle 2600 may highly likely encounter the same obstacle, the driving command may be automatically reset so that the slave vehicle 2500 also has the same change section as the change section R1-5'. As a result, the paths of the vehicles of the vehicle group, which are arranged in series, may be efficiently changed.

Figure 33:
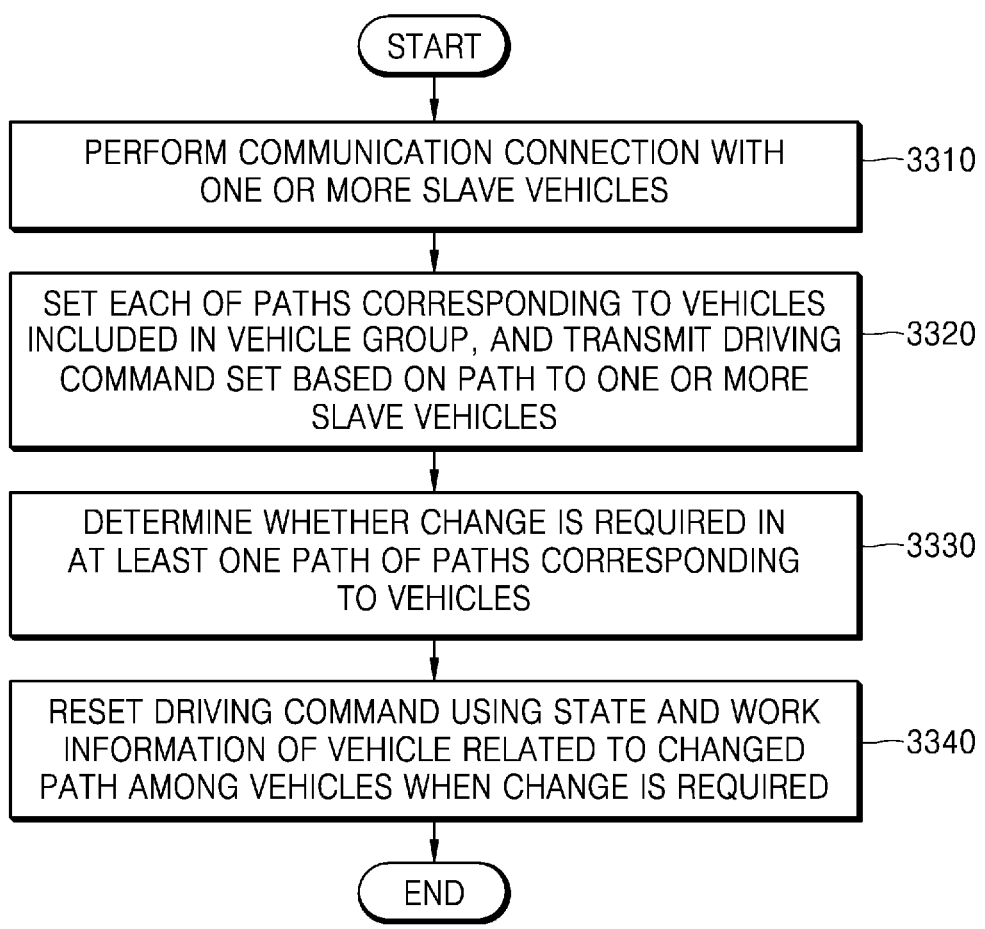
FIG. 33 is a flowchart illustrating a platooning method according to an embodiment.

FIG. 33 is a flowchart illustrating a platooning method according to an embodiment.

Referring to FIG. 33, communication connection with one or more slave vehicles is performed (3310).

Next, each of paths corresponding to the vehicles included in the vehicle group is set, and a driving command set on the basis of the path is transmitted to the one or more slave vehicles (3320).

Next, it is determined that a change is required in at least one path of the paths corresponding to the vehicles, and the path is changed (3330).

Next, the driving command for the vehicle related to the changed path among the vehicles is reset (3340).

Figure 34A:
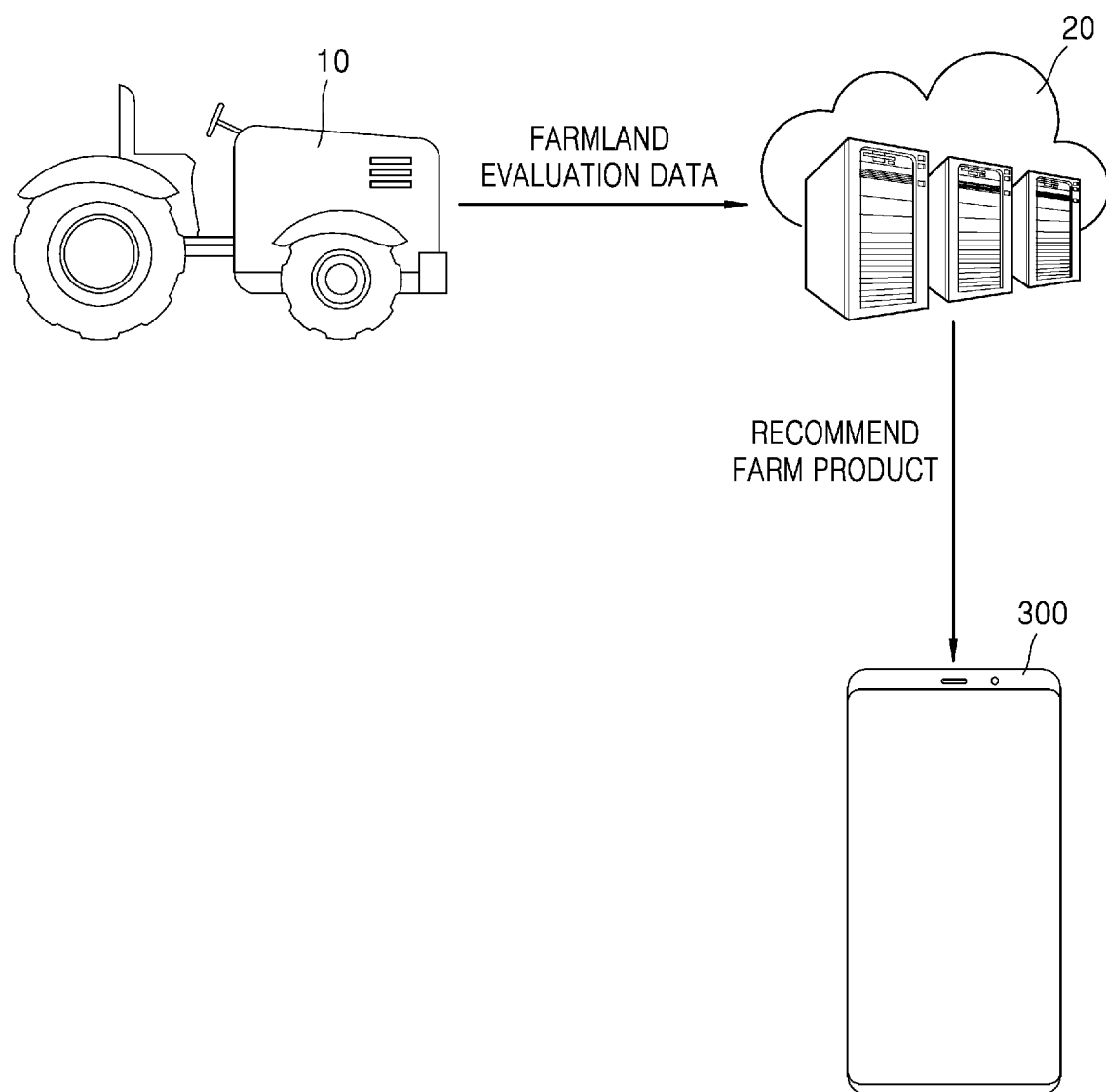
FIGS. 34A to 34B are views for describing a method of recommending farm products using farmland evaluation data according to an embodiment.
Figure 34B:
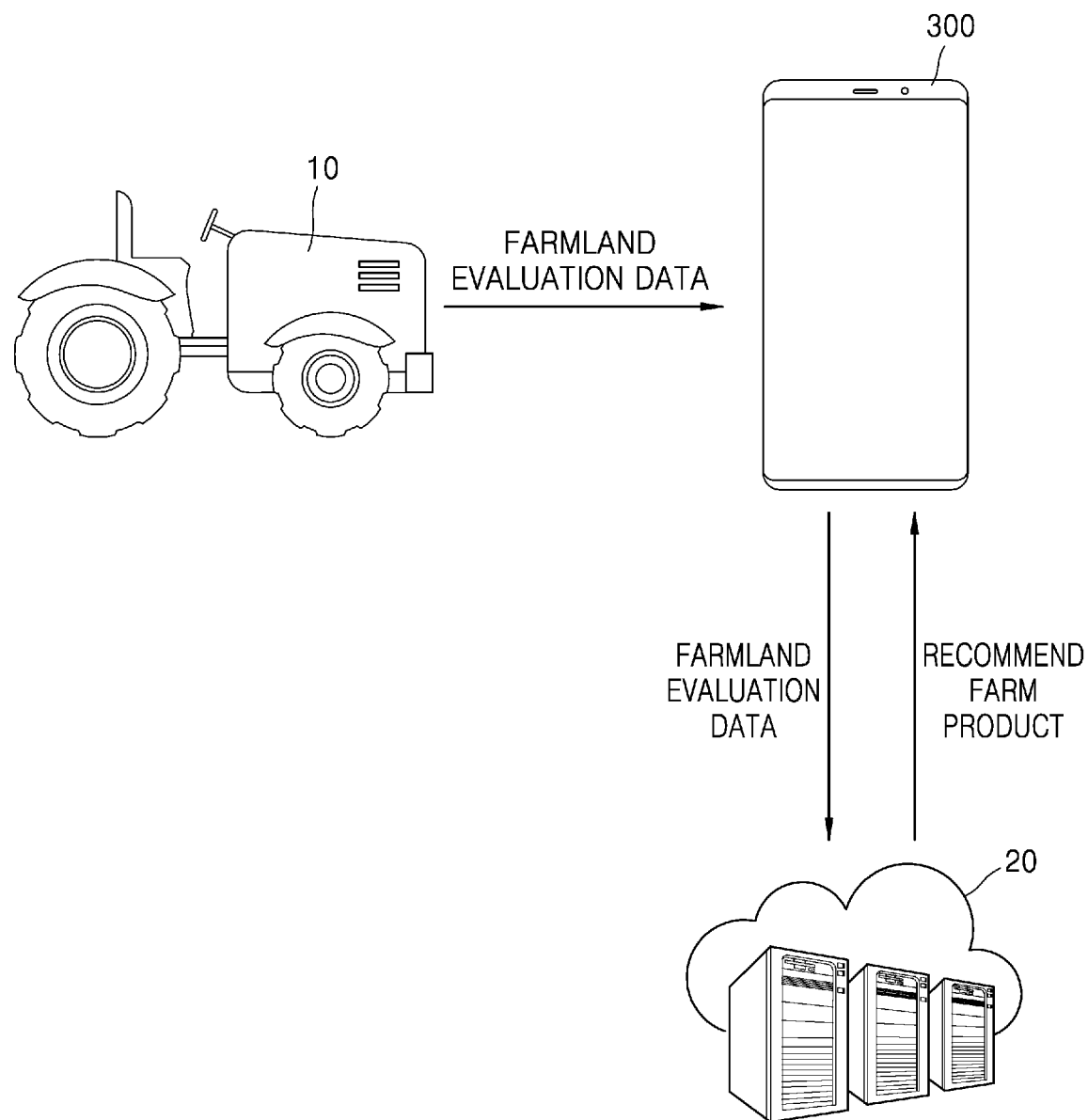

FIGS. 34A to 34B are views for describing a method of recommending farm products using farmland evaluation data according to an embodiment.

A communication network may be formed between a farm vehicle 10, a server 20, and an external device 300.

The server 20 may receive farmland evaluation data for a predetermined farmland from the farm vehicle 10 and determine farmland characteristics on the basis of the received farmland evaluation data. In addition, the server 20 may recommend farm products suitable for the predetermined farmland to the external device 300 on the basis of the determined farmland characteristics.

Various pieces of data may be generated according to the driving and farming work of the farm vehicle 10. At least some pieces of the generated data may be the farmland evaluation data that may be used to evaluate the predetermined farmland in which the farm vehicle 10 is driven or the farming work is performed.

In an embodiment, the farmland evaluation data may include driving data of the farm vehicle 10. The driving data may include at least one of pieces of accident-related data, failure-related data, and traveling-related data of the farm vehicle 10.

In addition, farming-work-performing data of the farm vehicle 10 may be included in the farmland evaluation data. The farming-work-performing data may include at least one of pieces of farm equipment-related data, farm product-related data, and farmland-related data.

Meanwhile, the driving data and the farming-work-performing data included in the farmland evaluation data are not limited to the above examples.

In an embodiment, referring to FIG. 34A, the server 20 may receive the farmland evaluation data from the farm vehicle 10.

In another embodiment, referring to FIG. 34B, the external device 300 may receive the farmland evaluation data from the farm vehicle 10, and the server 20 may receive the farmland evaluation data from the external device 300. That is, the server 20 may receive the farmland evaluation data through the external device 300 instead of directly receiving the farmland evaluation data from the farm vehicle 10.

The server 20 may determine the farmland characteristics on the basis of the farmland evaluation data. As long as characteristics may be used to recommend farm products suitable for the predetermined farmland, the characteristics may be included without limitation in the farmland characteristics. The farmland characteristics may include physical characteristics, chemical characteristics, and biological characteristics.

The server 20 may determine at least one of elements included in the physical characteristics, the chemical characteristics, and the biological characteristics for the predetermined farmland on the basis of at least one of pieces of the accident-related data, the failure-related data, and the traveling-related data of the farm vehicle 10. In addition, the server 20 may determine at least one of the physical characteristics, the chemical characteristics, and the biological characteristics for the predetermined farmland on the basis of at least one of pieces of the farm equipment-related data, the farm product-related data, and the farmland-related data.

The server 20 may recommend farm products suitable for the predetermined farmland to the external device 300 on the basis of the determined farmland characteristics.

Depending on the physical characteristics, the chemical characteristics, and the biological characteristics of the predetermined farmland, farm product types suitable for cultivation may be determined. The server 20 may recommend farm products suitable for the predetermined farmland on the basis of the farmland characteristics determined in the manner described above.

Meanwhile, in FIGS. 34A to 34B, a method in which the server 20 determines farm products suitable for farmland characteristics and recommends the determined farm products to the external device 300 has been described, but the external device 300 may receive farmland evaluation data from the farm vehicle 10, determine farmland characteristics on the basis of the received farmland evaluation data, and recommend farm products suitable for a predetermined farmland to a user of the external device 300 on the basis of the farmland characteristics. In addition, the external device 300 may also be mounted on the farm vehicle 10.

Figure 35:
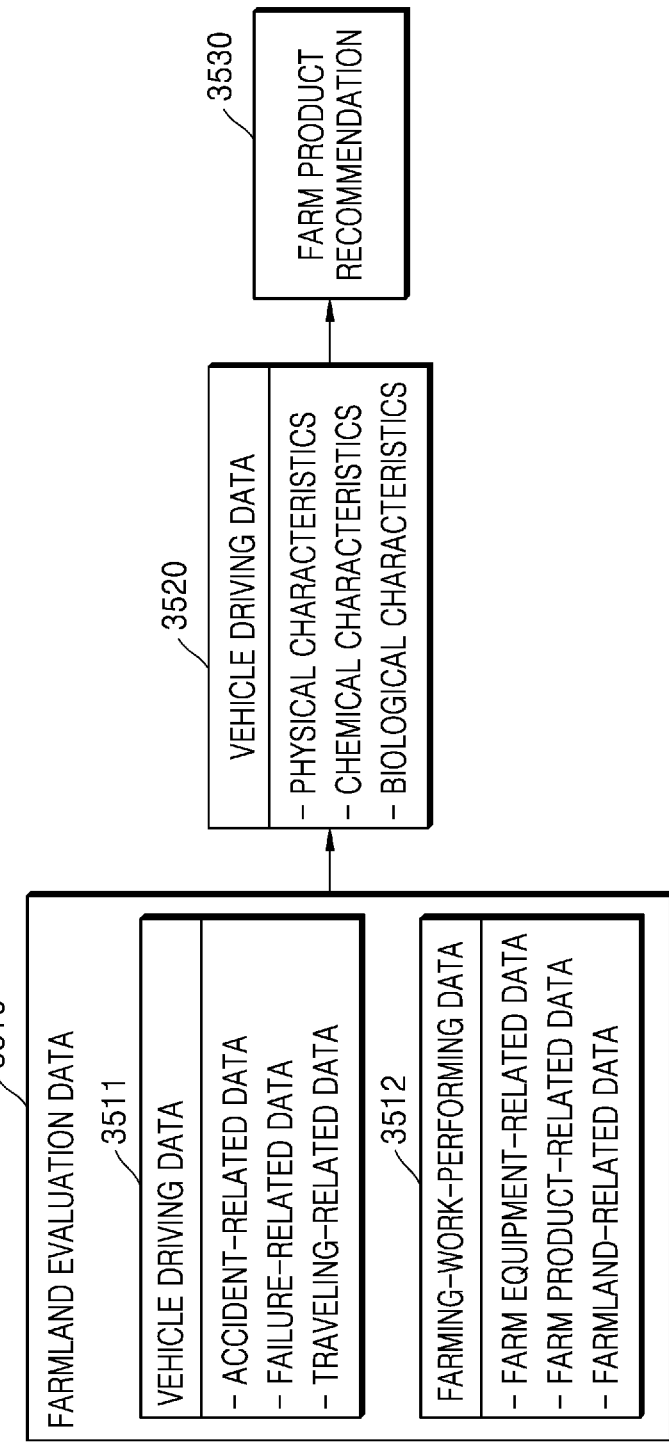
FIG. 35 is a diagram for describing pieces of data used to recommend farm products, according to an embodiment.

FIG. 35 is a diagram for describing pieces of data used to recommend farm products, according to an embodiment.

Farmland evaluation data 3510 may include vehicle driving data 3511 of the farm vehicle 10. The vehicle driving data 3511 may include at least one of pieces of accident-related data, failure-related data, and traveling-related data of the farm vehicle 10.

For example, the accident-related data may include at least one of an accident occurrence position, an accident occurrence time, an accident occurrence cause, and an accident occurrence result. The accident occurrence position may include GPS coordinates of a point at which an accident of the farm vehicle 10 occurs, and the accident occurrence time may include a season, a month, a day, a day of the week, a time, a minute, and the like when an accident of the farm vehicle 10 occurs. In addition, the failure-related data may include at least one of a failure part, a failure frequency, and a degree of a failure. In addition, the traveling-related data may include at least one of a deformation amount of a tire tread of the farm vehicle 10, an engine torque ratio, an engine load ratio, an engine RPM, an engine operation hour, an accumulated fuel consumption amount, a fuel efficiency, an engine oil temperature, an engine room temperature, a cooling water temperature, a current gear-shifting stage, a mission oil temperature, a traveling distance, and a traveling time.

The farmland evaluation data 3510 may include farming-work-performing data 3512 of the farm vehicle 10. The farming-work-performing data 3512 may include at least one of pieces of farm equipment-related data, farm product-related data, and farmland-related data.

For example, the farm equipment-related data may include at least one of pieces of data about specification of farm equipment used to perform farming works, failure-related data, data about load applied to the farm equipment, and data about power of the farm equipment. In addition, the farm product-related data may include at least one of the type of a farm product, a farm product name, a farm product origin, a cultivation method, a cultivation environment, and quality characteristics, which are utilized to perform farming works. In addition, the farmland-related data may include at least one of an area of the farmland on which farming works are performed, land information, the strength of the ground (hard, normal, soft), and the amount of sunshine.

The server 20 may determine farmland characteristics 3520 on the basis of the farmland evaluation data. The farmland characteristics 3520 may include physical characteristics, chemical characteristics, and biological characteristics. For example, the physical characteristics may include soil characteristics, a water holding capacity, a drainage capacity, soil voids, volume specific gravity, temperature (variance range), and the like. In addition, the chemical characteristics may include an organic material content, a carbon-to-nitrogen (C/N) ratio, an allelopathic material, pH, fertility, an inorganic nitrogen form, and the like. In addition, the biological characteristics may include soil microorganisms, a nitrification action, and the like.

The farmland characteristics 3520 may be determined from the farmland evaluation data 3510. In order to determine the farmland characteristics 3520, the accident-related data, the failure-related data, and the traveling-related data of the farm vehicle 10 may be used as the vehicle driving data 3511, and the farm equipment-related data, the farm product-related data, and the farmland-related data may be used as the farming-work-performing data 3512, or combinations thereof may be used.

For example, the server 20 may determine at least one of elements included in the physical characteristics, the chemical characteristics, and the biological characteristics for the predetermined farmland on the basis of at least one of the accident occurrence position, the accident occurrence time, the accident occurrence cause, and the accident occurrence result. For example, the server 20 may use the accident occurrence position of the farm vehicle 10 to determine that there is a lot of sand and gravel, an organic material content is high, or pH and fertility are low in soil of the farmland at the corresponding position.

Further, the server 20 may determine at least one of elements included in the physical characteristics, the chemical characteristics, and the biological characteristics for the predetermined farmland on the basis of at least one of the failure part, the failure frequency, the degree of the failure of the farm vehicle 10. For example, when the failure frequency of the farm vehicle 10 is greater than or equal to a threshold value, the server 20 may determine that there is a lot of sand and gravel, the organic material content is high, or the pH and fertility are low in the soil of the farmland at the corresponding position.

Further, the server 20 may determine at least one of elements included in the physical characteristics, the chemical characteristics, and the biological characteristics for the predetermined farmland on the basis of the engine torque ratio, the engine load ratio, the engine RPM, the engine operation hour, the accumulated fuel consumption amount, the fuel efficiency, the engine oil temperature, the engine room temperature, the cooling water temperature, the current gear-shifting stage, the mission oil temperature, the traveling distance, and the traveling time as the traveling-related data of the farm vehicle 10. For example, when the engine RPM of the farm vehicle 10 continues to be above a reference value or the engine torque ratio is high, the server 20 may determine that there is a lot of sand and gravel, the organic material content is high, or the pH and fertility are low in the soil of the farmland at the corresponding position.

In addition, in a case in which grains are cultivated using farm equipment for cultivating grains because the amount of sunlight on a predetermined farmland is suitable for cultivating grains, but an equipment failure frequency is greater than or equal to a threshold value, the server 20 may determine that the predetermined farmland has soil characteristics, water holding capacity, an organic material content, and pH characteristics that are not suitable for cultivating grains.

Meanwhile, an additional sensor or mechanism may be attached to at least a part of the farm vehicle 10 in order to determine the farmland characteristics from the farmland evaluation data. For example, a pH sensor may be further attached to the farm vehicle 10 to determine pH, which is one of chemical characteristics of farmland, and a biosensor for identifying soil microorganisms, which is one of biological characteristics of farmland, may be further attached to the farm vehicle 10.

The sensor or mechanism that may be attached to the farm vehicle 10 is not limited to the examples described above, and may be included without limitation as long as it is for determining the physical characteristics, the chemical characteristics, and the biological characteristics of the farmland.

The server 20 may perform a recommendation 3530 of farm products that are suitable for the predetermined farmland on the basis of the determined farmland characteristics.

The types of the farm products may include grains, beans, legumes, vegetables, fruits, seeds, special crops, medicinal crops, monopoly crops, flowers, mushrooms, and the like. The grains may include wheat, rice, corn, barley, proso, millet, sorghum, and the like. The beans may include beans, red beans, mung beans, and the like. The legumes may include potatoes, sweet potatoes, and the like. The vegetables may include Chinese cabbage, spinach, water parsley, and the like. The fruits may include apples, peaches, grapes, and the like. The seeds may include persimmons, tangerines, walnuts, and the like. The special crops may include canola, sesame, peanut, and the like. The medicinal crops may include boxthorn, angelica, milk vetch root, Omija, and the like. The monopoly crops may include tobacco, ginseng, and the like. The flowers may include chrysanthemums, roses, lilies, and the like. The mushrooms may include button mushroom, black mushroom, oyster mushroom, shiitake mushroom, and the like.

Figure 36:
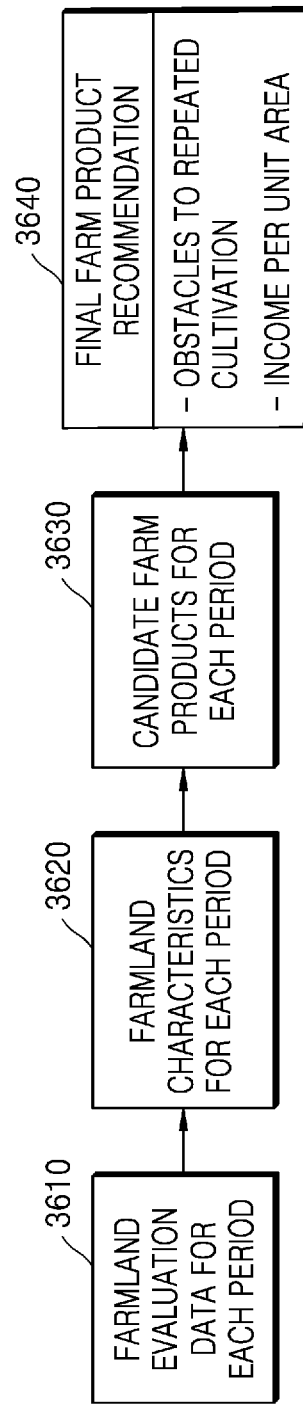
FIG. 36 is a diagram for describing a method of recommending a final farm product on the basis of farmland evaluation data for each period according to an embodiment.

FIG. 36 is a diagram for describing a method of recommending a final farm product on the basis of farmland evaluation data for each period according to an embodiment.

Referring to FIG. 36, the server 20 may receive farmland evaluation data 3610 for each period for a predetermined farmland from the farm vehicle 10, and perform a determination 3620 of farmland characteristics for each period on the basis of the received farmland evaluation data. In addition, the server 20 may determine candidate farm products 3630 for each period suitable for the predetermined farmland on the basis of the determined farmland characteristics for each determined period. In addition, the server 20 may perform a recommendation 3640 of the final farm product in consideration of obstacles to repeated cultivation and income per unit area of the candidate farm products.

The server 20 may receive the farmland evaluation data 3610 for each period for the predetermined farmland from the farm vehicle 10. The period may be set in units such as season, half year, quarter, a month.

In an embodiment, the farmland evaluation data may include driving data of the farm vehicle 10. The driving data may include at least one of pieces of accident-related data, failure-related data, and traveling-related data of the farm vehicle 10. In addition, farming-work-performing data of the farm vehicle 10 may be included in the farmland evaluation data. The farming-work-performing data may include at least one of pieces of farm equipment-related data, farm product-related data, and farmland-related data.

The server 20 may perform the determination 3620 of the farmland characteristics for each period on the basis of the farmland evaluation data for each period.

Even in the same farmland, the farmland characteristics for each period may be different. For example, in the case of farmland in a region in which seasonal changes are distinct, at least one of physical characteristics, chemical characteristics, and biological characteristics of the corresponding farmland may vary by season, quarter, or month.

The server 20 may determine the candidate farm products 3630 for each period suitable for the predetermined farmland on the basis of the determined farmland characteristics for each period.

Since the farmland characteristics for each period may be different even in the same farmland, the server 20 may determine the candidate farm products suitable for the predetermined farmland for each period. For example, the server 20 may determine A farm product, B farm product, and C farm product as candidate farm products in the predetermined farmland suitable for summer, and may determine D farm product, E farm product, and F farm product as candidate farm products in the predetermined farmland suitable for winter.

The server 20 may perform the recommendation 3640 of the final farm product in consideration of at least one of the obstacles to repeated cultivation and the income per unit area of the candidate farm products.

There are various factors that cause obstacles to repeated cultivation, for example, when the same farm product is planted on a specific farmland, only nutrients needed by the corresponding farm product are continuously consumed from soil's manure, and, the farm product may become vulnerable to disease and pests because the disease and pests, which are attracted to the corresponding farm product, attack the farm product. The soil disease includes soft rot (Chinese cabbage or cabbage), *Phytophthora* (cucumber or red pepper), *Verticillium* wilt (tomato or red pepper), and the like.

Accordingly, the server 20 may recommend the final farm product in consideration of the obstacles to repeated cultivation of the candidate farm products.

In order to remove the obstacles to repeated cultivation, a farm product that require more manure and a farm product that require less manure may be cultivated alternately. For example, in a situation in which A farm product, B farm product, and C farm product are determined as candidate farm products in the predetermined farmland suitable for summer, and D farm product, E farm product and F farm product are determined as candidate farm products in the predetermined farmland suitable for winter, the server 20 may recommend A farm product requiring a large amount of manure and D farm product requiring a small amount of manure as final farm products suitable for cultivation in summer and winter, respectively.

In addition, the server 20 may recommend the final farm product in consideration of the income per unit area of the candidate farm products. For example, in a situation in which A farm product, B farm product, and C farm product are determined as candidate farm products in the predetermined farmland suitable for summer, and D farm product, E farm product and F farm product are determined as candidate farm products in the predetermined farmland suitable for winter, the server 20 may recommend A farm product and E farm product, which have the highest income per unit area, as final farm products suitable for cultivation in summer and winter, respectively.

In addition, the server 20 may perform recommend the final farm product in consideration of both the obstacles to repeated cultivation and the income per unit area of the candidate farm products. For example, the server 20 may firstly recommend A farm product and B farm product requiring a large amount of manure as the farm products suitable for cultivation in winter and recommend D farm product requiring a small amount of manure as the farm products suitable for cultivation in summer, and may secondarily recommend A farm product and D farm product, which have the largest income per unit area, as final farm products suitable for cultivation in summer and winter, respectively.

Figure 37:
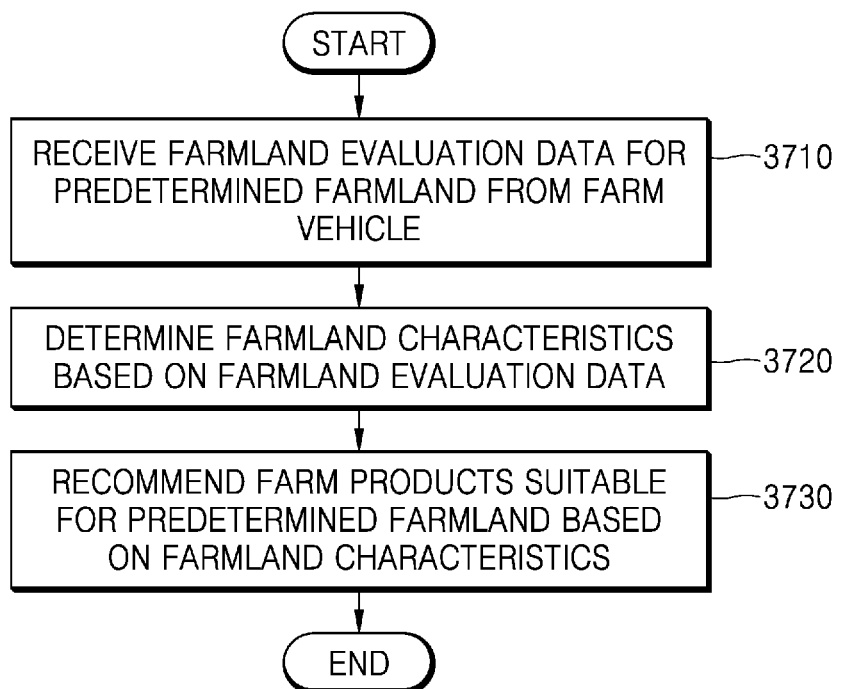
FIG. 37 is a flowchart illustrating a method of recommending farm products suitable for farmland characteristics according to an embodiment.

FIG. 37 is a flowchart illustrating a method of recommending farm products suitable for farmland characteristics according to an embodiment.

The method of recommending farm products suitable for farmland characteristics illustrated in FIG. 37 relates to the embodiments described above with reference to the drawings, and thus, although contents are omitted below, the contents described in the above drawings may also be applied to the method of FIG. 37.

Referring to FIG. 37, in operation 3710, the processor may receive farmland evaluation data for a predetermined farmland from the farm vehicle.

In an embodiment, the processor may receive driving data of the farm vehicle as the farmland evaluation data. The driving data may include at least one of pieces of accident-related data, failure-related data, and traveling-related data of the farm vehicle.

In addition, the processor may receive farming-work-performing data of the farm vehicle as the farmland evaluation data. The farming-work-performing data may include at least one of pieces of farm equipment-related data, farm product-related data, and farmland-related data.

In operation 3720, the processor may determine farmland characteristics on the basis of the farmland evaluation data.

In an embodiment, the processor may determine the farmland characteristics on the basis of the driving data.

In addition, the processor may determine the farmland characteristics on the basis of the farming-work-performing data.

The farmland characteristics may include at least one of physical characteristics, chemical characteristics, and biological characteristics.

In operation 3730, the processor may recommend farm products suitable for the predetermined farmland on the basis of the farmland characteristics.

Figure 38:
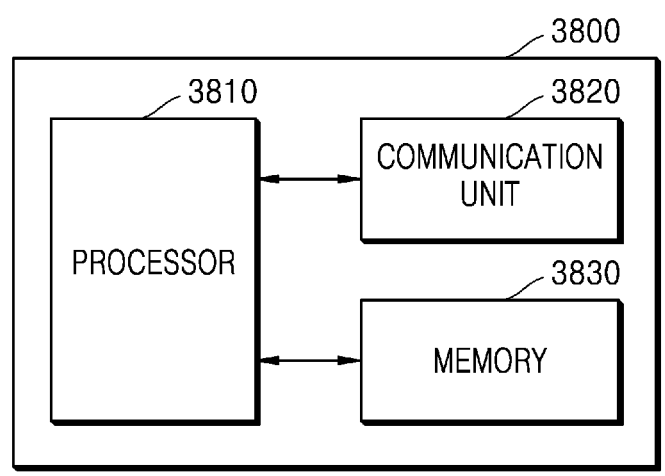
FIG. 38 is a block diagram of a farmland recommendation server according to an embodiment.

FIG. 38 is a block diagram of a farmland recommendation server according to an embodiment.

Referring to FIG. 38, a farmland recommendation server 3800 may include a processor 3810, a communication unit 3820, and a memory 3830. Only components related to the embodiment are illustrated in the farmland recommendation server 3800 of FIG. 38. Accordingly, it will be appreciated by those skilled in the art that other general components may be further included in addition to the components illustrated in FIG. 38.

The communication unit 3820 may include one or more components that enable wired/wireless communication with an external server or an external device. For example, the communication unit 3820 may include at least one of a short-range communication unit (not shown), a mobile communication unit (not shown), and a broadcast receiving unit (not shown).

The memory 3830 is hardware for storing various pieces of data processed in the farmland recommendation server 3800, and may store programs for processing and control operations of the processor 3810. The memory 3830 may store payment information, user information, and the like.

The memory 3830 may include random access memory (RAM) such as dynamic random access memory (DRAM), static random access memory (SRAM), or the like, read-only memory (ROM), electrically erasable programmable read-only memory (EEPROM), compact disk ROM (CD-ROM), Blu-ray or other optical disk storage, hard disk drive (HDD), solid state drive (SSD), or flash memory.

The processor 3810 controls overall operations of the farmland recommendation server 3800. For example, the processor 3810 may generally control an input unit (not shown), a display (not shown), the communication unit 3820, the memory 3830, and the like by executing the programs stored in the memory 3830. The processor 3810 may control the operations of the farmland recommendation server 3800 by executing the programs stored in the memory 3830.

The processor 3810 may control at least some of the operations of the farmland recommendation server 3800 described above with reference to FIGS. 1 to 37.

The processor 3810 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electrical units for performing functions.

Figure 39:
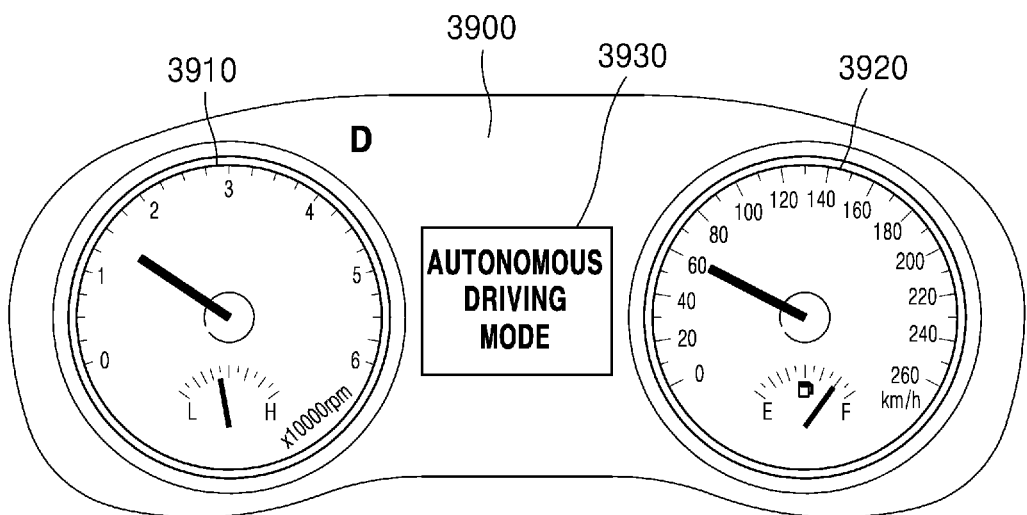
FIG. 39 illustrates an example of a dashboard of a farm vehicle according to an embodiment of the disclosure.

FIG. 39 illustrates an example of a dashboard of a farm vehicle according to an embodiment of the disclosure.

Referring to FIG. 39, a dashboard 3900 of the farm vehicle may include a speed display unit 3910, an engine RPM display unit 3920, and a display 3930. In addition, although not directly illustrated in FIG. 39, various warning lights indicating states of the farm vehicle, such as a remaining fuel amount and engine warning light, a tire pressure warning light, a brake pad damage warning light, a low battery warning light, and the like, may be displayed.

The display 3930 of the dashboard 3900 is a display device positioned in the dashboard. In an embodiment, the display 3930 may be a liquid crystal display (LCD), but the present disclosure is not necessarily limited thereto, and all types of display devices are applicable to the display 3930 without limitation. In addition, the display 3930 may display all states related to a farm vehicle. In particular, the display 3930 may display information related to a driving mode of the farm vehicle.

As described above, the processor 160 of the farm vehicle may control autonomous driving of the farm vehicle, and may determine whether the current driving mode of the farm vehicle is an autonomous driving mode or a manual driving mode. Since the driving mode is important information that necessarily needs to be notified to a passenger of the farm vehicle, the processor 160 may display a phrase, which indicates the current mode, on the display 3930 of the dashboard 3900 of the farm vehicle.

According to an embodiment, when the driving mode of the farm vehicle is an autonomous driving mode, the processor 160 may determine whether an emergency situation corresponding to the farm vehicle is generated for a first cycle.

Here, the emergency situation may mean a situation in which the farm vehicle may not perform the autonomous driving normally, or a situation in which the autonomous driving may harm the farm vehicle itself, a farm product itself, or the passenger when the autonomous driving is performed. Whether the emergency situation occurs may be determined by a determination criterion defined by the processor 160.

Figure 40:
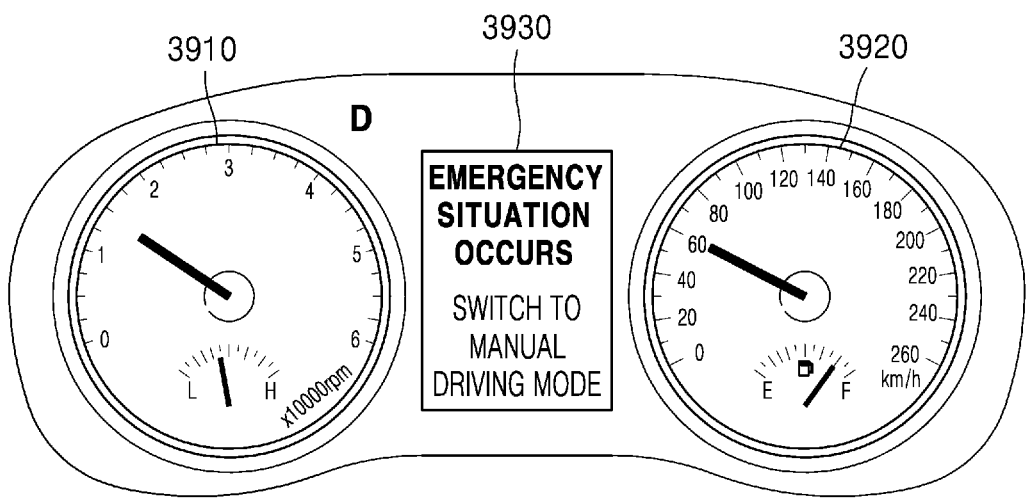
FIG. 40 illustrates an example of a dashboard of the farm vehicle according to another embodiment of the disclosure.

FIG. 40 illustrates an example of a dashboard of the farm vehicle according to another embodiment of the disclosure.

In the embodiment of FIG. 40, it is exemplified that, when the processor 160 determines that an emergency situation has occurred, the processor 160 switches a driving mode of the farm vehicle to a manual driving mode, and then displays a phrase, which indicates that the emergency situation has occurred and the driving mode is switched to the manual driving mode, on the dashboard 3900. Accordingly, even when a passenger of the vehicle does not directly detect the emergency situation, the passenger may see the display 3930 of the dashboard 3900 and confirm that the emergency situation has occurred and the driving mode of the farm vehicle is switched to the manual driving mode.

Meanwhile, the processor 160 may first receive sensing data from one or more sensors of the farm vehicle to determine whether the emergency situation occurs. According to an embodiment, the processor 160 may receive the sensing data directly from the sensor, but may receive the sensing data from an electric control unit (ECU) of the farm vehicle, which is connected to the sensor. In an embodiment, the ECU may receive pieces of data from various sensors of the vehicle and perform computation on the data to control actuator devices such as a piston, an igniter, and the like, and may derive stable output and fuel efficiency optimized for a driving situation. The ECU of the farm vehicle referred to herein may be a domain ECU of various devices, but may be an individual ECU present for each device in the vehicle. In particular, since the farm vehicle is equipped with a controller for cultivation as described above, the processor 160 may receive sensing data from an ECU existing in a device related to an operation of a cultivator.

In a specific example, an engine ECU may be connected to an air flow sensor (AFS), an air temperature sensor (ATS), a water temperature sensor (WTS), a throttle position sensor (TPS), or the like to receive a sensed value from each sensor, and the processor 160 may receive sensing data of each sensor through the engine ECU. That is, the processor 160 may be directly connected to the individual sensors, but may be connected to the sensors through the ECU to receive the sensing data.

In another example, the farm vehicle may be equipped with various sensors for performing autonomous driving. For example, the farm vehicle may be equipped with sensors such as LiDARs configured to perform functions of monitoring blind spots, reporting lane changes, controlling automatic cruising, and the like, cameras configured to perform functions of detecting lanes, monitoring surrounding areas, identifying passenger's states, and the like, and lasers configured to perform functions of detecting obstacles, securing night vision, controlling lighting, and the like. The processor 160 may receive pieces of sensing data from these sensors.

Next, the processor 160 may use the received sensing data to compare the sensing data with a determination criterion corresponding to each of the one or more sensors, and when the determination criterion is satisfied, the processor 160 may determine that an emergency situation has occurred. As described above, the farm vehicle may be equipped with a plurality of sensors. Since pieces of data sensed by each of the plurality of sensors are different from each other, the determination criterion for determining an emergency situation may also be different for each of the plurality of sensors.

In an example, when an suctioned air amount sensed by the AFS is greater than a predetermined value, the processor 160 may determine that an emergency situation has occurred in the farm vehicle. In another example, the processor 160 may determine that an emergency situation has occurred in the farm vehicle when a distance between the farm vehicle and a front object, which is sensed by the LiDAR of the farm vehicle, is less than or equal to a predetermined value.

In addition, when the processor 160 determines that an emergency situation has occurred because the determination criterion is satisfied, the processor 160 may determine the type of the emergency situation. More specifically, the processor 160 may determine whether the generated emergency situation is a first emergency situation related to the farm vehicle itself or a second emergency situation related to the environment outside the farm vehicle. As a result, it is possible to specify the determination criterion for each sensor and efficiently respond to emergency situations by classifying the types of the emergency situations.

More specifically, the first emergency situation related to the farm vehicle itself may be referred to a case in which there is an abnormality in each device provided in the farm vehicle and detected by the processor 160. In an example, the processor 160 may determine that an emergency situation has occurred when there is no response from some devices in the vehicle. At this point, the processor 160 may determine that an emergency situation has occurred by dividing devices into required devices in which an emergency situation is determined to occur when there is no response therefrom, and optional devices in which only a warning light or display guidance is provided when there is no response therefrom.

In another example, when determining whether the first emergency situation occurs, the processor 160 may compare pieces of sensing data of the plurality of sensors with each other, and when the comparison result does not meet the determination criterion, the processor 160 may determine that an emergency situation has occurred. In this regard, the first emergency situation may be related to the problem inside the vehicle and may be an error related to the control of a steering device, an acceleration device, and a deceleration device of the vehicle, and such an error may cause a serious malfunction of the vehicle, so that the processor 160 may determine the emergency situation by using a plurality of pieces of sensing data.

More specifically, the processor 160 may compare sensing data of a sensor, which is related to a control command of each device, with sensing data of a sensor, which is related to an operation of the controlled device. When it is determined that the control command and the operation of the controlled device do not match by comparing the pieces of sensing data, the processor 160 may determine that the first emergency situation has occurred. In a specific example, the processor 160 may compare sensing data of a brake pedal sensor related to a control command of the deceleration device with sensing data of a wheel speed sensor related to an operation of the actual deceleration device to detect that abnormality has occurred in the deceleration device and determine an emergency situation.

Meanwhile, the second emergency situation related to the environment outside the farm vehicle may be a situation in which it is not related to the farm vehicle itself, but the autonomous driving of the farm vehicle should be stopped to prevent damage to farm products, the vehicle, or a passenger on the basis of the pieces of sensing data received by the processor 160 from each of the sensors. For example, the second emergency situation may be a situation in which an obstacle appears in front or behind the farm vehicle, or a work may not be performed because soil quality is not suitable for the work, or a farm product that does not match the current work setting may be detected. Since the farm vehicle is a vehicle that performs an autonomous cultivation in addition to a general autonomous driving vehicle, a case in which the vehicle needs to be confirmed by the user or to be stopped in relation to cultivation may also be determined as the second emergency situation.

Subsequently, the processor 160 may determine whether the emergency situation has been resolved in the manual driving mode for a second cycle. Whether the emergency situation has been resolved may be determined by detecting whether the determination criterion is not satisfied for the second cycle. For example, when it is determined that there is an obstacle in front of the camera on the basis of the sensing data of the camera, and the driving mode is switched to the manual driving mode, and when it is determined that there is no obstacle in front of the camera by obtaining and determining the sensing data of the camera for the second cycle, it may be determined that the emergency situation has been resolved.

In an embodiment, the second cycle may be longer than the first cycle. The first cycle is related to whether an emergency situation occurs, and the second cycle is related to whether the emergency situation is resolved. Thus, in order to reduce the risk of the autonomous driving connected to the emergency situation, the processor 160 may set the first cycle, during which whether an emergency situation has occurred is determined in the autonomous driving, to be longer than the second cycle during which whether the emergency situation has been resolved is determined in the manual driving. Accordingly, it is possible to more frequently check whether an emergency situation has occurred while operating in the autonomous driving mode.

Meanwhile, in an embodiment, in determining whether the emergency situation has been resolved, when the processor 160 determines that the determination criterion is not satisfied for the second cycle, the processor 160 may determine that the emergency situation has been resolved only when a security check is passed after performing the security check on a network connected between the processor 160 in the vehicle and the device or between the sensors. In the emergency situation, there is a problem related to the vehicle or external situations, and such a problem may occur even when the network in the vehicle is hacked. Thus, in determining whether the emergency situation has been resolved, it is possible to determine that the emergency situation has been resolved after performing the security check on the network. Accordingly, through the security check, in addition to the emergency situation generated due to the problem of the farm vehicle itself or the problem of an external situation, it is possible to accurately determine whether an emergency situation caused by hacking has been resolved.

Meanwhile, since the type of the network in the vehicle may be different for each device in the vehicle, the processor 160 may perform different security checks according to the type of the network.

Figure 41:
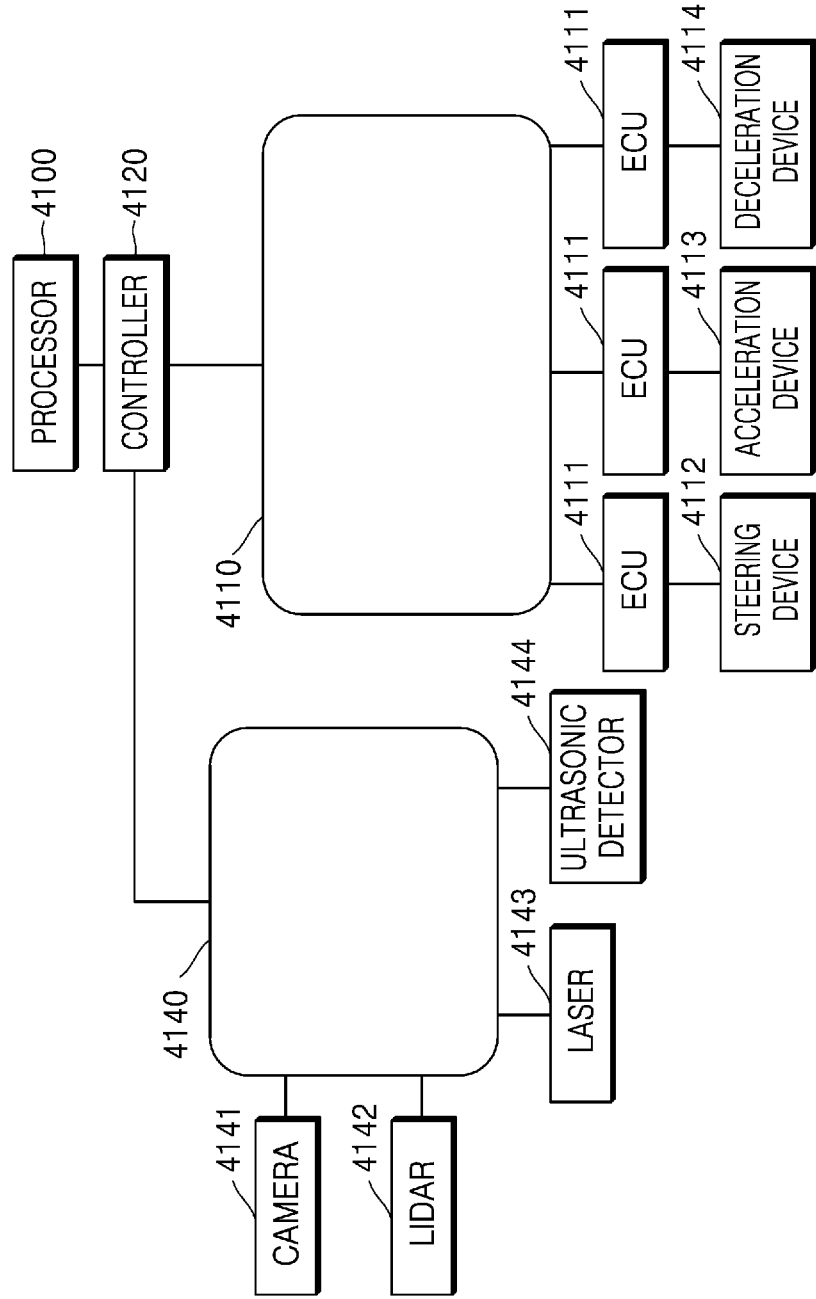
FIG. 41 is a diagram illustrating an example of determining that an emergency situation has been resolved for each network, according to an embodiment.

FIG. 41 is a diagram illustrating an example of determining that an emergency situation has been resolved for each network, according to an embodiment.

In an embodiment, the processor 4100 may perform different security checks according to the type of the network when determining whether the emergency situation has been resolved, and determine that the emergency situation has been resolved only when the security check corresponding to the type of the network has passed. When the processor 4100 in the vehicle communicates with a plurality of devices in the vehicle, different networks may be used depending on characteristics of the devices. More specifically, the processor 4100 communicates with the devices in the vehicle through a controller 4120, and networks 4110 and 4140 through which the controller 4120 is connected to each device may be different depending on the characteristics of each device. In this case, the different networks may include a first network 4110 and a second network 4140, but the present disclosure is not necessarily limited thereto, and a plurality of different types of networks may be added.

According to an embodiment, the first network 4110 may be a CAN. In the embodiment of FIG. 41, the first network 4110 may be connected to an ECU 4111 of each of a steering device 4112, an acceleration device 4113, and a deceleration device 4114. The CAN network is a network that operates by connecting several ECUs to a CAN bus and may be used to communicate with traditional vehicle devices such as a steering device, an acceleration device, and a deceleration device. In addition, although not illustrated in FIG. 41, the first network 4110 may transmit pieces of sensing data of various sensors included in the steering device 4112, the acceleration device 4113, and the deceleration device 4114 to the processor 4100.

Further, according to an embodiment, the second network 4140 may be a wired or wireless network in the vehicle. In this case, the wired/wireless network in the vehicle, which may become a second network, is a data communication network in a comprehensive sense that enables the devices or the devices and the processor to smoothly communicate with each other, and may include a wired Internet, a wireless Internet, and a mobile wireless communication network. In the embodiment of FIG. 41, the devices in the vehicle, which are connected to the second network 4140, may be a sensor, such as a camera 4141, a LiDAR 4142, a laser 4143, and an ultrasonic detector 4144. That is, the second network may be a network provided for communicating with a device that is further necessary for autonomous driving rather than a traditional device in the vehicle.

Since the first network 4110 and the second network 4140 are different networks, the processor 4100 may perform a security check corresponding to the type of the network to which the sensor is connected, and determine that the emergency situation has been resolved only when the security check is passed.

For example, in the case of the first network 4110, such as a CAN network, since all devices are connected through a CAN BUS network, when a network attack, such as causing a bus OFF state, occurs, the network attack may seriously affect the vehicle and the user. Accordingly, the security check corresponding to the first network 4110 may be performed more strictly than a security check of a general-purpose network. Accordingly, the processor 4100 of the present disclosure may determine whether there is a defect in the first network 4110 using a security check suitable for the first network 4110.

As another example, in the case of the second network 4140, the second network 4140 may be a general-purpose wired/wireless network, and thus the processor 4100 of the present disclosure may perform a security check suitable for the second network 4140 using security technology of a general-purpose network. Thus, by performing different security checks for each network connected to the sensors in the vehicle, the processor 4100 may determine whether the emergency situation has been resolved in a state in which the accuracy of the security check is increased and security is verified.

Subsequently, the processor 4100 may change the driving mode of the farm vehicle to the autonomous driving mode when the emergency situation has been resolved. That is, the farm vehicle according to an embodiment may operate in the autonomous driving mode by automatically determining whether the emergency situation is automatically resolved even the emergency situation occurs during the autonomous driving mode and thus the driving mode is changed to the manual driving mode.

In general, in order for the autonomous driving vehicle to be set to the autonomous driving mode, a separate input is required by the user riding on the vehicle. However, in this case, there is a risk that the driving mode may enter the autonomous driving mode according to the user's arbitrary determination even in a situation in which the autonomous driving is not suitable, and in the opposite case, even in a situation in which the autonomous driving is possible, there is a case in which the user does not recognize the situation and continues to drive manually. However, in the present disclosure, when the autonomous driving mode is switched to the manual driving mode due to an emergency situation, whether the emergency situation has been resolved is automatically detected, and the manual driving mode automatically returns to the autonomous driving mode. As a result, the driving mode of the farm vehicle may be automatically switched to the autonomous driving mode even when the user does not determine whether the emergency situation has been resolved.

Figure 42:
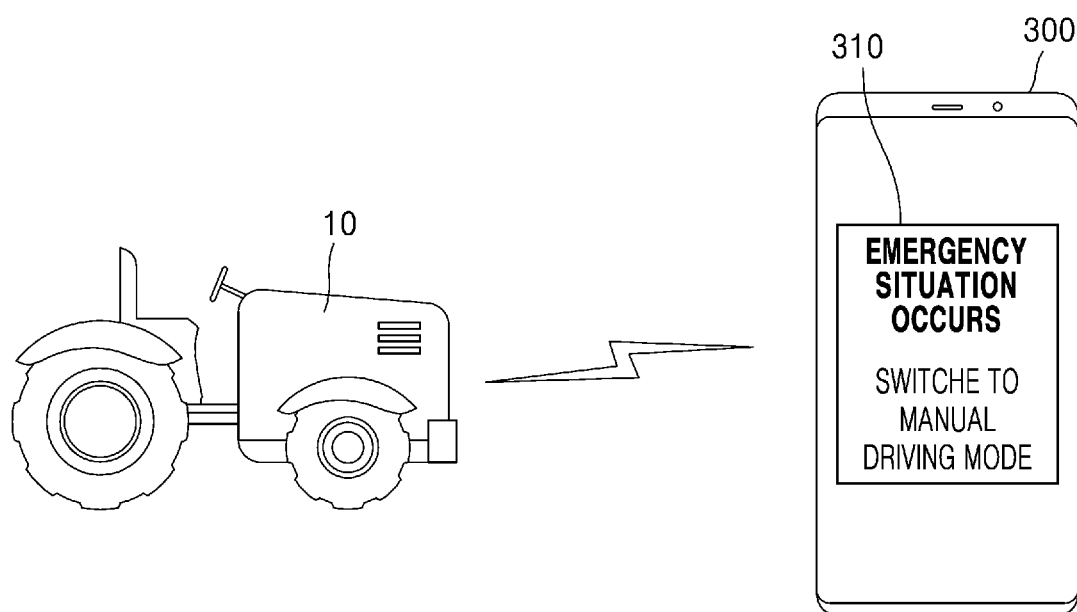
FIG. 42 is a view illustrating an example of providing an emergency situation alarm to a user terminal according to an embodiment.

FIG. 42 is a view illustrating an example of providing an emergency situation alarm to a user terminal according to an embodiment.

When there is not user who rides on the vehicle, the processor 160 may provide an alarm indicating that an emergency situation has occurred to the user terminal 300. Since the farm vehicle 10 is an autonomous driving vehicle, even when there is not user riding on the vehicle, the farm vehicle 10 may be autonomously driven and may perform cultivation autonomously. However, when the driving mode is switched to the manual driving mode due to an emergency situation, the user who does not ride on the vehicle is difficult to recognize the emergency situation. Accordingly, the processor 160 may provide an alarm 310 of the same content as the display 3930 of the dashboard 3900 to the user terminal 300. Thus, the user may recognize that the driving mode is changed because an emergency situation has occurred even in a situation in which the user does not directly drive the farm vehicle.

Figure 43:
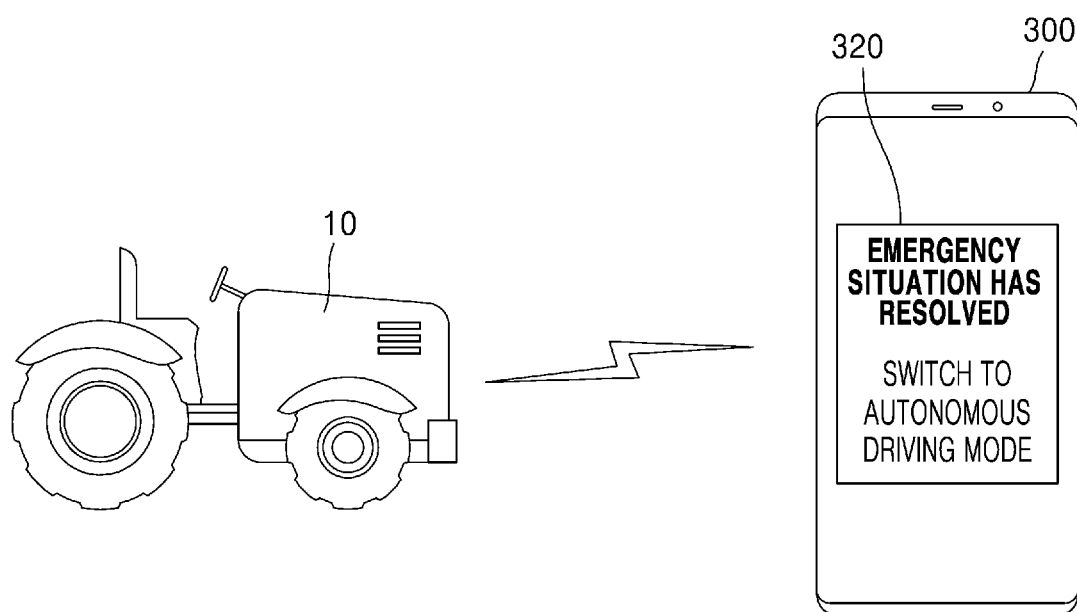
FIG. 43 is a view illustrating an example of providing an emergency situation resolution alarm to the user terminal according to an embodiment.

FIG. 43 is a view illustrating an example of providing an emergency situation resolution alarm to the user terminal according to an embodiment.

When there is no user who rides on the vehicle, the processor 160 may provide an alarm indicating that the emergency situation has been resolved to the user terminal 300. In the example of FIG. 42, although the alarm indicating that an emergency situation has occurred is provided to the user, the user may not ride on the farm vehicle. When the emergency situation of the farm vehicle is resolved as a period of time has passed in a state in which the user does not ride on the vehicle, the driving mode of the farm vehicle may be switched to autonomous driving mode, as described above. In this case, the processor 160 may provide an alarm indicating that the emergency situation has been resolved and the driving mode is changed to the autonomous driving mode to the user terminal 300. As a result, the driving mode may be changed to the autonomous driving mode without the user, and the user may be informed that the emergency situation has been resolved and the user does not need to ride on the vehicle.

Figure 44:
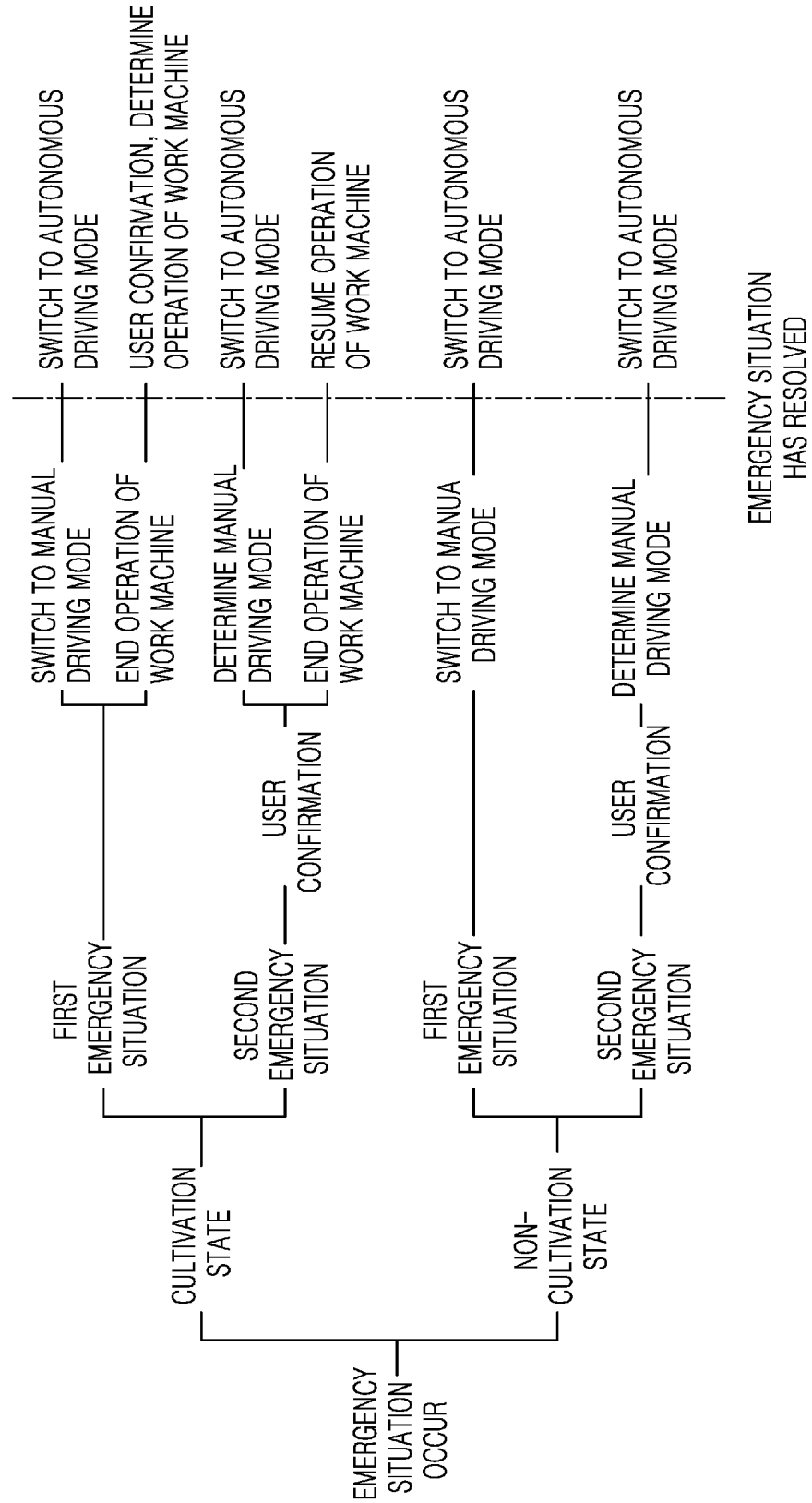
FIG. 44 illustrates an example of cases that may occur for each emergency situation according to an embodiment.

FIG. 44 illustrates an example of cases that may occur for each emergency situation according to an embodiment.

Referring to FIG. 44, according to an embodiment, there are a plurality of cases for determining an operation of a work machine for autonomous cultivation, depending on whether the vehicle is in a cultivation/non-cultivation state, whether an emergency situation is a first emergency situation/second emergency situation, and operations to be performed when the emergency situation is resolved.

More specifically, when an emergency situation occurs, a process may be changed depending on whether the farm vehicle is currently in the cultivation state or the non-cultivation state.

In addition, according to an embodiment, when determining whether a specific emergency situation occurs, an alarm related to the occurrence of the emergency situation is displayed, and whether the emergency situation occurs is determined by receiving whether the user has confirmed the emergency situation. Specifically, when an emergency situation is determined as the second emergency situation related to the external environment of the farm vehicle, it is possible to determine that the emergency situation has occurred only when the user confirms that the emergency situation has occurred. As described above, in the case of the second emergency situation related to the environment outside the vehicle, seriousness may be lower than in the first emergency situation related to the defect of the vehicle itself. Accordingly, when the first emergency situation such as the appearance of an obstacle occurs, rather than immediately determining the occurrence of the emergency situation, the emergency situation may be determined to occur by receiving the confirmation of the user for the alarm, and the driving mode may be changed to the autonomous driving mode.

In addition, according to an embodiment, after determining that the emergency situation has been resolved, the driving mode of the vehicle may be switched to the autonomous driving mode, as described above. In addition, since the operation of the work machine is also automatically stopped when the emergency situation occurs in the cultivation state, the operation of the work machine may also be resumed while being switched to the autonomous driving mode. At this point, in the case of the first emergency situation, it is possible to receive a confirmation from the user whether to resume the operation of the work machine and determine to operate the work machine only when there is the confirmation of the user. This is because it is highly likely that the vehicle itself has a defect in the case of the first emergency situation and thus a risk may be reduced by resuming the operation after receiving the confirmation from the user rather than automatically resuming the operation of the work machine.

Figure 45:
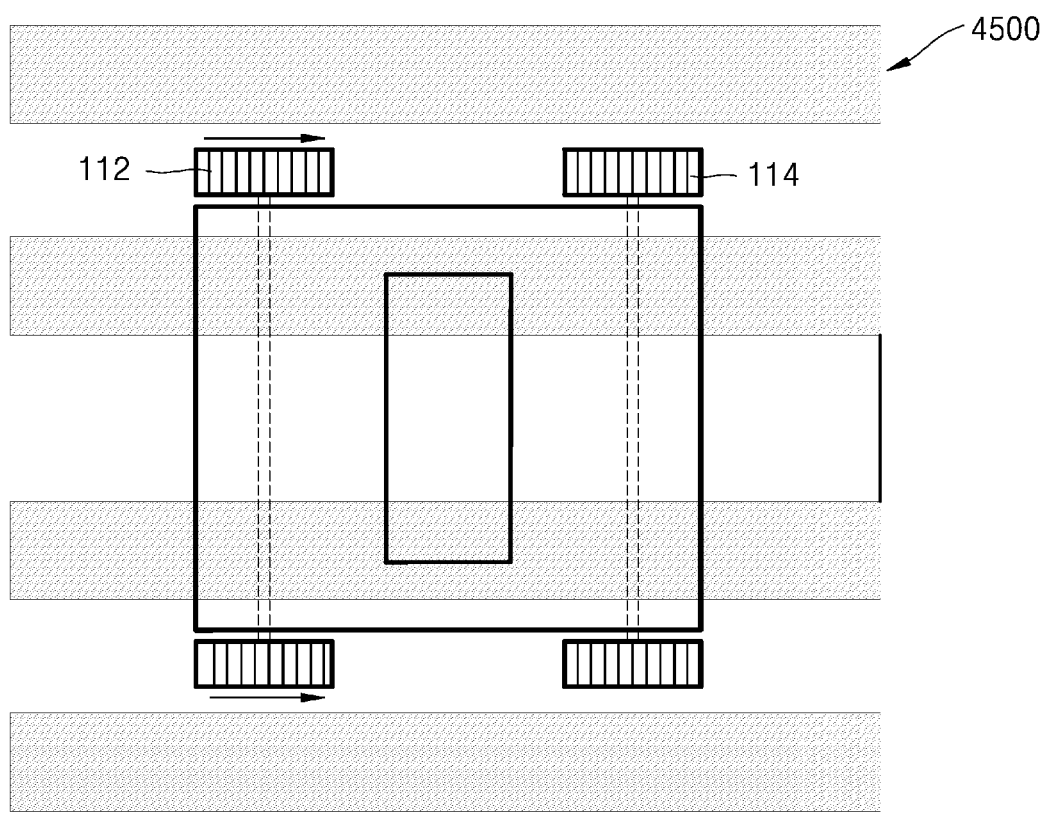
FIG. 45 illustrates an example of a situation in which a farm vehicle performs autonomous driving in a cultivation area according to an embodiment.

FIG. 45 illustrates an example of a situation in which a farm vehicle performs autonomous driving in a cultivation area according to an embodiment.

Referring to FIG. 45, a farm vehicle 100 may include a front wheel 114 and a rear wheel 112. There may be one or more farm product areas 4500 in the cultivation area in which the farm vehicle 100 performs cultivation. In this case, the farm product area 4500 may be an area in which it is determined that one or more farm products are planted and may be sensed by a camera in the vehicle. In general, as shown in FIG. 45, the farm product areas 4500 may alternately present with a specific width and a specific separation distance. In this case, the farm vehicle 100 may perform cultivation without damaging farm products only when the wheels 112 and 114 are positioned in areas, in which there are no farm products, between the farm product areas 4500. In addition, the cultivation may be performed efficiently only when a direction of the wheels 112 and 114 matches an alignment direction of the farm product areas 4500.

Figure 46:
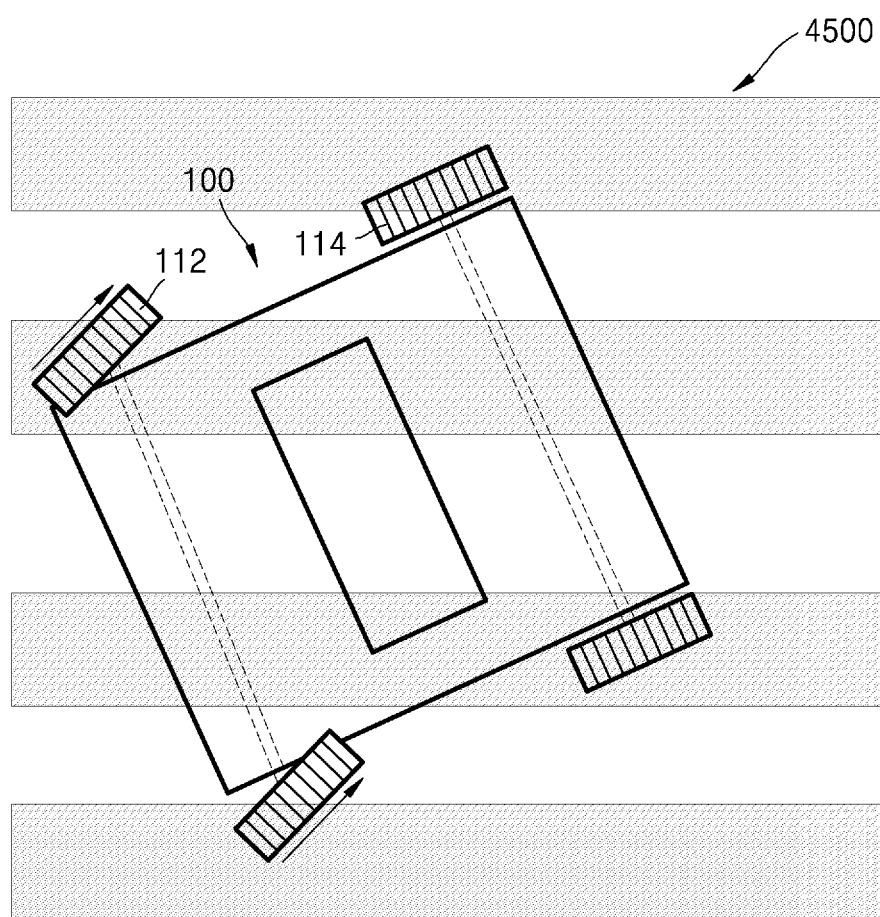
FIG. 46 illustrates an example of a situation in which a position of the farm vehicle is moved when a driving mode is switched to an autonomous driving mode according to an embodiment.

FIG. 46 illustrates an example of a situation in which a position of the farm vehicle is moved when a driving mode is switched to an autonomous driving mode according to an embodiment.

When an emergency situation occurs in the farm vehicle, the wheels 112 and 114 of the vehicle may be positioned in the farm product areas 4500 for several reasons, and the direction of the wheels may not match the direction of the alignment direction of the farm product areas. As described above, according to an embodiment of the present disclosure, when the emergency situation is resolved, the driving mode of the vehicle is changed to the autonomous driving mode even without an additional control of the user, and thus, when the autonomous driving mode is started in the case in which positions and direction of the wheels are not correct, as shown in FIG. 46, the farm product may be damaged.

Accordingly, according to an embodiment, when the emergency situation is resolved and the driving mode is changed to the autonomous driving mode, positions and direction of the wheels 112 and 114 of the farm vehicle 100 may be obtained, and positions and alignment direction of the farm product areas 4500 present in a predetermined radius about the farm vehicle 100 may be obtained. At this point, the alignment direction of the wheels with respect to the alignment direction of the farm product areas may be measured by one or more sensors installed in the farm vehicle.

Further, when the positions of the wheels 112 and 114 are deviated from the positions of the farm product areas 4500, a wheel control command for moving the farm vehicle 100 may be generated so that the positions of the wheels match the alignment direction of the farm product areas 4500. The wheel control command may be a command to position the wheels in the area in which the farm products are positioned and to make the direction of the wheels match the alignment direction of the farm product areas as in the example illustrated in FIG. 45.

Further, according to an embodiment, after the wheels are moved according to the control command for moving the wheels, the autonomous driving of the farm vehicle is started and the work machine may be driven in autonomous cultivation. As a result, as in FIG. 45, by ensuring that the wheel is not positioned on the farm product and the direction of the wheels match the alignment direction of the farm product areas before starting the autonomous driving mode properly, damage to the farm products may be prevented.

Figure 47:
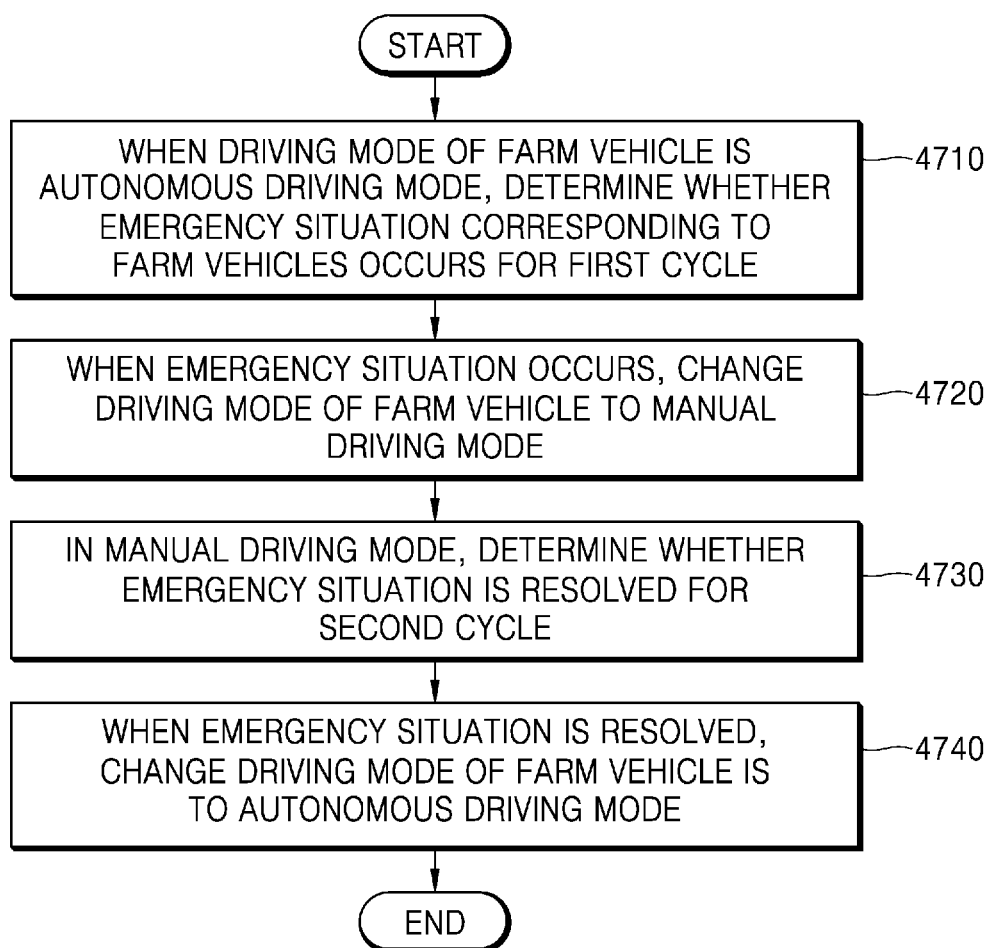
FIG. 47 is a flowchart illustrating an autonomous driving method of the farm vehicle according to an embodiment.

FIG. 47 is a flowchart illustrating an autonomous driving method of the farm vehicle according to an embodiment.

Referring to FIG. 47, when a driving mode of the farm vehicle is an autonomous driving mode, whether an emergency situation corresponding to the farm vehicles occurs is determined for a first cycle (4710).

When the emergency situation occurs, the driving mode of the farm vehicle is changed to a manual driving mode (4720).

In the manual driving mode, it is determined whether the emergency situation is resolved for a second cycle (4730).

When the emergency situation is resolved, the driving mode of the farm vehicle is changed to the autonomous driving mode (4740).

meanwhile, the method may be recorded as a program that may be executed on a computer, and may be implemented in a general-purpose digital computer operating the program using a computer-readable recording medium. In addition, the structure of the data used in the method described above may be recorded on a computer-readable recording medium through various means. Examples of the computer-readable recording medium include storage media such as magnetic storage media (e.g., ROM, floppy disks, hard disks, and the like), and optical read media (e.g., CD-ROMs, DVDs, and the like).

The above description of the present specification is only exemplary, and it will be understood by those skilled in the art that various modifications can be made without departing from the scope of the present disclosure and without changing essential features. Therefore, the embodiments should be understood to be exemplary and not limiting in every aspect. For example, each component described as a single entity may be distributed and implemented, and components described as being distributed may also be implemented in a combined form.

The scope of the present embodiment will be defined by the following claims rather than the above detailed description, and all changes and modifications derived from the meaning and the scope of the claims and equivalents thereof should be understood as being included in the scope of the present disclosure.

The method may be recorded as a program that may be executed on a computer, and may be implemented in a general-purpose digital computer operating the program using a computer-readable recording medium. In addition, the structure of the data used in the method described above may be recorded on a computer-readable recording medium through various means. Examples of the computer-readable recording medium include storage media such as magnetic storage media (e.g., ROM, floppy disks, hard disks, and the like), and optical read media (e.g., CD-ROMs, DVDs, and the like).

According to the technical solution of the present disclosure, an operation of the slave vehicle configured to collect a bale can be controlled even when there is no operator for the slave vehicle, so that time and cost required to collect the bale can be reduced.

Further, even when there are a plurality of slave vehicles, a bale collection slave vehicle can be determined on the basis of a distance, so that it is possible to efficiently collect bales.

Further, even when there is no separate input, it is possible to determine that there is a bale, which is required to be collected, by detecting a bale generation completion signal through a camera.

Further, a more accurate bale collection can be made by providing shape information of a bale to be collected by a bale collection slave vehicle.

Further, it is possible to collect a bale more accurately by determining even a pose of a bale collection slave vehicle when the bale collection slave vehicle performs a collection operation.

According to the technical solution of the present disclosure, operations of slave vehicles can be controlled by a master vehicle to enable efficiently and planned group farming work.

According to another technical solution of the present disclosure, when a large amount of farming work is required, a work time can be shortened without adding additional manpower.

According to another technical solution of the present disclosure, during platooning, variation in a farming work speed between vehicles can be prevented from occurring and farming work can be performed consistently.

According to another technical solution of the present disclosure, when a path of a master vehicle is changed, a driving command for slave vehicles is automatically reset, so that farming work during platooning can be performed consistently.

According to another technical solution of the present disclosure, even when a path of a slave vehicle is changed, the consistency of work during platooning can be maintained without affecting other vehicles.

According to another technical solution of the present disclosure, paths of vehicles of a vehicle group, which are arranged in series, can be efficiently changed.

According to the technical solution of the present disclosure, farm products suitable for a predetermined farmland can be more accurately and effectively recommended on the basis of farmland evaluation data obtained from a farm vehicle.

According to the technical solution of the present disclosure, a driving mode of a farm vehicle can be automatically switched to an autonomous driving mode even when there is no user's determination on the resolution of one emergency situation.

According to another technical solution of the present disclosure, it is possible to change a driving mode to an autonomous driving mode even without a user, and provide information indicating that an emergency situation has been resolved and there is no need to board to the user.

According to another technical solution of the present disclosure, even when a passenger, who boards on a farm vehicle, does not directly detect an emergency situation, the passenger can recognize that the emergency situation has occurred and a driving mode of the vehicle is switched to a manual driving mode.

According to another technical solution of the present disclosure, the types of emergency situations can be classified. and determination criteria for each sensor can be specified, so that the emergency situations can be efficiently responded to.

According to another technical solution of the present disclosure, it is possible to check more frequently whether an emergency situation occurs while an autonomous driving mode is performed.

According to another technical solution of the present disclosure, through a security check, in addition to an emergency situation generated due to a problem of a farm vehicle itself or a problem of an external situation, it is possible to accurately determine whether an emergency situation caused by hacking is resolved.

According to another technical solution of the present disclosure, by performing different security checks for each network connected to sensors in a vehicle, it is possible to determine whether an emergency situation is resolved in a state in which the accuracy of the security check is increased and security is verified.

According to another technical solution of the present disclosure, by ensuring that wheels are not positioned on a farm product and a direction of the wheels match an alignment direction of farm product areas before starting an autonomous driving mode properly, damage to the farm products can be prevented.

The above description of the present specification is only exemplary, and it will be understood by those skilled in the art that various modifications can be made without departing from the scope of the present disclosure and without changing essential features. Therefore, the embodiments should be understood to be exemplary and not limiting in every aspect. For example, each component described as a single entity may be distributed and implemented, and components described as being distributed may also be implemented in a combined form.

The scope of the present embodiment will be defined by the following claims rather than the above detailed description, and all changes and modifications derived from the meaning and the scope of the claims and equivalents thereof should be understood as being included in the scope of the present disclosure.

The invention claimed is:

1. A method of controlling autonomous driving of a farm vehicle,
   the method comprising:
      wherein the farm vehicle is operated in an autonomous driving mode or a manual driving mode,
      wherein the farm vehicle determines whether a problem occurs in at least one of a required device and an optional device of the farm vehicle every first cycle,
      wherein the farm vehicle determines that a first emergency situation occurs when the problem occurs in the required device,
      wherein the farm vehicle determines that a second emergency situation occurs when the problem occurs only in the optional device or a problem related to an external environment of the farm vehicle occurs,
   determining whether the first emergency situation corresponding to the farm vehicle occurs for the first cycle when a driving mode of the farm vehicle is the autonomous driving mode;
   changing the driving mode of the farm vehicle to the manual driving mode when the first emergency situation occurs;
   determining whether the first emergency situation is resolved in the manual driving mode for a second cycle; and
   changing the driving mode of the farm vehicle to the autonomous driving mode when the first emergency situation is resolved,
   wherein the farm vehicle operates with a work machine that receives power from a power take-off (PTO) device, and
   wherein the second cycle is longer than the first cycle.

2. The method of claim 1, wherein
   the determining of whether the first emergency situation has occurred includes:
   receiving sensing data from one or more sensors of the required device of the farm vehicle; and
   comparing the sensing data with a determination criterion corresponding to each of the one or more sensors and determining that the first emergency situation has occurred when the determination criterion is satisfied.

3. The method of claim 1, wherein, in the determining of whether the first emergency situation has occurred, pieces of sensing data of a plurality of sensors related to each other are compared, and when the comparison result does not meet a comparison determination criterion, it is determined that the first emergency situation has occurred.

4. The method of claim 1, wherein, in the determining of whether the second emergency situation has occurred, an alarm related to the occurrence of the second emergency situation is displayed, and it is determined whether the second emergency situation has occurred, on the basis of receiving of the emergency situation by a user.

5. The method of claim 1, wherein whether the first emergency situation is resolved is determined on the basis of a determination on whether the determination criterion is not satisfied performed for the second cycle.

6. The method of claim 5, wherein when the determination criterion is not satisfied for the second cycle, the first emergency situation is determined to be resolved only when a security check corresponding to a type of a network to which the one or more sensors are connected is passed after performing the security check on the network.

7. The method of claim 1, wherein when there is no user who rides on the farm vehicle, the changing of the driving mode to the manual driving mode includes providing an alarm indicating that the first emergency situation has occurred to a user terminal.

8. The method of claim 7, wherein
when there is no user who rides on the farm vehicle until a time point at which the first emergency situation is resolved after the alarm, notifying that the first emergency situation has occurred, is provided to the user terminal,
the changing of the driving mode to the manual driving mode further includes providing an alarm notifying that the first emergency situation is resolved and the driving mode is changed to the autonomous driving mode to the user terminal.

9. A non-transitory computer-readable recording medium having recorded thereon a program for executing the method of claim 1 by a computer.

10. A autonomous driving controllable farm vehicle,
wherein the farm vehicle includes a processor capable of controlling a device provided in the farm vehicle,
wherein the processor controls the farm vehicle to be operate in an autonomous driving mode or a manual driving mode,
wherein the processor determines whether a problem occurs in at least one of a required device and an optional device of the farm vehicle every first cycle,
wherein the processor determines that a first emergency situation occurs when the problem occurs in the required device,
wherein the processor determines that a second emergency situation occurs when the problem occurs only in the optional device or a problem related to an external environment of the farm vehicle occurs,
wherein the processor determines whether the first emergency situation corresponding to the farm vehicle occurs for the first cycle when a driving mode of the farm vehicle is the autonomous driving mode, changes the driving mode of the farm vehicle to the manual driving mode when the first emergency situation occurs, determines whether the first emergency situation is resolved in the manual driving mode for a second cycle, and changes the driving mode of the farm vehicle to the autonomous driving mode when the first emergency situation is resolved,
wherein the farm vehicle operates with a work machine that receives power from a power take-off (PTO) device, and
wherein the second cycle is longer than the first cycle.

* * * * *